US010885212B2

(12) United States Patent
Teal

(10) Patent No.: US 10,885,212 B2
(45) Date of Patent: Jan. 5, 2021

(54) SECURE MANAGEMENT OF PROCESS PROPERTIES

(71) Applicant: Sophos Limited, Abingdon (GB)

(72) Inventor: Richard S. Teal, Media, PA (US)

(73) Assignee: Sophos Limited, Abingdon (GB)

(*) Notice: Subject to any disclaimer, the term of this patent is extended or adjusted under 35 U.S.C. 154(b) by 131 days.

(21) Appl. No.: 15/795,952

(22) Filed: Oct. 27, 2017

(65) Prior Publication Data
US 2019/0080078 A1 Mar. 14, 2019

Related U.S. Application Data

(60) Provisional application No. 62/557,703, filed on Sep. 12, 2017, provisional application No. 62/571,759, filed on Oct. 12, 2017, provisional application No. 62/572,548, filed on Oct. 15, 2017.

(51) Int. Cl.
*G06F 21/00* (2013.01)
*G06F 21/60* (2013.01)
(Continued)

(52) U.S. Cl.
CPC ........ *G06F 21/606* (2013.01); *G06F 12/0813* (2013.01); *G06F 21/44* (2013.01); *G06F 21/50* (2013.01); *G06F 21/51* (2013.01); *G06F 21/54* (2013.01); *G06F 21/55* (2013.01); *G06F 21/554* (2013.01); *G06F 21/57* (2013.01); *G06F 21/602* (2013.01); *H04L 9/0891* (2013.01); *H04L 9/321* (2013.01); *H04L 9/3247* (2013.01); *H04L 9/3268* (2013.01); *H04L 43/028* (2013.01); *H04L 43/045* (2013.01); *H04L 43/062* (2013.01); *H04L 47/2475* (2013.01);
(Continued)

(58) Field of Classification Search
CPC .......... G06F 21/50; G06F 21/51; G06F 21/55; G06F 21/554; G06F 21/56; G06F 21/566; G06F 21/57; G06F 21/577; G06F 21/62; G06F 21/6218; G06F 21/6281
See application file for complete search history.

(56) References Cited

U.S. PATENT DOCUMENTS 785,666 A 3/1905 Diebel
5,557,742 A 9/1996 Smaha et al.
(Continued)

FOREIGN PATENT DOCUMENTS

JP 2011034552 2/2011
WO WO-2019055157 3/2019

OTHER PUBLICATIONS

ISA, "PCT Application No. PCT/US18/45726 International Search Report and Written Opinion dated Jan. 8, 2019", 17 pages.
(Continued)

Primary Examiner — Edward Zee
(74) Attorney, Agent, or Firm — Strategic Patents, P.C.

(57) ABSTRACT

An endpoint has a tamper protection cache that identifies protected computing objects, along with a process cache that stores information for processes executing on the endpoint. By securing the tamper protection cache with reference to a trust authority external to the endpoint, or the operating system for the endpoint, computing objects listed in the tamper protection cache can be protected against unauthorized modifications from malware or other malicious or otherwise potentially unsafe code.

20 Claims, 21 Drawing Sheets

(51) Int. Cl.
| | |
|---|---|
| *G06F 21/44* | (2013.01) |
| *G06F 21/57* | (2013.01) |
| *H04L 9/32* | (2006.01) |
| *G06F 21/51* | (2013.01) |
| *H04L 29/06* | (2006.01) |
| *H04L 9/08* | (2006.01) |
| *G06F 21/55* | (2013.01) |
| *G06F 21/54* | (2013.01) |
| *G06F 12/0813* | (2016.01) |
| *G06F 21/50* | (2013.01) |
| *H04L 12/26* | (2006.01) |
| *H04L 12/859* | (2013.01) |
| *H04L 9/30* | (2006.01) |
| *H04L 29/08* | (2006.01) |

(52) U.S. Cl.
CPC .......... *H04L 63/02* (2013.01); *H04L 63/0218* (2013.01); *H04L 63/0227* (2013.01); *H04L 63/0236* (2013.01); *H04L 63/0263* (2013.01); *H04L 63/14* (2013.01); *H04L 63/1416* (2013.01); *H04L 63/1425* (2013.01); *H04L 63/1433* (2013.01); *H04L 63/1441* (2013.01); *H04L 63/168* (2013.01); *H04L 63/20* (2013.01); *H04L 63/205* (2013.01); *G06F 2212/1052* (2013.01); *G06F 2212/60* (2013.01); *G06F 2212/62* (2013.01); *H04L 9/30* (2013.01); *H04L 43/026* (2013.01); *H04L 43/10* (2013.01); *H04L 63/145* (2013.01); *H04L 67/2842* (2013.01)

(56) References Cited

U.S. PATENT DOCUMENTS

| | | |
|---|---|---|
| 5,991,399 A | 11/1999 | Graunke et al. |
| 6,185,686 B1 | 2/2001 | Glover |
| 6,195,587 B1 | 2/2001 | Hruska et al. |
| 6,301,668 B1 | 10/2001 | Gleichauf et al. |
| 6,310,873 B1 | 10/2001 | Rainis et al. |
| 6,330,670 B1 | 12/2001 | England et al. |
| 6,505,300 B2 | 1/2003 | Chan et al. |
| 6,658,571 B1 | 12/2003 | O'Brien et al. |
| 6,675,218 B1 | 1/2004 | Mahler et al. |
| 6,735,703 B1 | 5/2004 | Kilpatrick et al. |
| 6,785,821 B1 | 8/2004 | Teal |
| 6,816,973 B1 | 11/2004 | Gleichauf et al. |
| 6,895,504 B1 | 5/2005 | Zhang et al. |
| 6,981,158 B1 | 12/2005 | Sanchez et al. |
| 6,986,052 B1 | 1/2006 | Mittal |
| 7,290,266 B2 | 10/2007 | Gladstone et al. |
| 7,363,493 B2 | 4/2008 | Dotan |
| 7,398,389 B2 | 7/2008 | Teal et al. |
| 7,533,413 B2 | 5/2009 | Samuelsson et al. |
| 7,565,549 B2 | 7/2009 | Satterlee et al. |
| 7,673,137 B2 | 3/2010 | Satterlee et al. |
| 7,698,744 B2 | 4/2010 | Fanton et al. |
| 7,711,952 B2 | 5/2010 | Teal et al. |
| 7,856,661 B1 | 12/2010 | Sebes et al. |
| 7,865,947 B2 | 1/2011 | Fanton et al. |
| 8,069,487 B2 | 11/2011 | Fanton et al. |
| 8,136,155 B2 | 3/2012 | Freund |
| 8,151,109 B2 | 4/2012 | Fanton et al. |
| 8,166,304 B2 | 4/2012 | Murase et al. |
| 8,266,676 B2 | 9/2012 | Hardjono et al. |
| 8,272,058 B2 | 9/2012 | Brennan |
| 8,307,437 B2 | 11/2012 | Sebes et al. |
| 8,321,932 B2 | 11/2012 | Bhargava et al. |
| 8,332,946 B1 | 12/2012 | Boisjolie et al. |
| 8,335,916 B2 | 12/2012 | Brabson et al. |
| 8,566,919 B2 | 10/2013 | Meisel |
| 8,739,274 B2 | 5/2014 | Khemani et al. |
| 8,782,800 B2 | 7/2014 | Brennan et al. |
| 8,950,007 B1 | 2/2015 | Teal et al. |
| 9,043,903 B2 | 5/2015 | Diehl et al. |
| 9,058,504 B1 | 6/2015 | Swanson et al. |
| 9,111,099 B2 | 8/2015 | Paris et al. |
| 9,197,642 B1 | 11/2015 | Urbach |
| 9,374,390 B1 | 6/2016 | Teal et al. |
| 9,507,621 B1 | 11/2016 | Allen |
| 9,665,708 B2 | 5/2017 | Fanton et al. |
| 9,772,953 B2 | 9/2017 | Chen et al. |
| 9,781,046 B1 | 10/2017 | Pawlukowsky et al. |
| 9,787,641 B2 | 10/2017 | Bansal et al. |
| 9,842,203 B2 | 12/2017 | Fanton et al. |
| 9,893,898 B2 | 2/2018 | Kreft |
| 10,063,380 B2 | 8/2018 | Brandwine et al. |
| 10,505,899 B1 | 12/2019 | Singh et al. |
| 2001/0037433 A1 | 11/2001 | Dempsey et al. |
| 2001/0044904 A1 | 11/2001 | Berg et al. |
| 2002/0049834 A1 | 4/2002 | Molnar |
| 2002/0059330 A1 | 5/2002 | Molnar |
| 2002/0133535 A1 | 9/2002 | Lucovsky et al. |
| 2002/0178271 A1 | 11/2002 | Graham et al. |
| 2002/0194525 A1 | 12/2002 | Mathiske et al. |
| 2003/0014466 A1 | 1/2003 | Berger et al. |
| 2003/0120935 A1 | 6/2003 | Teal et al. |
| 2003/0149797 A1 | 8/2003 | Nagarajayya et al. |
| 2003/0204632 A1 | 10/2003 | Willebeek-Iemair et al. |
| 2004/0030776 A1 | 2/2004 | Cantrell et al. |
| 2004/0078536 A1 | 4/2004 | Chen |
| 2004/0093505 A1 | 5/2004 | Hatakeyama et al. |
| 2004/0199763 A1 | 10/2004 | Freund |
| 2005/0010752 A1 | 1/2005 | Solsona et al. |
| 2005/0060561 A1 | 3/2005 | Pearson et al. |
| 2005/0108516 A1 | 5/2005 | Balzer et al. |
| 2005/0114338 A1 | 5/2005 | Borthakur et al. |
| 2005/0182931 A1 | 8/2005 | Robert et al. |
| 2005/0289354 A1 | 12/2005 | Borthakur et al. |
| 2006/0004759 A1 | 1/2006 | Borthakur et al. |
| 2006/0064582 A1 | 3/2006 | Teal et al. |
| 2006/0095762 A1 | 5/2006 | Hosokawa et al. |
| 2007/0136235 A1 | 6/2007 | Hess |
| 2007/0143223 A1 | 6/2007 | Bhave et al. |
| 2007/0143824 A1 | 6/2007 | Shahbazi |
| 2008/0040800 A1* | 2/2008 | Park ................. G06F 21/562 726/22 |
| 2008/0235507 A1 | 9/2008 | Ishikawa et al. |
| 2008/0294703 A1 | 11/2008 | Craft et al. |
| 2008/0301468 A1 | 12/2008 | Murase et al. |
| 2009/0077664 A1* | 3/2009 | Hsu .................. G06F 21/566 726/24 |
| 2009/0086974 A1 | 4/2009 | Murase et al. |
| 2009/0119748 A1 | 5/2009 | Yao et al. |
| 2009/0240766 A1 | 9/2009 | Kikkawa et al. |
| 2009/0271620 A1 | 10/2009 | Sudhakar |
| 2010/0212010 A1 | 8/2010 | Stringer et al. |
| 2010/0226495 A1 | 9/2010 | Kelly et al. |
| 2011/0010723 A1 | 1/2011 | Okabe |
| 2012/0100910 A1 | 4/2012 | Eichorn et al. |
| 2012/0136993 A1 | 5/2012 | Gao et al. |
| 2012/0185683 A1 | 7/2012 | Krstic et al. |
| 2012/0260331 A1 | 10/2012 | Aaron |
| 2013/0097658 A1 | 4/2013 | Cooper et al. |
| 2013/0227683 A1 | 8/2013 | Bettini et al. |
| 2014/0079370 A1 | 3/2014 | Qian |
| 2014/0090013 A1 | 3/2014 | Crawford |
| 2014/0123279 A1 | 5/2014 | Bishop et al. |
| 2014/0208097 A1 | 7/2014 | Brandwine et al. |
| 2014/0229951 A1 | 8/2014 | Zhang |
| 2014/0282816 A1 | 9/2014 | Xie et al. |
| 2014/0331306 A1 | 11/2014 | Zhao et al. |
| 2014/0337234 A1 | 11/2014 | Tang et al. |
| 2014/0359222 A1 | 12/2014 | Zachariassen |
| 2014/0366080 A1 | 12/2014 | Gupta et al. |
| 2015/0007262 A1 | 1/2015 | Aissi et al. |
| 2015/0012980 A1 | 1/2015 | Mikolajczyk |
| 2015/0074258 A1 | 3/2015 | Ferreira et al. |
| 2015/0121027 A1 | 4/2015 | Koike et al. |
| 2015/0135283 A1 | 5/2015 | Tofighbakhsh |
| 2015/0149732 A1 | 5/2015 | Kiperberg et al. |
| 2015/0172300 A1 | 6/2015 | Cochenour |
| 2015/0186651 A1 | 7/2015 | Kim et al. |

(56) References Cited

U.S. PATENT DOCUMENTS

| | | |
|---|---|---|
| 2015/0199532 A1 | 7/2015 | Ismael et al. |
| 2015/0220455 A1 | 8/2015 | Chen et al. |
| 2015/0229646 A1 | 8/2015 | Ely |
| 2015/0237025 A1 | 8/2015 | Pal et al. |
| 2015/0269031 A1 | 9/2015 | Wang et al. |
| 2016/0006749 A1 | 1/2016 | Cohen et al. |
| 2016/0012232 A1 | 1/2016 | Butcher et al. |
| 2016/0036778 A1 | 2/2016 | Chen et al. |
| 2016/0315880 A1 | 10/2016 | Guo et al. |
| 2016/0323318 A1 | 11/2016 | Terrill et al. |
| 2017/0093892 A1 | 3/2017 | Prokudin |
| 2017/0126740 A1 | 5/2017 | Bejarano et al. |
| 2017/0180189 A1 | 6/2017 | Hosdurg et al. |
| 2017/0187733 A1 | 6/2017 | Ahn et al. |
| 2017/0237749 A1 | 8/2017 | Wood |
| 2017/0249462 A1 | 8/2017 | Permeh et al. |
| 2017/0250817 A1 | 8/2017 | Bonzini et al. |
| 2017/0302458 A1 | 10/2017 | Berger et al. |
| 2017/0310692 A1 | 10/2017 | Ackerman et al. |
| 2017/0310703 A1 | 10/2017 | Ackerman et al. |
| 2017/0344731 A1 | 11/2017 | Gefflaut et al. |
| 2018/0007008 A1 | 1/2018 | Bansal et al. |
| 2018/0018475 A1 | 1/2018 | Li |
| 2018/0081829 A1 | 3/2018 | Kaplan |
| 2018/0083922 A1 | 3/2018 | Yin |
| 2018/0189490 A1 | 7/2018 | Maciejak et al. |
| 2018/0217937 A1 | 8/2018 | Koo et al. |
| 2018/0314829 A1 | 11/2018 | Liu et al. |
| 2018/0314831 A1 | 11/2018 | Liu et al. |
| 2018/0351969 A1 | 12/2018 | Macleod et al. |
| 2018/0365422 A1 | 12/2018 | Callaghan et al. |
| 2019/0014086 A1 | 1/2019 | Meyer et al. |
| 2019/0020664 A1 | 1/2019 | Wood |
| 2019/0080102 A1 | 3/2019 | Teal |
| 2019/0081873 A1 | 3/2019 | Kraft |
| 2019/0081928 A1 | 3/2019 | Teal |
| 2019/0081962 A1 | 3/2019 | Teal |
| 2019/0081976 A1 | 3/2019 | Kraft |
| 2019/0081983 A1 | 3/2019 | Teal |

OTHER PUBLICATIONS

ISA, "PCT Application No. PCT/US18/45726 Invitation to Pay Additional Fees and Partial Search Report dated Nov. 6, 2018", 12 pages.

"U.S. Appl. No. 15/795,747 Non-Final Office Action dated May 1, 2019", 17 pages.

"U.S. Appl. No. 15/795,791 Non-Final Office Action dated Mar. 28, 2019", 12 pages.

"U.S. Appl. No. 15/795,918 Non-Final Office Action dated Apr. 4, 2019", 15 pages.

"U.S. Appl. No. 15/796,009 Non-Final Office Action dated May 15, 2019", 37 pages.

"U.S. Appl. No. 15/795,976 Non-Final Office Action dated Jun. 26, 2019", 18 pages.

"U.S. Appl. No. 15/795,836 Non-Final Office Action dated Oct. 7, 2019", 23 pages.

"U.S. Appl. No. 15/795,918 Final Office Action dated Dec. 12, 2019", 15 pages.

"U.S. Appl. No. 15/796,009 Final Office Action dated Nov. 21, 2019", 40 pages.

"U.S. Appl. No. 15/795,747 Final Office Action dated Dec. 9, 2019", 17 pages.

"U.S. Appl. No. 15/795,791 Final Office Action dated Oct. 18, 2019", 12 pages.

"U.S. Appl. No. 15/795,976 Final Office Action dated Feb. 3, 2020", 8 pages.

"U.S. Appl. No. 15/795,747 Non-Final Office Action dated Apr. 21, 2020", 17 pages.

WIPO, "PCT Application No. PCT/US18/45726 International Preliminary Report on Patentability dated Mar. 26, 2020", 12 pages.

USPTO, "U.S. Appl. No. 15/795,976 Notice of Allowance dated Jun. 1, 2020", 10 pages.

USPTO, "NPL Searches", Apr. 16, 2020, 2 pages.

USPTO, "U.S. Appl. No. 15/795,747 Final Office Action dated Sep. 21, 2020", 20 pages.

USPTO, "U.S. Appl. No. 15/795,791 Notice of Allowance dated Sep. 10, 2020", 10 pages.

USPTO, "U.S. Appl. No. 15/795,918 Non-Final Office Action dated Sep. 22, 2020", 17 pages.

USPTO, "U.S. Appl. No. 15/795,836 Notice of Allowance dated Aug. 18, 2020", 8 pages.

USPTO, "U.S. Appl. No. 15/796,009 Non-Final Office Action dated Jul. 2, 2020" 43 pages.

USPTO, "U.S. Appl. No. 15/795,976 Notice of Allowance dated Oct. 15, 2020", 12 pages.

* cited by examiner

| APPLICATION LIST | ENHANCED APP CONTROL | APP FILTER | TRAFFIC SHAPING DEF | |
|---|---|---|---|---|
| C:\WINDOWS\SYSTEM32\SI | FOUND ON 0 ENDPOINTS | 2017-08-05 14:25:52 | NEW | CUSTOMIZE |
| C:\WINDOWS\SYSTEM32\SP | FOUND ON 0 ENDPOINTS | 2017-08-05 08:18:55 | NEW | CUSTOMIZE |
| C:\WINDOWS\SYSTEM32\SV | FOUND ON 0 ENDPOINTS | 2017-08-04 19:10:24 | NEW | CUSTOMIZE |
| C:\WINDOWS\SYSTEM32\W | FOUND ON 0 ENDPOINTS | 2017-08-06 10:28:36 | NEW | CUSTOMIZE |
| C:\WINDOWS\SYSTEM32\WI | FOUND ON 0 ENDPOINTS | 2017-08-05 18:56:33 | NEW | CUSTOMIZE |
| C:\WINDOWS\SYSTEMAPP | FOUND ON 0 ENDPOINTS | 2017-08-04 23:13:02 | | CUSTOMIZE |
| MICROSOFT OUTLOOK COMMUN | FOUND ON 0 ENDPOINTS | 2017-08-04 19:33:36 | NEW | CUSTOMIZE |
| MICROSOFT WINDOWS PHOTOS | FOUND ON 0 ENDPOINTS | 2017-08-04 22:39:52 | | CUSTOMIZE |
| NOTEPAD++ UPDATER | FOUND ON 0 ENDPOINTS | 2017-08-04 22:28:29 | | CUSTOMIZE |
| ONEDRIVE (SKYDRIVE) FOR WIN | FOUND ON 0 ENDPOINTS | 2017-08-05 18:55:30 | NEW | CUSTOMIZE |
| PUTTY | FOUND ON 0 ENDPOINTS | 2017-08-04 19:16:49 | NEW | CUSTOMIZE |
| ULTRASURF | FOUND ON 0 ENDPOINTS | 2017-08-04 22:47:11 | | CUSTOMIZE |
| WINDOWS STORE | FOUND ON 0 ENDPOINTS | 2017-08-04 19:20:13 | NEW | CUSTOMIZE |
| BITTORRENT.EXE | FOUND ON 0 ENDPOINTS | 2017-08-04 22:49:05 | | CUSTOMIZE |

SECURE MANAGEMENT OF PROCESS PROPERTIES

RELATED APPLICATIONS

This application claims the benefit of U.S. Prov. App. No. 62/557,703 filed on Sep. 12, 2017, U.S. Prov. App. No. 62/571,759 filed on Oct. 12, 2017, and U.S. Prov. App. No. 62/572,548 filed on Oct. 15, 2017. The entire content of each of the foregoing applications is hereby incorporated by reference in its entirety.

TECHNICAL FIELD

This application relates to techniques for improving endpoint security.

BACKGROUND

Enterprise networks can contain valuable information that forms an increasingly attractive target for malicious actors. Useful techniques for securing endpoints in a network against malicious activity are described by way of example in commonly-owned U.S. Pat. No. 9,392,015 issued on Jul. 12, 2016, U.S. Pat. No. 8,950,007 issued on Feb. 3, 2015, U.S. patent application Ser. No. 14/485,759 filed on Sep. 14, 2014, U.S. patent application Ser. No. 15/042,862 filed on Feb. 12, 2016, U.S. patent application Ser. No. 15/099,524 filed on Apr. 14, 2017, and U.S. patent application Ser. No. 15/484,830 filed on Apr. 11, 2017, each of which is hereby incorporated by reference in its entirety.

There remains a need for improved endpoint security techniques such as improved network security network security based on monitoring network flows or improved endpoint network security based on control of interprocess communications.

SUMMARY

In one aspect, a method for managing network flows for an enterprise disclosed herein includes receiving a network message at a network device from an endpoint within an enterprise network, when the network message contains first identifying information providing an application type for the network message, using the first identifying information in the network message to determine the application type, when the network message has an unknown application type, querying the endpoint to retrieve second identifying information for a process executing on the endpoint that was a source of the network message and determining the application type for the source of the network message based on the second identifying information retrieved from the endpoint, managing a network traffic flow including the network message at the network device according to the application type.

Managing the network traffic flow may include applying a security policy to the network traffic flow according to the application type. Managing the network traffic flow may include associating the network traffic flow with the application type. Querying the endpoint may include querying an endpoint security agent executing on the endpoint. Querying the endpoint may include querying the endpoint through a secure connection between the network device and the endpoint. Querying the endpoint may include receiving a response at the network device from the endpoint in a secure heartbeat from the endpoint. The network device may include a gateway for the enterprise network, a cloud-based network device, or a firewall on the endpoint. The first identifying information or second identifying information may include an application name for the source of the network message. The first identifying information or second identifying information may include application data for the source of the network message. Determining the application type may include forwarding the first identifying information or the second identifying information to a threat management facility for analysis and receiving an identification of the application type from the threat management facility.

In another aspect, a method of managing flows at a network device disclosed herein includes determining an application type for each of a number of network traffic flows at a network device that receives the number of network traffic flows from endpoints within an enterprise network and managing the network traffic flows based on the corresponding application types. The method may further include receiving a network message in one of the network traffic flows at the network device from an endpoint within the enterprise network, the network message having an unknown application type and querying the endpoint to retrieve identifying information for the source on the endpoint of the network message. The method may include determining the application type for the source of the network message based on the identifying information and managing the network message within the network traffic according to the application type.

Implementations may include one or more of the following features. Managing the network traffic flows may include applying a security policy to each of the network traffic flows according to the application type. Managing the network traffic may also or instead include associating the network flow containing the message with the application type. Querying the endpoint may include querying an endpoint security agent executing on the endpoint. Querying the endpoint may also or instead include querying the endpoint through a secure connection between the network device and the endpoint. Querying the endpoint may also or instead include receiving a response at the network device from the endpoint in a secure heartbeat from the endpoint. The network device may include a gateway for the enterprise network. The identifying information may include an application name for the source of the network message. The identifying information includes application data for the source of the network message. Determining the application type may include forwarding the identifying information to a threat management facility for analysis and receiving an identification of the application type from the threat management facility.

In one aspect, a computer program product for managing network flows comprising computer executable code embodied on a non-transitory computer readable medium that, when executing on a network device, may perform the steps of determining an application type for each of a number of network traffic flows at a network device that receives the number of network traffic flows from endpoints within an enterprise network and managing the network traffic flows based on the corresponding application types. The code may also perform the steps of receiving a network message in one of the network traffic flows at the network device from an endpoint within the enterprise network, the network message having an unknown application type and querying the endpoint to retrieve identifying information for the source on the endpoint of the network message. The code may also perform the steps of determining the application type for the source of the network message based on the identifying information and managing the network message within the network traffic according to the application type.

In another aspect, a method for visualizing network usage disclosed herein includes providing a number of application types that characterizing one or more applications sourcing network traffic within an enterprise network, labeling each of a number of network traffic flows in the enterprise network with one of the application types by querying endpoints for network type information when each new one of the number of network traffic flows is initiated, aggregating a number of endpoints using each one of the application types on the enterprise network at a cloud-based enterprise management facility, and configuring the cloud-based enterprise management facility to present the number of endpoints using each one of the application types to a user in a web-based dashboard.

Each of the number of application types may include an application name. The number of application types may include electronic mail, word processing, spread sheet, and web browser. Labeling may include labeling at one or more network devices within the enterprise network. Labeling may include querying each endpoint that initiates one of the network traffic flows to identify an associated application type. Labeling may include extracting an explicit application type label from a network message within one of the network traffic flows. The explicit application type label may be cryptographically signed. Labeling may include extracting an explicit application type label from information transmitted in a heartbeat from an endpoint that originated a network message within one of the network traffic flows. The heartbeat may be a secure heartbeat. The heartbeat may be a digitally signed heartbeat. Aggregating a number of endpoints using each one of the application types includes aggregating only the application types used by one or more of the endpoints. The web-based dashboard may provide interactive access to underlying data for one or more of network usage by each application type, number of endpoints using each application type, duration of usage, and bandwidth usage.

In another aspect, a computer program product disclosed herein includes computer executable code embodied in a non-transitory computer readable medium that, when executing on one or more computing devices, performs the steps of: providing a number of application types; labeling each of a number of network traffic flows in an enterprise network with one of the application types; aggregating a number of endpoints using each one of the application types on the enterprise network; and configuring a server to present the number of endpoints using each one of the application types to a user in a web-based dashboard.

In another aspect, there is disclosed herein a system including a plurality of security agents executing on a plurality of endpoints in an enterprise network. The system may also include one or more network device in the enterprise network, each one of the network devices configured to label network traffic flows from the plurality of endpoints according to an application type selected from a predetermined group of application types. The system may also include a server configured to aggregate usage data from each one of the network devices to determine a number of instances of each one of the predetermined group of application types associated with a network traffic flow within the enterprise network, and to present the usage data in a web-based interface.

Endpoint security is improved by monitoring and controlling interprocess communications through a kernel-based endpoint protection driver. A list of protected computing objects such as registry keys, files, processes and directories is stored in the kernel and secured with reference to a trust authority external to the kernel and the endpoint. Protected processes are further controlled from unauthorized access and use by monitoring all interprocess communications through the endpoint protection driver and preventing unprotected processes from passing (potentially unsafe) data to protected processes.

A computer program product for securing interprocess communications in an operating system of an endpoint that includes a kernel space for operating system functions and a user space for user programs disclosed herein includes computer executable code embodied in a non-transitory computer-readable medium that, when executing on the endpoint, performs the steps of storing a tamper protection cache in the kernel space on the endpoint, the tamper protection cache identifying one or more protected processes for protection when executing in the user space, storing a digital signature in the tamper protection cache, the digital signature signed with a private key that provides a root of trust from a trust authority external to the operating system, monitoring execution of processes in the user space of the endpoint with an endpoint protection driver executing in the kernel space, directing an interprocess communication from a first process in the user space to a second process in the user space through the endpoint protection driver, and, when the second process is a first one of the protected processes identified in the tamper protection cache, conditionally permitting the first process to provide data to the second process only when the first process is a second one of the protected processes identified in the tamper protection cache.

In another aspect, a method for securing interprocess communications on an endpoint disclosed herein includes storing a tamper protection cache in a kernel space of an operating system on the endpoint, where a memory of the endpoint includes the kernel space and a user space, and where the tamper protection cache identifies one or more protected processes for protection when executing in the user space, monitoring execution of processes in the user space of the endpoint with an endpoint protection driver executing in the kernel space, directing an interprocess communication from a first process in the user space to a second process in the user space through the endpoint protection driver, and conditionally managing the interprocess communication according to a protected status of each of the first process and the second process in the tamper protection cache.

Conditionally managing the interprocess communication may include, when the second process is a first one of the protected processes identified in the tamper protection cache, conditionally permitting the first process to provide data to the second process only when the first process is a second one of the protected processes identified in the tamper protection cache. The method may further include storing a process cache in the kernel space, the process cache including process properties for one or more processes executing on the endpoint. The one or more processes executing on the endpoint may include one of the protected processes. The method may further include detecting a change to one of the process properties with the endpoint protection driver and evaluating the change for possible malicious activity. The process cache may store at least one of an application, an application family, an application path, and an application class for each of the one or more processes executing on the endpoint. The method may further include loading the endpoint protection driver before launching processes in the user space. The method may further include retaining process data for the first process in a process cache in the kernel space after the first process is terminated in the user space. The method may further include providing the process data for the first process from the process cache to an external security resource in response to a query from the external security resource. The tamper protection cache may be digitally signed by a trust authority external to the operating system. The tamper protection cache may be digitally signed using a private key, where a public key for a key pair that includes the private key and the public key is encoded into a binary representation of the endpoint protection driver stored in the kernel space. The trust authority may include a remote threat management facility. The tamper protection cache may be digitally signed with a signature containing a signed hash of the tamper protection cache. The tamper protection cache may include two or more independent data stores identifying different protected objects, each of the two or more independent data stores separately controllable by a trust authority external to the operating system. The tamper protection cache may identify one or more protected computing objects selected from a group including of a directory, a registry key, and a file. At least one of the first process and the second process may be executing in the user space of the memory. At least one of the first process and the second process may be executing in the kernel space of the memory.

A method for securing interprocess communications on an endpoint disclosed herein includes storing a tamper protection cache in a kernel space of an operating system on the endpoint, where a memory of the endpoint includes the kernel space and a user space, and where the tamper protection cache identifies one or more protected processes for protection, monitoring execution of processes executing in the memory of the endpoint with an endpoint protection driver executing in the kernel space, directing an interprocess communication from a first process in the memory to a second process in the memory through the endpoint protection driver, and conditionally managing the interprocess communication according to a protected status of each of the first process and the second process in the tamper protection cache.

At least one of the first process and the second process may be executing in the user space of the memory. At least one of the first process and the second process may be executing in the kernel space of the memory.

A system disclosed herein includes an endpoint containing a memory, an operating system executing on the endpoint, the operating system dividing the memory into a kernel space for operating system functions and a user space for execution of user programs, a tamper protection cache stored in the kernel space of the memory and digitally signed by a trust authority external to the operating system, the tamper protection cache identifying one or more protected processes for protection when executing in the user space, and an endpoint protection driver executing in the kernel space of the memory, the endpoint protection driver configured to monitor execution of processes in the user space and to detect an interprocess communication from a first process in the user space to a second process in the user space, the endpoint protection driver further configured to control the interprocess communication by, when the second process is a first one of the protected processes identified in the tamper protection cache, conditionally permitting the first process to provide data to the second process only when the first process is a second one of the protected processes identified in the tamper protection cache.

A kernel driver on an endpoint is configured to monitor processes executing on the endpoint that use network communications, and to transmit process information to a firewall for the endpoint. The firewall can, in turn, process this stream of information from individual endpoints or groups of endpoints as context for observed network activity in order to control secure network communications and otherwise manage network activity.

A computer program product for controlling a firewall disclosed herein includes computer executable code embodied in a non-transitory computer readable medium that, when executing on an endpoint, performs the steps of storing a process cache in a kernel space of an operating system on an endpoint, the endpoint having a memory that includes the kernel space and a user space and the process cache storing a name, a path and a type for each of a number of processes executing in the user space, monitoring network traffic to and from the endpoint from a kernel driver executing in the kernel space, detecting a network communications between one of the processes and a remote resource with the kernel driver, retrieving the path and the type for the one of the processes from the process cache, and transmitting the name, the path, and the type for the one of the processes to a firewall for the endpoint.

The computer program product may further include code that performs the step of generating a unique identifier for the one of the processes. The computer program product may further include code that performs the step of transmitting the unique identifier to the firewall for use in identifying network traffic from the one of the processes. The firewall may be a remote firewall at a gateway, and transmitting the name, the path, and the type may include transmitting a secure heartbeat to the remote firewall.

A method disclosed herein includes storing a process cache in a kernel space of an operating system on an endpoint, the endpoint having a memory that includes the kernel space and a user space and the process cache storing process data for a process executing in the user space, monitoring network traffic to and from the endpoint with a kernel driver, detecting a network communication between the process and a remote resource with the kernel driver, retrieving the process data with the kernel driver, and transmitting the process data to a firewall for the endpoint.

The process data may include a path for the process that identifies a location in a file system of the endpoint for executable code of the process. The process data may include a name for the process. The process data may include an application class for the process. The method may further include applying a firewall rule to the network communication based on the process data. The method may further include generating a unique identifier for the process. The method may further include transmitting the unique identifier to the firewall for use in identifying network traffic from the process. The method may further include transmitting the unique identifier to the firewall instead of the process data with one or more subsequent network communications from the process. The method may further include identifying the process at the firewall based upon the unique identifier and applying a corresponding firewall rule for the process. The firewall may include a remote firewall coupled to the endpoint through a data network. The firewall may include a local firewall executing on the endpoint.

A system disclosed herein may include an endpoint having a memory and an operating system that organizes the memory into a user space and a kernel space, a firewall disposed between the endpoint and a data network, the firewall configured to control traffic between the endpoint and the data network, a process cache in the kernel space of the operating system, the process cache storing process data for a process executing in the user space, and a kernel driver in the kernel space of the operating system, the kernel driver configured to monitor network traffic to and from the endpoint, to detect a network communication between the process and a remote resource, to retrieve the process data for the process, and to transmit the process data to the firewall.

The process cache may store process data for each of a plurality of processes executing in the user space. The process data may include a path for the process that identifies a location in a file system of the endpoint for executable code of the process. The process data may include a name for the process. The process data may include an application class for the process.

An endpoint has a tamper protection cache that identifies protected computing objects, along with a process cache that stores information for processes executing on the endpoint. By securing the tamper protection cache with reference to a trust authority external to the endpoint, or the operating system for the endpoint, computing objects listed in the tamper protection cache can be protected against unauthorized modifications from malware or other malicious or otherwise potentially unsafe code.

A computer program product disclosed herein may include computer executable code embodied in a non-transitory computer readable medium that, when executing on an endpoint, performs the steps of storing a process cache in a kernel space of an operating system on the endpoint, the endpoint having a memory that includes the kernel space and a user space and the process cache storing at least one property for a first process executing in the user space, storing a tamper protection cache in the kernel space, the tamper protection cache identifying one or more protected computing objects on the endpoint including the first process, and the tamper protection cache secured with reference to a trust authority external to the operating system, monitoring changes to the process cache with a kernel driver, detecting a requested change from a second process executing on the endpoint to the at least one property of the first process with the kernel driver, and conditionally approving the requested change from the kernel driver only when the second process is included in the one or more protected computing objects identified in the tamper protection cache.

In another aspect, a method for managing properties of processes on an endpoint disclosed herein may include storing a process cache in a kernel space of an operating system on the endpoint, the endpoint having a memory that includes the kernel space and a user space and the process cache storing at least one property for a first process executing in the user space, storing a tamper protection cache in the kernel space, the tamper protection cache identifying one or more protected computing objects on the endpoint, monitoring changes to the process cache with a kernel driver, detecting a requested change from a second process executing on the endpoint to the at least one property of the first process with the kernel driver, and conditionally approving the requested change from the kernel driver based on a security rule and the tamper protection cache.

The first process may be a software firewall executing on the endpoint. Conditionally approving the requested change may include reversing the requested change after the requested change is entered into the process cache. Conditionally approving the requested change may include approving the requested change when the second process is identified as one of the protected objects in the tamper protection cache. Conditionally approving the requested change may include approving the requested change when neither the first process nor the second process is identified as one of the protected objects in the tamper protection cache. Conditionally approving the requested change may include, when the first process is identified as one of the protected computing objects in the tamper protection cache, approving the requested change only when the second process is also identified as one of the protected objects in the tamper protection cache. The requested change may include a change to a registry key associated with the first process. The registry key may be identified as one of the protected objects in the tamper protection cache. The first process may execute from a directory location identified as one of the protected objects in the tamper protection cache. The tamper protection cache may be secured by a trust authority external to the operating system. The tamper protection cache may be secured with a digital signature from a remote trust authority. The requested change may include a change in at least one of process privileges or a user for the first process.

A system disclosed herein may include an endpoint having a memory and an operating system that organizes the memory into a user space and a kernel space, a process cache stored in the kernel space of the operating system, the process cache storing at least one property for a first process executing in the user space, a tamper protection cache stored in the kernel space of the operating system, the tamper protection cache identifying one or more protected computing objects on the endpoint, and a kernel driver in the kernel space of the operating system, the kernel driver configured to monitor changes to the process cache, to detect a requested change by a second process executing on the endpoint to the at least one property of the first process, and to conditionally approve the requested change from the kernel driver based on a security rule and the tamper protection cache.

The first process may be a software firewall executing on the endpoint. The kernel driver may be configured to undo an unapproved change by reversing the requested change after the requested change is entered into the process cache. The kernel driver may be configured to conditionally approve the requested change by approving the requested change only when the second process is identified as one of the protected objects in the tamper protection cache. The kernel driver may be configured to conditionally approve the requested change by approving the requested change when neither the first process nor the second process is identified as one of the protected objects in the tamper protection cache. The kernel driver may be configured to conditionally approve the requested change when the first process is identified as one of the protected computing objects in the tamper protection cache by approving the requested change only when the second process is also identified as one of the protected objects in the tamper protection cache. The tamper protection cache may be secured by a trust authority external to the operating system.

The configuration of a firewall on an endpoint is secured to prevent changes by unauthorized processes, while permitting changes that are requested by authorized processes. Authorized processes can be stored in a tamper protection cache within a kernel of the operating system of the endpoint and secured with reference to a trust authority external to the operating system. When a process on the endpoint requests a change to the firewall configuration, the requesting process can be checked against the processes listed in the tamper protection cache, and any suitable rules can be applied to limit or prevent changes to firewall configuration.

A computer program product for managing a firewall on an endpoint disclosed herein may include computer executable code embodied in a non-transitory computer-readable medium that, when executing on one or more computing devices, performs the steps of storing a process cache in a kernel space of an operating system on the endpoint, the endpoint having a memory that includes the kernel space and a user space and the process cache storing at least one property for a configuration of a firewall provided by a software firewall process executing in the user space on the endpoint, storing a tamper protection cache in the kernel space, the tamper protection cache identifying one or more protected computing objects on the endpoint, where the tamper protection cache secures the one or more computing objects with reference to a trust authority external to the operating system, and where the one or more protected computing objects includes the software firewall process, receiving a request for a change to the configuration of the firewall from a second process with a kernel driver, and conditionally authorizing the change from the kernel driver only when the one or more protected computing objects also includes the second process that requests the change to the configuration of the firewall.

In another aspect, a method for managing a firewall on an endpoint disclosed herein may include storing a process cache in a kernel space of an operating system on the endpoint, the endpoint having a memory that includes the kernel space and a user space and the process cache storing at least one property for a software firewall process executing in the user space on the endpoint, storing a tamper protection cache in the kernel space, the tamper protection cache identifying one or more protected computing objects on the endpoint, where the tamper protection cache secures the one or more computing objects with reference to a trust authority external to the operating system, and where the one or more protected computing objects includes the software firewall process, receiving a request for a change to a configuration of the software firewall process from a second process with a kernel driver, and conditionally authorizing the change from the kernel driver only when the one or more protected computing objects also includes the second process.

The request for the change to the configuration of the software firewall process may originate from a source external to the endpoint. The configuration of the software firewall process may be stored in one or more registry keys for the endpoint. The one or more registry keys may be contained in the one or more protected computing objects stored in the tamper protection cache. The trust authority may be external to the endpoint. The trust authority may include a remote trust authority maintained by a threat management facility for an enterprise network that includes the endpoint. The trust authority may include a remote third-party trust authority. The configuration may specify one or more firewall rules. The configuration may identify permitted or prohibited network addresses. The configuration may identify permitted or prohibited applications executing on the endpoint. The second process may be a remote process executing on a threat management facility for an enterprise network that includes the endpoint. The change to the configuration may include a request to allow traffic from an application executing on the endpoint. The second process may evaluate an application requesting network access through the software firewall process and responsively request the change to permit the application to communicate through the firewall. The second process may implement a policy change for an enterprise network to permit network use by an application by configuring the software firewall process and a remote firewall on a gateway for the enterprise network to allow traffic by the application.

A system disclosed herein may include an endpoint having a memory and an operating system that organizes the memory into a user space for executing processes and a kernel space for the operating system, a software firewall process executing in the user space, a process cache stored in the kernel space, the process cache storing at least one property for the software firewall process executing in the user space, a tamper protection cache stored in the kernel space, the tamper protection cache secured with reference to a trust authority external to the operating system and identifying one or more protected computing objects on the endpoint, where the one or more protected computing objects includes the software firewall process, and a kernel driver executing in the kernel space and configured to detect a request for a change to the at least one property of the software firewall process from a second process and to conditionally authorize the change only when the one or more protected computing objects also includes the second process.

The at least one property of the software firewall process may be stored in one or more registry keys for the endpoint. The one or more registry keys may be contained in the one or more protected computing objects stored in the tamper protection cache. The trust authority may include a remote trust authority maintained by a threat management facility for an enterprise network that includes the endpoint. The trust authority may include a remote third-party trust authority.

A computer program product disclosed herein may include computer executable code embodied in a non-transitory computer readable medium that, when executing on one or more computing devices, performs the steps of storing a process cache in a kernel space of an operating system on an endpoint, the endpoint having a memory that includes the kernel space and a user space and the process cache storing process data for a number of processes executing in the user space, detecting an action on the endpoint with a kernel driver, identifying a first process of the number of processes in the process cache associated with the action, retrieving the process data for the first process with the kernel driver, transmitting the process data to a data recorder on a firewall; and applying a network security rule at the firewall based on the process data to control network communications associated with the first process.

In another aspect, a method for monitoring process activity on an endpoint disclosed herein may include storing a process cache in a kernel space of an operating system on an endpoint, the endpoint having a memory that includes the kernel space and a user space and the process cache storing process data for a number of processes executing in the user space, detecting an action on the endpoint with a kernel driver, identifying a first process of the number of processes in the process cache associated with the action, retrieving the process data for the first process with the kernel driver, and transmitting the process data to a data recorder.

The method may further include storing a tamper protection cache in the kernel space, the tamper protection cache identifying one or more protected computing objects on the endpoint, and further including a protected status in the process data based on whether the first process is one of the one or more protected computing objects. The method may further include filtering the process data based on a relevance of the action and the first process to threat detection. The data recorder may be a local data recorder on the endpoint. The data recorder may be a remote data recorder coupled to the endpoint through a data network. The method may further include aggregating a plurality of actions and associated process data from a plurality of endpoints at a threat management facility for an enterprise network that includes the plurality of endpoints. The process data may include a path for the first process that identifies a location in a file system of the endpoint for executable code of the first process. The process data may include a name for the first process. The process data may include an application class for the first process. The process data may include a reputation for the first process.

A method for monitoring protected computing objects on an endpoint disclosed herein may include storing a tamper protection cache in a kernel space of an operating system on an endpoint, the endpoint having a memory that includes the kernel space and a user space, the tamper protection cache identifying one or more protected computing objects on the endpoint and the tamper protection cache secured with reference to a trust authority external to the operating system, detecting a change to one of the one or more computing objects with a kernel driver, and transmitting the change and an object identifier for the one of the one or more computing objects to a data recorder.

The method may further include identifying a process executing on the endpoint and associated with the change, and transmitting information for the process to the data recorder. The data recorder may be a local data recorder on the endpoint. The data recorder may be a remote data recorder coupled to the endpoint through a data network. The method may further include aggregating a plurality of changes and object identifiers from a plurality of endpoints at a threat management facility for an enterprise network that includes the plurality of endpoints. The method may further include transmitting process data for a process associated with the one or more computing objects to the data recorder. The process data may include at least one of a name for the process, an application class for the process, and a path for the process. The process data may include a reputation for the process.

A computer program product for monitoring protected computing objects on an endpoint disclosed herein may include computer executable code embodied in a non-transitory computer readable medium that, when executing on one or more computing devices, performs the steps of storing a tamper protection cache in a kernel space of an operating system on an endpoint, the endpoint having a memory that includes the kernel space and a user space, the tamper protection cache identifying one or more protected computing objects on the endpoint and the tamper protection cache secured with reference to a trust authority external to the operating system, detecting a change to one of the one or more computing objects with a kernel driver, and transmitting the change and an object identifier for the one of the one or more computing objects to a data recorder.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 13 shows a user interface for managing network usage according to application type.
FIG. 14 shows a user interface for managing network usage according to application type.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
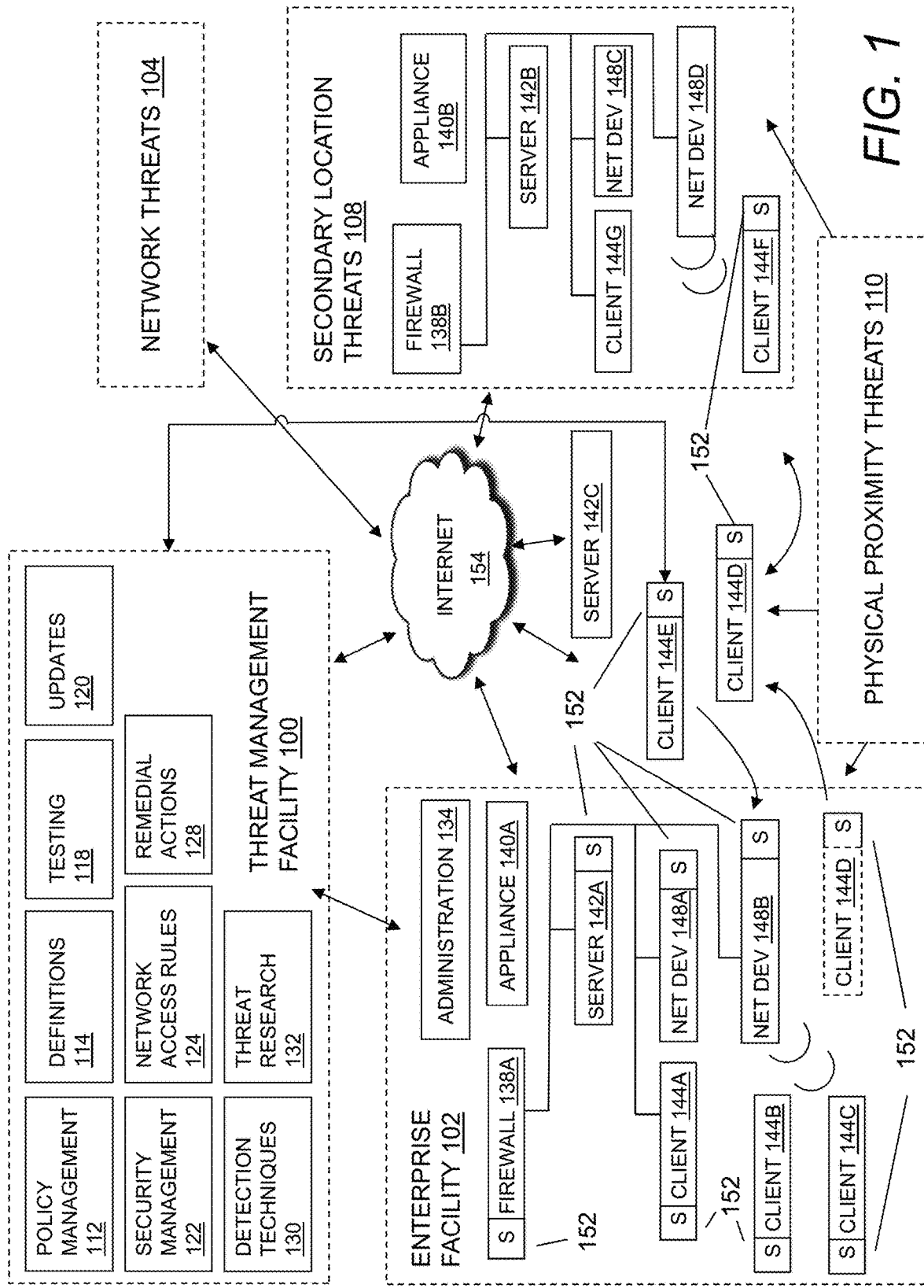
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block nonmalicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance, the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn, the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
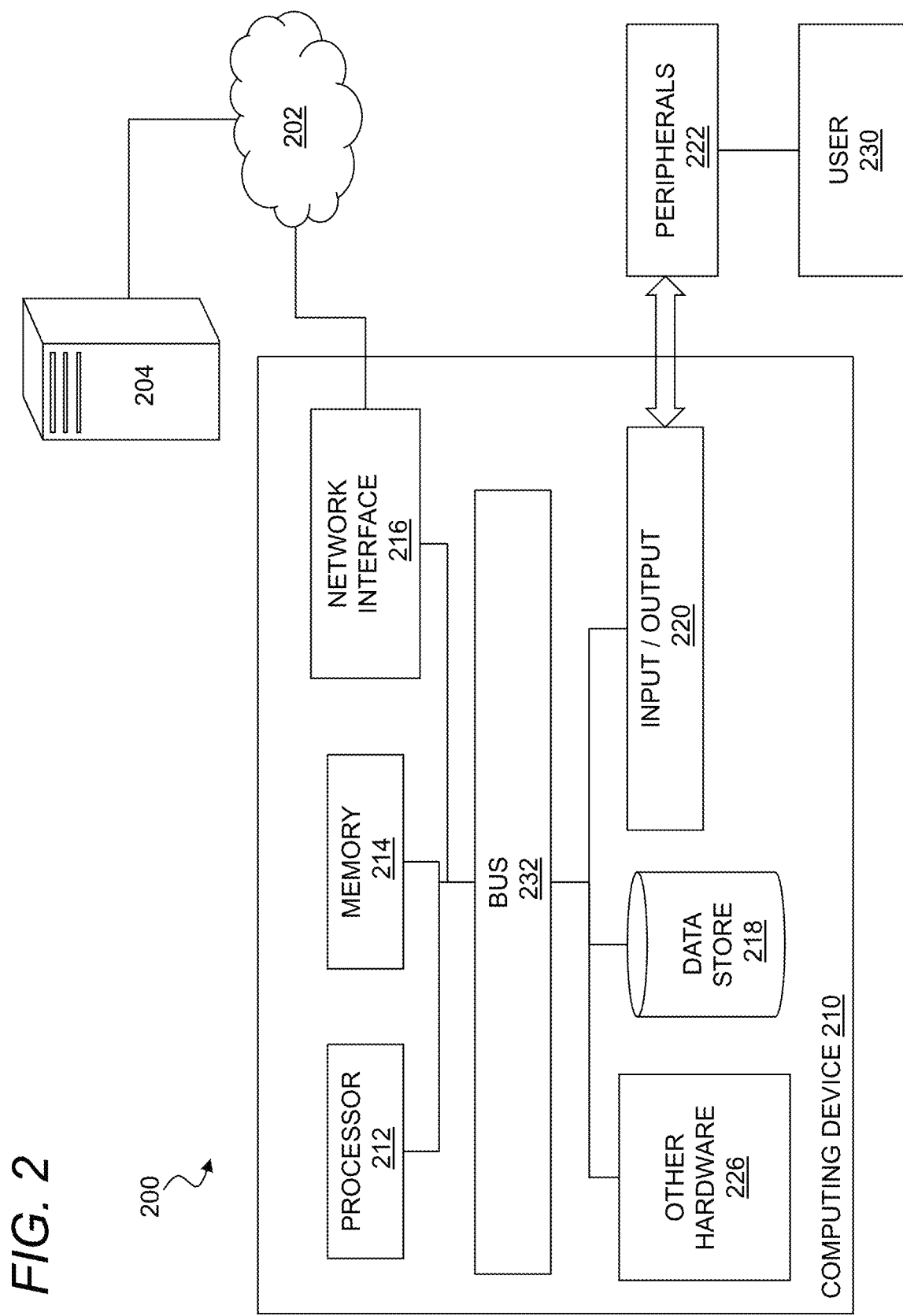
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
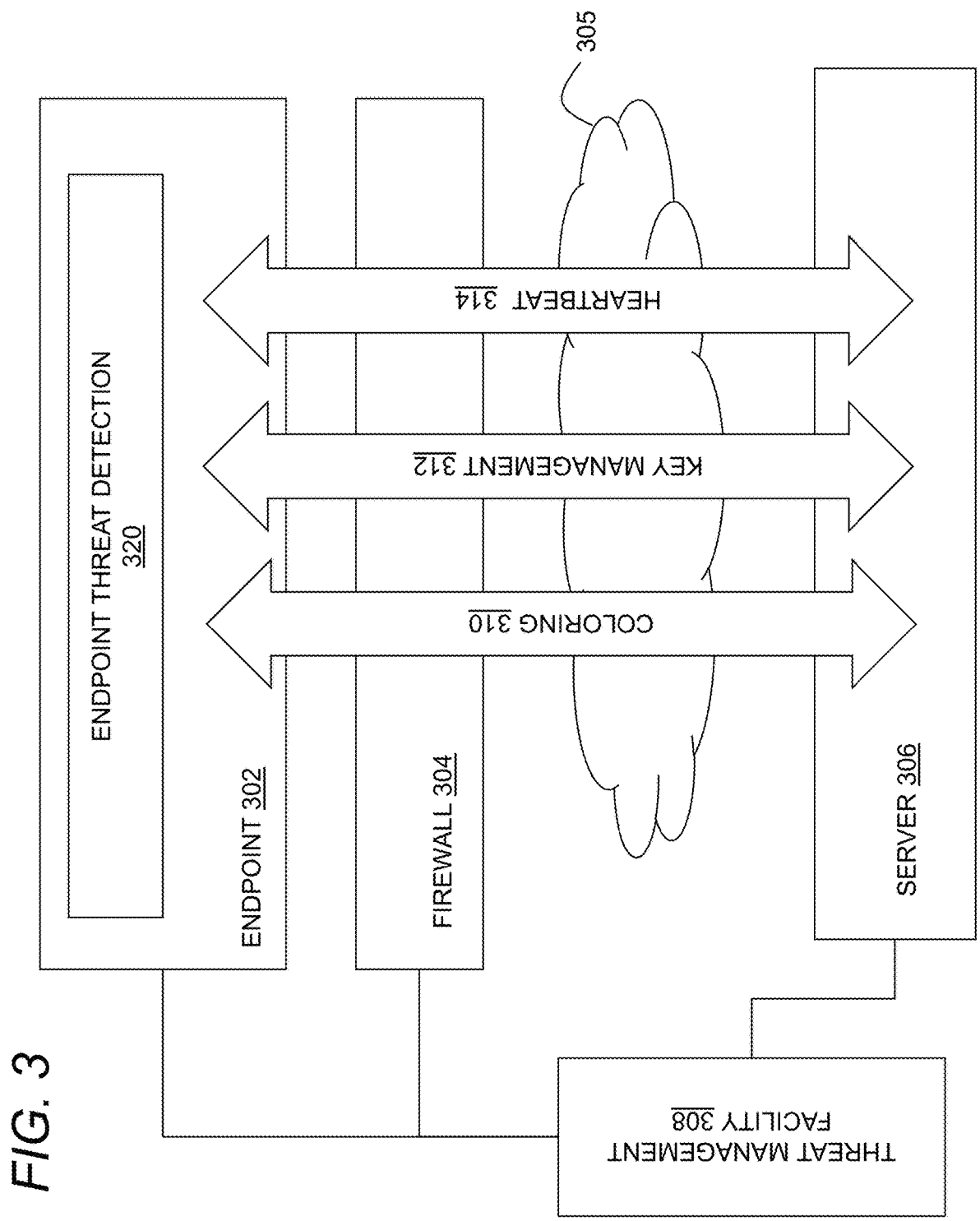
FIG. 3 illustrates a threat management system.

FIG. 3 illustrates a threat management system as contemplated herein. In general, the system may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. A suitable coloring system is described in greater detail below with reference to FIG. 4.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus, for example, if a particular process executing on the endpoint is compromised, or potentially compromised or otherwise under suspicion, keys to that process may be revoked in order to prevent, e.g., data leakage or other malicious activity. A suitable key management system useful in this context is described in greater detail below with reference to FIG. 5.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 308 to the threat management facility 308) or bidirectionally (e.g., between the endpoint 302 and the server 306, or any other pair of system components) on any useful schedule. A suitable heartbeat system is described in greater detail below with reference to FIG. 6.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
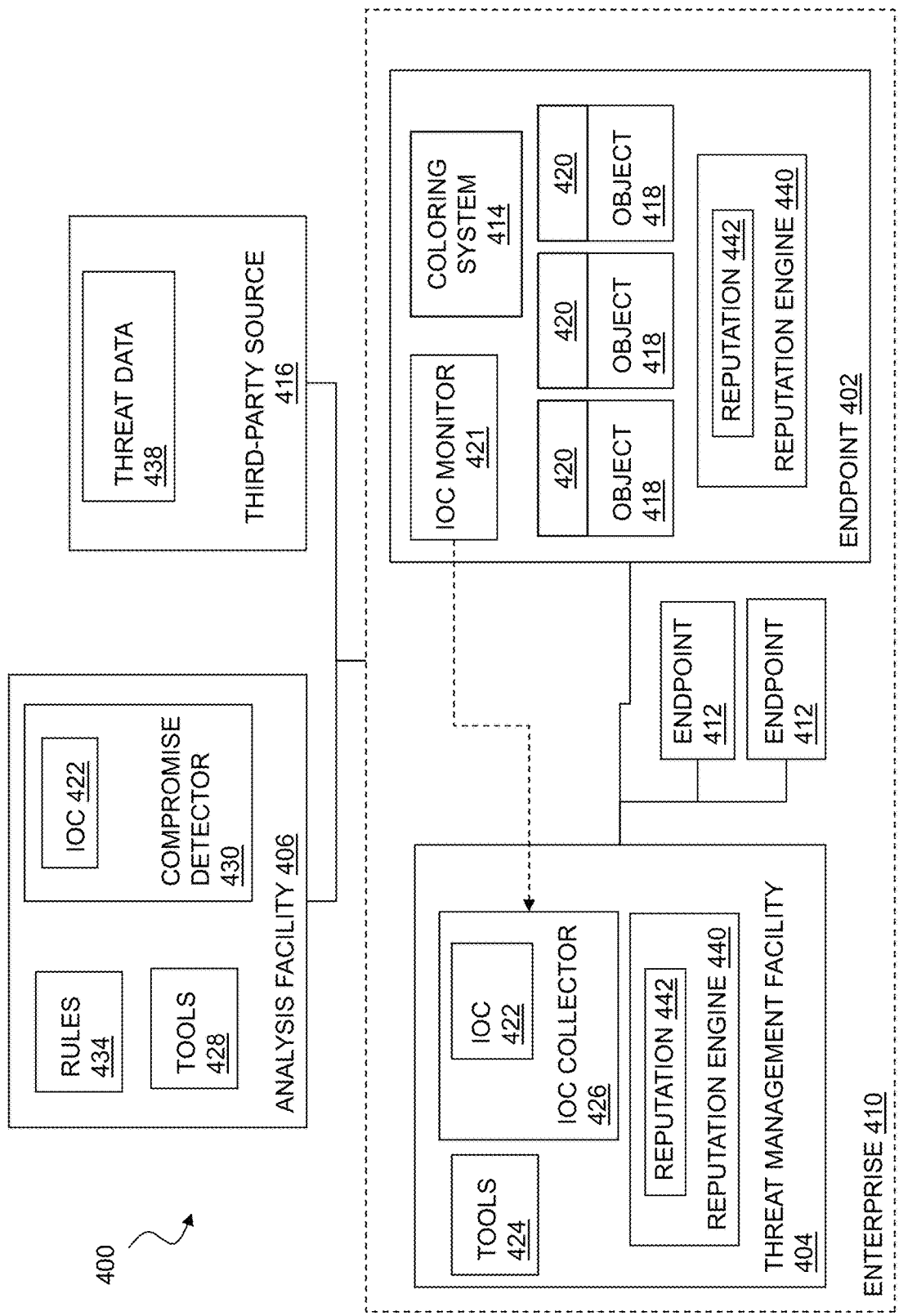
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in an enterprise.

In general, the system 400 may include a number of endpoints 402, 412 and a threat management facility 404 in an enterprise 410, such as any of the enterprises described above. An external analysis facility 406 may analyze threat data and provide rules and the like for use by the threat management facility 404 and endpoints 402, 412 in managing threats to the enterprise 410. The threat management facility 404 may reside in a local appliance (e.g., embedded within, or locally coupled to the endpoint 402), a virtual appliance (e.g., which could be run by a protected set of systems on their own network systems), a private cloud, a public cloud, and so forth. The analysis facility 406 may store locally-derived threat information. The analysis facility 406 may also or instead receive threat information from a third-party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer or a tablet), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects forming a part of a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferably to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by pre-labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action (such as a process or application) may be colored at the time of and/or with a label corresponding to the action, or likewise any object 418 that is the target of the action (such as a file or other data) may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

In one aspect, colors will not explicitly indicate a compromised security state or other good/bad types of distinctions (although they may be adapted to this use). Instead, colors may record some known information or understanding about an object 418, such as a source, a purpose, and so forth. In this context, colors will not be used to label actual or potential security compromises, but to identify inconsistencies among interacting objects 418, and to restrict or control access and use accordingly. For example, where an endpoint uses file-system-based encryption as described herein, a process that is colored as exposed to external resources (e.g., the Internet) may be prohibited from accessing cleartext data for protected files. Colors can also be used in other contexts such as intrusion prevention, routing rules, and detection of odd or questionable behavior.

In one aspect, colors may be implemented as flags associated with objects 418 that provide a short hand cache of potentially relevant information. While this information could also be obtained for an object 418 through a careful inspection of related activity logs or other data recording activities, the use of a cache of flags for coloring information makes the coloring information directly available and immediately actionable, as distinguished from post hoc forensic activities that are otherwise supported by data logging.

In one aspect, colors as contemplated herein may fall into two different categories: static colors and dynamic colors. Static colors may be explicitly applied based on, e.g., a controlling application. For example, a static color may specify a status of an application or data, or an associated type of application (e.g., productivity, mail client, messaging, browser, word processing, financial, spreadsheet, etc.). In this context, a process will generally inherit static colors from a source executable, and will permit inferences for appropriate behavior and related processes. Dynamic colors may be assigned based on direct observation of executing processes, and may not be inherited or transferred among processes (although the presence of a dynamic color may be used to draw another coloring inference upon interaction with another process). Thus, the inheritance of colors may depend in part upon the type of color that is applied, or upon explicit inheritance rules provided for a particular color.

A descriptor 420 used for coloring as contemplated herein may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word_processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or director, and so forth. Static threat detection attributes may also include attributes that are derived by or supplied from other sources. For example, static threat detection attributes may include a reputation for an object 418, which may be expressed in any suitable or useful level of granularity such as with discrete categories (trusted/ untrusted/unknown) or with a numerical score or other quantitative indicator. The explicit identification may, in general, be what an object 418 calls itself, e.g., a file name or process name.

Some actions may transfer colors from the subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has opened, how many times a remote resource was requested or how long a remote resource is connected, and this information may be suitably encoded in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may readily create suitable instrumentation for any computing object so that it may be monitored by the IOC monitor 421.

It will be noted that suitable instrumentation may be coded for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
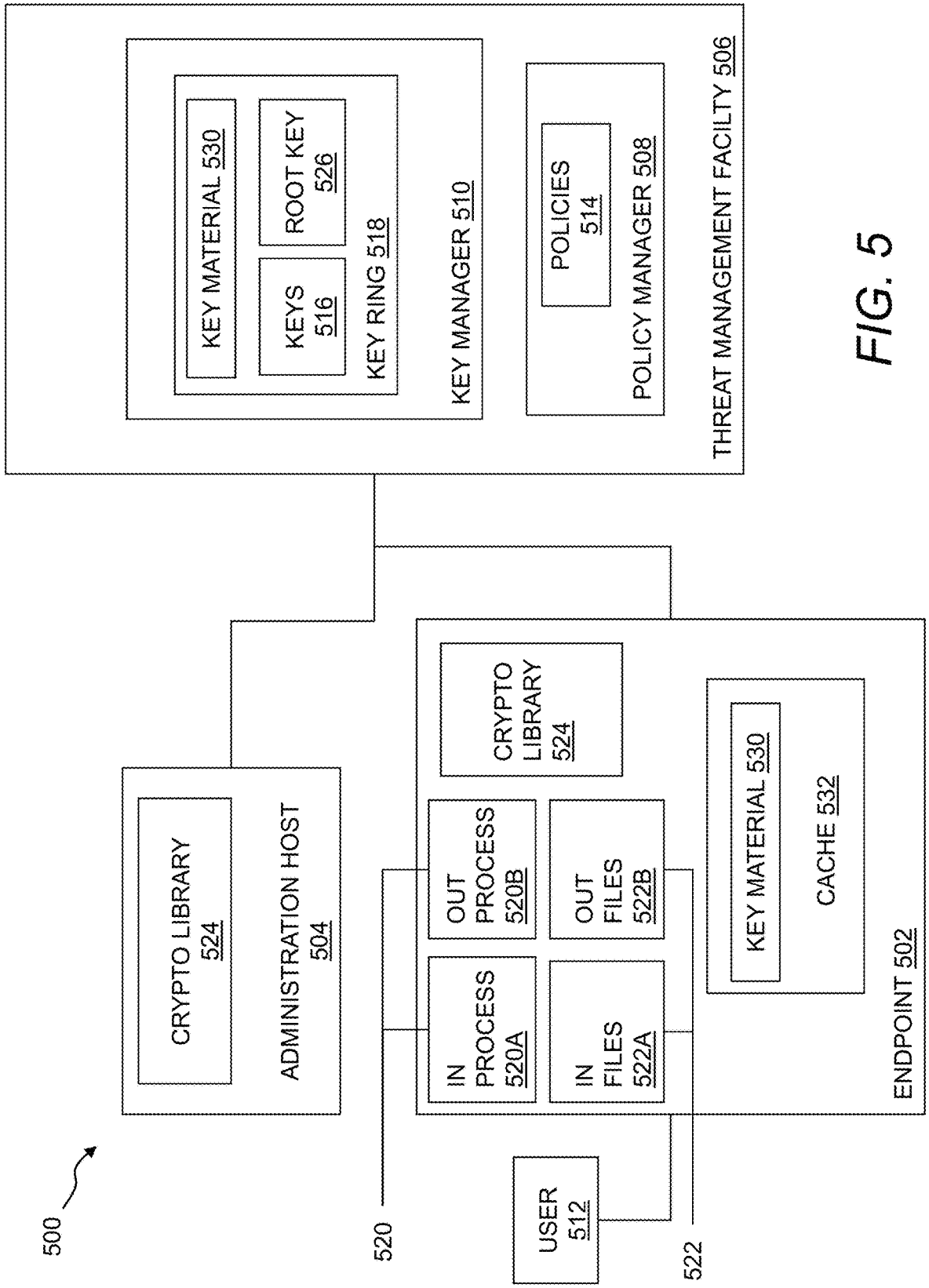
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be disposed in a cloud or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG.

5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus, in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol design, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 210 may include cryptographic keys in a cryptosystem, i.e., decryption keys. In one aspect, the keys 210 may be disposed on one key ring 218 using one root key 220. In general, the keys 210 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional shade of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a key management system as contemplated herein. This system may be still further improved with the addition of a heartbeat system that communicates heartbeats from an endpoint containing health and status information about the endpoint. A suitable heartbeat system is now described in greater detail.

Figure 6:
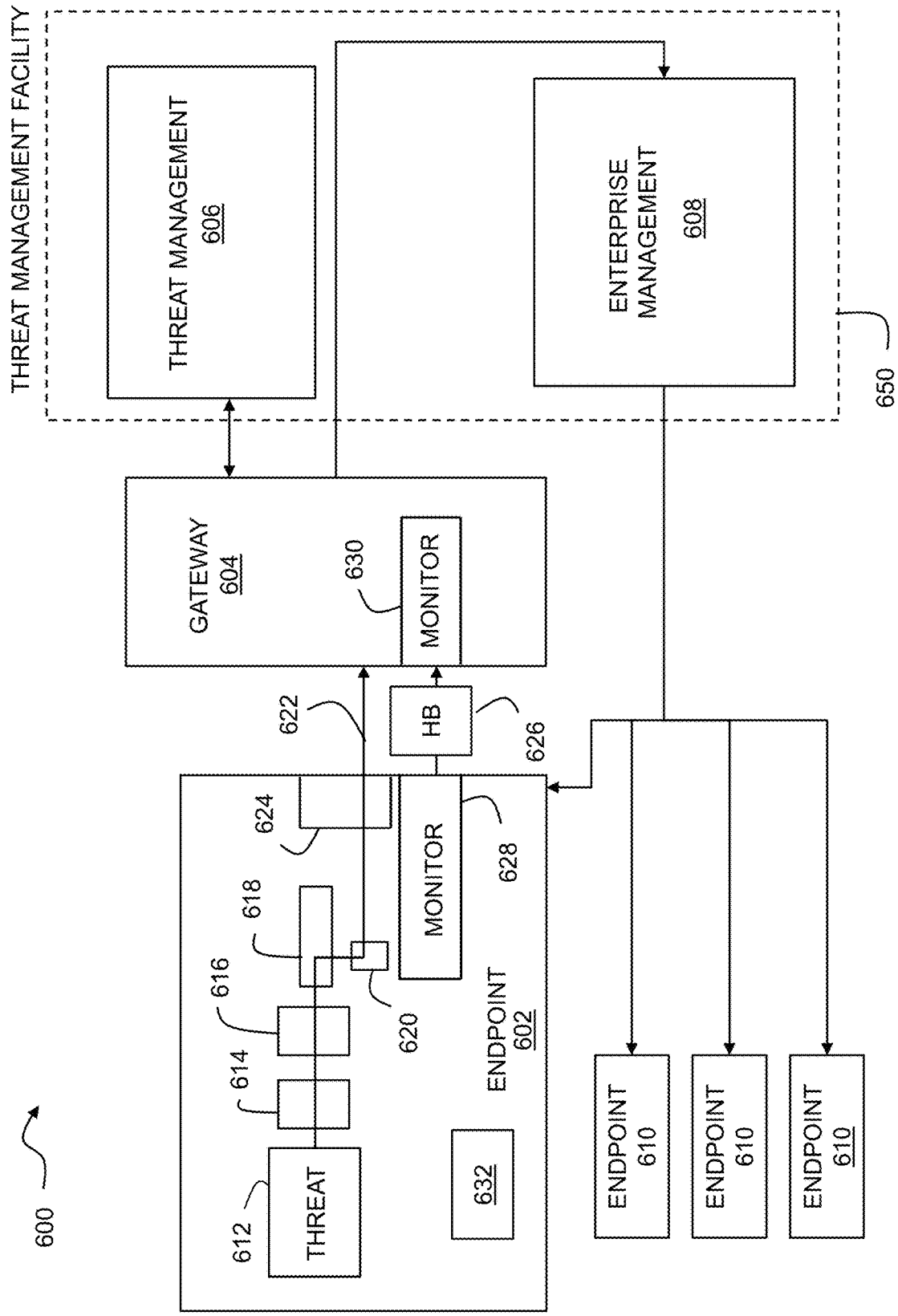
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, logs a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630 at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise policies, and other evaluation techniques.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A disappearance of the heartbeat 626 from the endpoint 602 may indicate that the endpoint 602 has been compromised; however, this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these systems may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for advanced persistent threats as contemplated herein.

Figure 7:
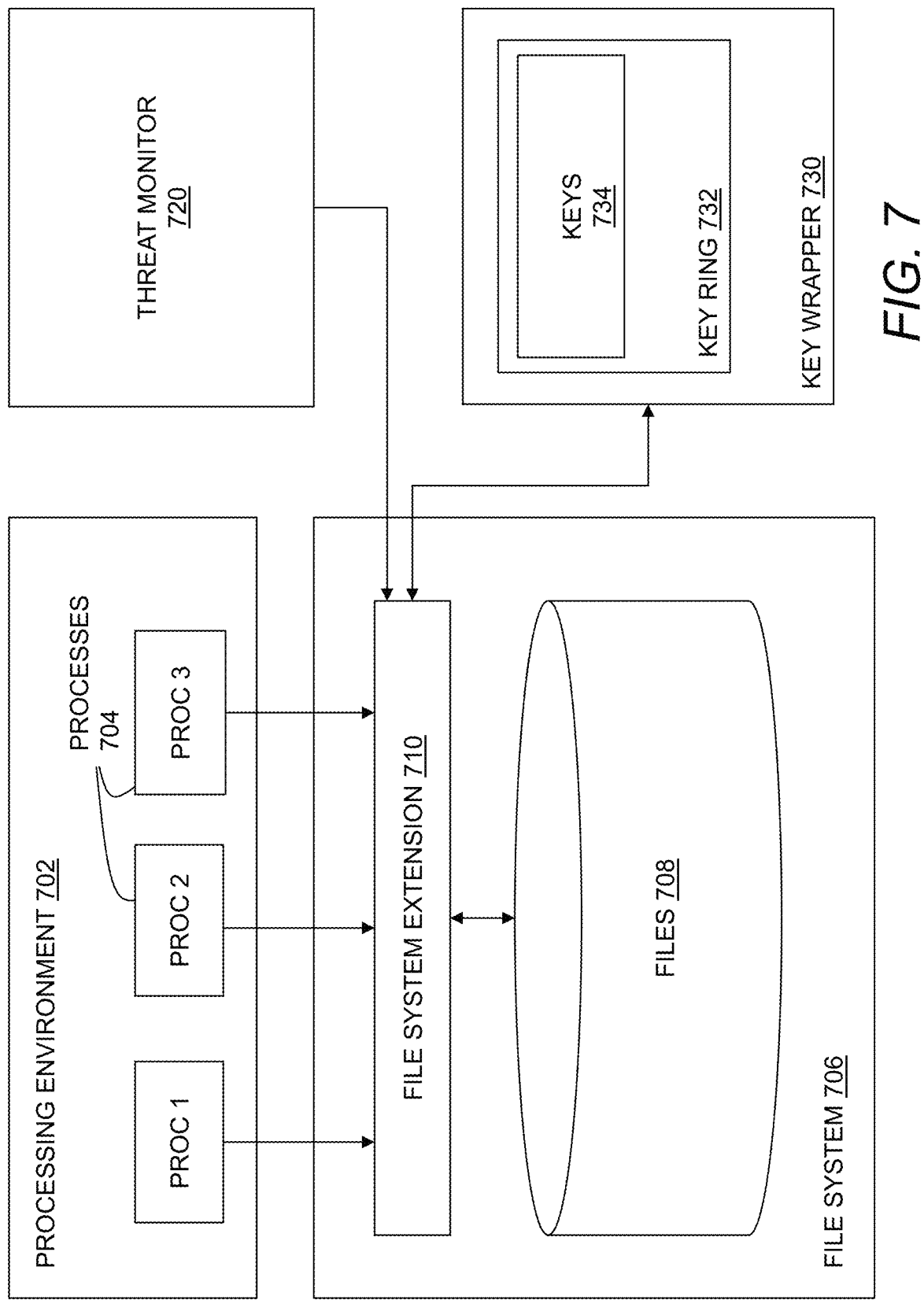
FIG. 7 shows an architecture for endpoint protection in an enterprise network security system.

FIG. 7 shows an architecture for endpoint protection in an enterprise network security system. In general, an endpoint may include a processing environment 702, a file system 706, a threat monitor 720 and a key wrapper 730.

The processing environment 702 may, for example, be any environment such as an operating system or the like suitable for executing one or more processes 704.

Each process 704 may be an instance of a computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. More generally, a process 704 may include any code executing on an endpoint such as any of the endpoints described herein.

The file system 706 is generally associated with an operating system that provides the processing environment 702, and serves as an intermediary between processes 704 executing in the processing environment 702 and one or more files 708 stored on the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE iOS environment). The extension 710 to the files system as contemplated herein performs two concurrent functions. First, the extension 710 communicates with a threat monitor 720 in order to receive updates on the security status and exposure status of the processes 704 or the endpoint. Second the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus, exposure does not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the extension 710 to provide keys 734 for accessing the files 708 at appropriate times, depending, for example, on whether processes 704 are secure or exposed. In one aspect, the files 708 are stored in a non-volatile memory such as a disk drive, or in a random-access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
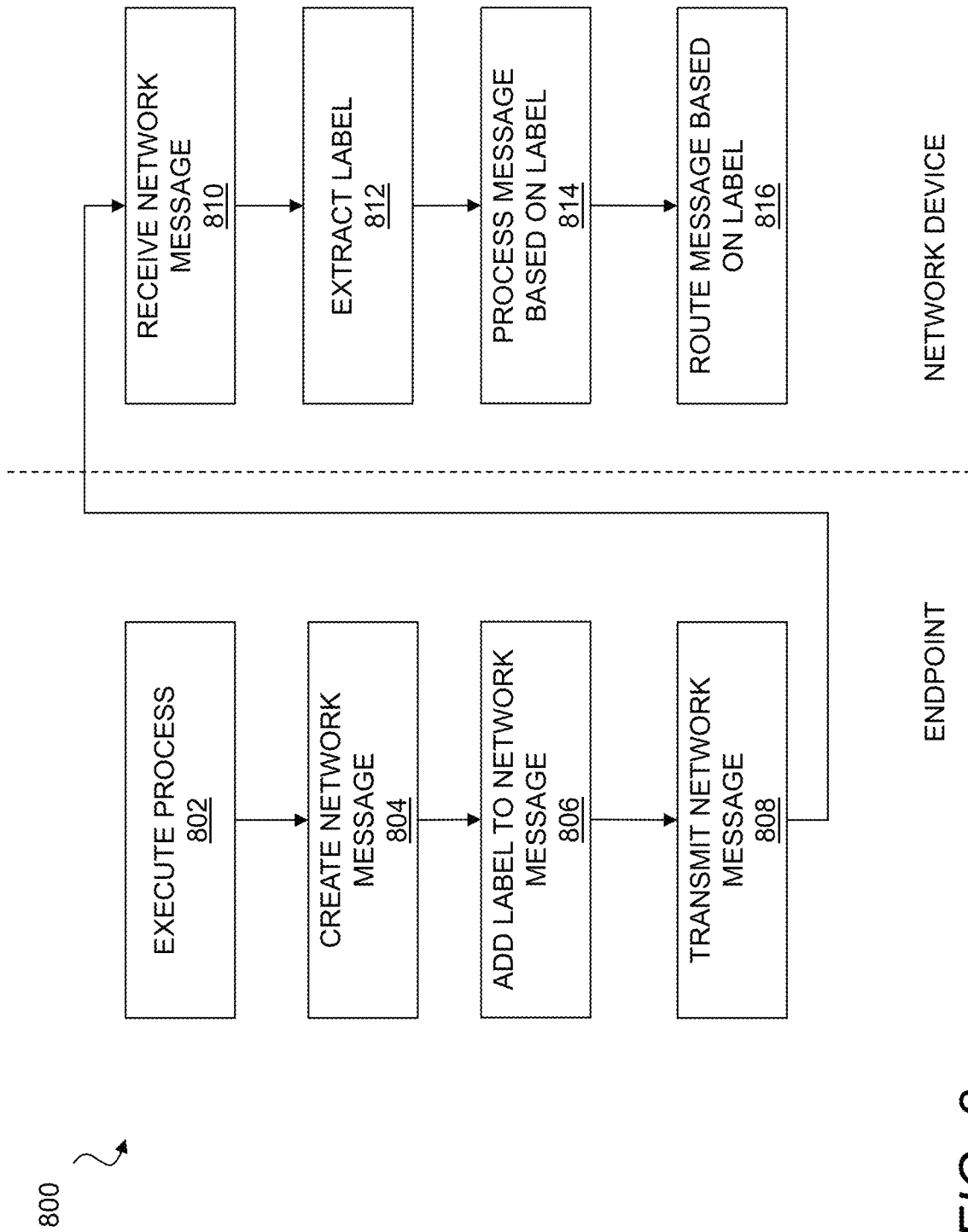
FIG. 8 shows a flowchart of a method for labeling network flows.

FIG. 8 shows a method for labeling network flows. In general, network flows may be explicitly labeled according to source applications (or source processes or the like) to permit tracking and management according to a source after a network flow leaves an endpoint.

As shown in step 802, the process 800 may include executing a process on an endpoint, such as any of the endpoints described herein. The process 800 may, for example, be associated with an application on the endpoint.

As shown in step 804, the process 800 may, at some point during its execution, create a network message. In general, a network message may include a header containing, e.g., a source address, a destination address, and other information necessary or helpful for supporting data network communications between the endpoint and an intended destination. The network message may, for example, be in response to an explicit user input such as directing a browser to a web address, or in response to an implicit user input such as requesting a software update or performing an online backup. This may also or instead be fully automated under any of a variety of normal circumstances. This may also, however, be outbound traffic from malware, and by labeling the network traffic, malicious activity may be more easily detected after the network message has left the endpoint.

As shown in step 806, the process 800 may include adding a label to the network message. This may, for example, include generating a label that includes context information related to the network message, such as an identifier for an application or process. This identifier may be cryptographically signed or encrypted to protect the contents thereof, and may include additional information about, e.g., the status of the endpoint, the reputation of the application or the destination address, or any other information necessary or helpful for making improved routing or processing decisions about network traffic. Thus, the process 800 may include cryptographically signing the label, encrypting the contents of the label, or any other suitable cryptographic steps. Packet structures for network communication are generally known, and may for example include a header with control and routing information, along with a payload of data for communication to a recipient. The header may include various items of information useful for network communications such as a preamble that identifies a beginning of the packet, a source address, a destination address, a sequence number (e.g., for spreading a large file or the like across multiple packets/payload), a packet length, a packet type, a cyclic redundancy check or other checksum or the like, and any other useful information. A label as contemplated herein may be usefully incorporated into the header of such a packet in any suitable format and any suitable location. For example, internet protocol version '4' and version '6' both permit optional information to be included in a packet, and the label may be included as optional information. For example, the label may be included by encapsulating a packet within another packet that includes label information. For example, a label may be included by repurposing a portion of a packet header. For example, a label may be included by injecting additional label data into the packet, or for example, at the start of the data portion of the packet.

As shown in step 808, the process 800 may include transmitting the network message from the endpoint, e.g., through a network interface or the like to a data network.

According to the foregoing, in one aspect there is disclosed herein an endpoint configured as described above to label outbound network messages to identify a source process or application. Thus, there is disclosed herein a system comprising an endpoint including a network interface configured to couple the endpoint in a communicating relationship with a data network. The endpoint may include a memory and a processor such as any of the memories, processors, or processing circuitry described herein. In general, the processor may be configured to execute instructions stored in the memory to perform the steps of generating a label for a network message created by a process executing on the endpoint and associated with an application, where the network message includes a payload and a header and where the label includes an identifier for the application, adding the label to the header of the network message, and transmitting the network message through the network interface to a remote location on the data network. At the same time, a network device or the like may be configured to receive the network message and process it in a variety of ways, as further discussed herein.

As shown in step 810, the process 800 may include receiving a network message from an endpoint at a network device. The network message may be the network message described above, or any other packet or other data structure including a payload of data and header information such as a source address for the endpoint and a destination address for an intended recipient of the network message. The network message may also include a label that identifies an application that generated the network message on the endpoint. This may for example, be determined by examining the properties of a process associated with the application, or otherwise relating a process or other source of the network message with a particular application.

It should be understood that this receiving step may be performed at a wide range of network devices. In one aspect, this may include a router, a gateway, a firewall, a threat management facility for an enterprise, or any other network device for handling network communications to and/or from the endpoint. This may include a network device on a local network used by the endpoint, a cloud-based network device used in an enterprise network security system, a physical gateway between an enterprise network and an external network, or some combination of these. In one aspect, the firewall may be a local firewall for the endpoint that is configured to locally enforce routing rules based on information obtained in the label.

While a source application may be a useful item of information to be included in the label, it will be understood that other context information may also or instead be included. For example, this may include the identity of a process of an application that created the network message, a user of the process that created the network message, or other identity or source information, such as a name or other identity of the endpoint. For the endpoint name this may include a fully qualified name such as a device identifier that is unique within the domain of the endpoint. This may also or instead include a reputation of the application or process that created the network message if this is locally available to or determined by the endpoint. In this context, the reputation may specify a particular reputation (e.g., known good, known bad, suspected bad, or the like) or the reputation may specify an absence of specific information (e.g., unknown). This may also or instead include health information about the endpoint or a process, coloring information for the process that identifies exposure of the process to other processes or data on the endpoint, reputation or exposure information for data used by the process, and so forth. The label may include status information related to the endpoint, such as an activity level of the endpoint, a status of software installed on the endpoint, a security condition of the endpoint (e.g., anti-malware software installed, a warning state of control software, and so forth), or other useful status indications in evaluating context of the network traffic and the like.

It should also be understood that, while the process 800 described herein may involve proactive labeling of network flows, or labeling of all network flows from an endpoint, the process 800 may also or instead be adapted to be responsive to detection and query by a network device, such as a threat management facility, a firewall, a gateway, a server, or the like. For example, a malware attack that exfiltrates data may begin with a file upload using a file transfer protocol (FTP) request or an HTTP PUT. When upload activity from the endpoint is detected at a network device, this may cause the network device to actively query the endpoint to request information about the application that requested the upload, such as an identifier of the application, a reputation of the application, or the like. For example, the network device may direct the endpoint to label all traffic from a user, from an application, from a process, or from a device. For example, the network device may direct the endpoint to label all traffic from processes that are currently active. For example, the network device may direct the endpoint to label all traffic from users that are currently active. For example, the network device may direct the endpoint to label all traffic from a user associated with a process. For example, the network device may first direct the endpoint to label all network traffic to identify a process. The network device may then identify a process of interest, and direct the endpoint to label all traffic associated with the process of interest, or associated with a user associated with the process of interest. These and other similar adaptations are intended to fall within the scope of this disclosure.

The process may also or instead be adapted to be responsive to detecting suspicious activity at the endpoint. Upon detecting suspicious activity, the endpoint may begin to label network traffic associated with the suspicious activity. The label may indicate that the labeled network traffic is associated with suspicious activity. The label may provide additional context for the network traffic and associated application or process. A network device receiving labeled network traffic from an endpoint may then take additional measures, such as observing and recording the content of the network traffic, inspecting the content of the network traffic, verifying the reputation of the destination(s) of the network traffic, verifying the reputations of the application(s) generating the network traffic, determining whether there is other network traffic from other devices on the network directed to the destination, notifying an administrator, and so on.

The process may also or instead be adapted to be responsive to detecting suspicious activity at an endpoint that hosts one or more virtual machines. Upon detecting suspicious activity, the endpoint may label network traffic with context associated with the virtual machine. For example, the label may include an identifier for the virtual machine, e.g., if the virtual machine is not using a unique network address. The label may indicate that the labeled network traffic is associated with suspicious activity. The label may provide additional context for the network traffic and associated application or process. A network device, or a virtual machine host, or another virtual machine on the same host that is receiving labeled network traffic from the virtual machine, may then take additional measures.

The process may also or instead be adapted to be responsive to detecting suspicious activity at a network device. Upon detecting suspicious activity, the first network device may begin to label network traffic associated with the suspicious activity. The label may indicate that the labeled network traffic is associated with suspicious activity. The label may provide additional context for the labeled network traffic that may be available at the network device, for example, that the traffic transited the network device, or came from a particular subnet, or was recorded by the network device. The label may provide a reference to additional information collected by the network device about the suspicious network traffic. For example, the reference may be to a recording of the content of the network traffic. A network device receiving labeled network traffic from an endpoint may then take additional measures, such as observing and recording the content of the network traffic, inspecting the content of the network traffic, verifying the reputation of the destination(s) of the network traffic, verifying the endpoint(s) generating the network traffic, determining whether there is other network traffic from other devices on the network directed to the destination, notifying an administrator, and so forth.

As shown in step 812, the process 800 may include processing the network message on a network device that receives the network message to extract the label. This may, for example, include cryptographically verifying an authenticity of the label or a source of the label, decrypting the label to extract encoded information, or any other form of processing.

As shown in step 814, the process 800 may include processing the network message at a network device based on the label. While routing is generally contemplated as described below, a number of additional processing steps may usefully be performed. For example, the process 800 may include caching the label, for example associated with the application and a reputation of the application on the network device.

As shown in step 816, the process 800 may include routing the network message based on the application (or process or other source on the endpoint) that generated the network message. The routing may be a conditional routing based on the information in the label, or information determined from the information in the label. This may include routing rules or combinations of rules that may be based, for example, on user identity, process/application, reputation, and so forth. For example, the processor may be further configured to perform the steps of determining a reputation of the application and routing the network message to the destination address conditionally based on the reputation of the application that generated the network message. That is, if the reputation of the application is known and good, then the traffic may be routed as requested by the endpoint according to the routing information in the network traffic. However, if the reputation of the application is known and bad, then the traffic may be sequestered in any suitable manner. For example, the traffic may be dropped. Additional steps may be taken. For example, when the reputation of the application is uncertain, or other information is collectively inconclusive, a sandbox based on the endpoint may be created and used to communicate with the destination address to test for malicious activity. In another aspect, where information is inconclusive, the network traffic may be permitted, but more aggressive monitoring may be initiated until a conclusive evaluation of the source application can be obtained. For example, the network device may observe and record the network traffic, inspect the content of the network traffic, verify the reputation of the destination(s) of the network traffic, verify the reputations of the application(s) generating the network traffic, determine whether there is other network traffic from other devices on the network directed to the destination, notify an administrator, and so forth. In another aspect, an indication of malware or other compromise on the endpoint may be used as a basis for initiating remediation of the endpoint.

Likewise, in the case of uncertain application reputation, some users may have additional permissions with respect to network traffic routing decisions. For example, a user designated as an accounting user, who may have access to more sensitive information may have traffic blocked, while a user in sales or customer support may be permitted with additional monitoring or safeguards.

In this context, it will be appreciated that an application or process identifier in the label may be used as a single item of information in a broader context for the network message. For example, the label may include a health status of the endpoint, other status information of the endpoint, a user identifier for a user of the application or a related process (e.g., automated machine activity—e.g., daemon, backup service—might be treated differently from human activity, categories of users may be treated differently than others, and the like), a name of the endpoint, reputation information for the source application, and so forth. Thus, the application identifier may be useful by itself, but the accuracy of attack detection may be improved still further by using additional context for the network message, which may include various pieces of contextual information inserted directly into the label for the network message, as well as other information available to a network device called upon to make a routing decision for a particular network message (e.g., allowing, blocking, rerouting, and so forth). The routing decision may include blocking the message. All such variations that would be apparent to one of ordinary skill in the art are intended to fall within the scope of this disclosure.

According to the foregoing, there is disclosed herein a system that includes a network device that may use labels provided by endpoints that identify source applications or processes and the like for network messages. In one aspect, a system disclosed herein includes a network device including a network interface configured to couple the network device in a communicating relationship with a data network that includes an endpoint, a memory on the network device, and a processor on the network device. The processor may be configured to execute instructions stored in the memory to perform the steps of receiving a network message from an endpoint through the network interface, where the network message includes a source address for the endpoint, a destination address for an intended recipient of the network message, a label that identifies an application that generated the network message on the endpoint, and a payload of data. The processor may be further configured to execute instructions stored in the memory to perform the steps of processing the network message to extract the label, and routing the network message based on the application that generated the network message.

In one use of this system, the processor may be configured to determine a reputation of the application and to route the network message to the destination address conditionally based on the reputation of the application that generated the network message, for example as described above. Where information such as user information is available, the processor may be further configured to extract a user identifier from the label that identifies a user of the application on the endpoint, which may also be usefully employed for various intelligent routing processes as contemplated herein.

Figure 9:
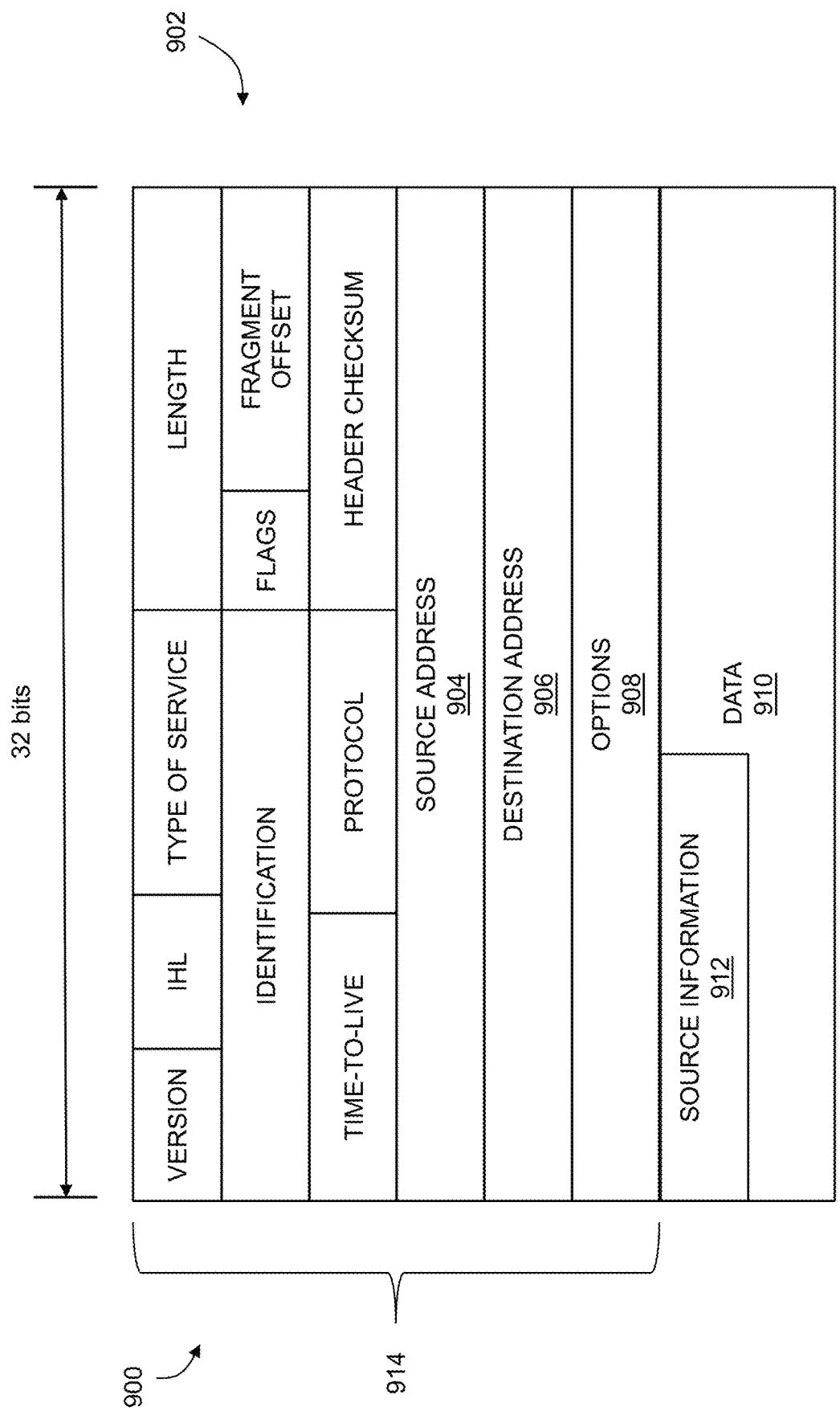
FIG. 9 illustrates an Internet Protocol packet.

FIG. 9 illustrates an Internet Protocol (IP) packet format. In general, the packet 900 may include preamble information 902, a source address 904, a destination address 906, option information 908, and a payload of data 910. As described herein, the source address 904 may generally specify a network location that originated the packet 900, but may not provide any more specific information about a source user, a source machine, a source application, and other information as contemplated herein.

In one aspect, this information may be usefully added to the packet 900 by inserting relevant information into the option information 908, or in any other suitable location within the packet 900 or packet header. For example, the Internet Protocol version '4' (IPv4) packet may be configured such that additional information may be included in the packet header, which may be specified by the internet header length (IHL) data and an option type field. This field is identified in FIG. 9 as option information 908. In ordinary use, the option type field is sub-divided into a one-bit copied flag, a two-bit class field, and a five-bit option number. These taken together form an eight-bit value for the option type field. In one aspect, this field may be used to specify additional source information, or to identify a link or pointer to a location where such information can be obtained. For example, up to 60 bytes of optional, additional data may be included in the header, and a label may be included in this additional data. For example, where the packet is used within an enterprise domain, a portion of the header may be used by any source-aware networking components to identify a source, or to provide a pointer to source information which may, for example, be within the data 910 of the packet 900, within a separate packet, or stored at a network-accessible location such as a gateway, firewall, or threat management facility. An internet protocol version '6' (IPv6) packet may include a 20-bit flow label field, as well as the availability to provide extension headers to indicate optional information. For example, the flow label field may be used to include a 20-bit label. For example, a 'Destination Options' extension header may be used to include label information that is not required to be examined by intermediate networking devices, but may be examined by a gateway or a final destination.

In one aspect, the option information 908 of an IPv4 packet may be used to designate the packet as containing source information 912 within the data 910 of the packet 900. Thus, for example, the first byte or bytes of the data 910 may be used to specify source information at any desired level of granularity including a user, a machine, an application, a process, and so forth, as well as combinations of these. The source information 912 within the data 910 may also or instead provide a link to a resource within the enterprise network where source information for the packet 900 can be retrieved. It will be understood that source information, whether stored within source information 912 in the packet 900, within the option information 908 in the packet header 914, or stored in some remote resource, may in general be encrypted to secure source information against unauthorized access, and/or the source information may be digitally signed to permit verification of authenticity with reference to a trusted third party or internal trust authority.

In one aspect, source information 912 may include a reference to a process or other context information for an endpoint. The endpoint may communicate context information to a network device through a separate channel, for example using the heartbeat 314 channel (see, e.g., FIG. 3). The context information may be stored on the endpoint, and the source information 912 in the packet 902 may include a reference to the context information. Thus, context information may be provided via a first channel, and a reference to the context information may be provided in a packet label. For example, each process on an endpoint may be assigned an identifier, and the identifier communicated to the network device with the operating system process information when the process is detected. The identifier may be included in the label. In this way, machine-specific information may not be included in the packet, but only a reference to the information. In some implementations, the identifier is changed periodically.

A flag within the packet header 914 may also or instead be used to identify when (and where) source labeling information is present for a packet 900.

In one aspect, the packet 900 may be configured to be compatible with other IP network traffic, so that packets can move into and out of the enterprise network without additional handling, such as by inserting source information 912 into the data 910 of the packet payload as illustrated in FIG. 9. In another aspect, packets may be processed at the perimeter of the enterprise network, e.g., at a VPN gateway, enterprise network gateway, or any other perimeter network device, or other suitable router, switch, or other network device inside the enterprise network, with non-IP compliant packet data and/or structures being removed for outbound traffic, and where possible or applicable, reinserted for inbound traffic. In another aspect, traffic from outside the enterprise network may use a predetermined flag or the like to indicate that a packet contains source information compliant with a format for source information used within the enterprise network. More generally, any suitable techniques may be used to permit communication of source context information with network traffic within a network, while ensuring compatibility with an external network architecture such as TCP/IP or the like, and all such techniques that would be apparent to one of ordinary skill in the art are intended to fall within the scope of this disclosure.

Figure 10:
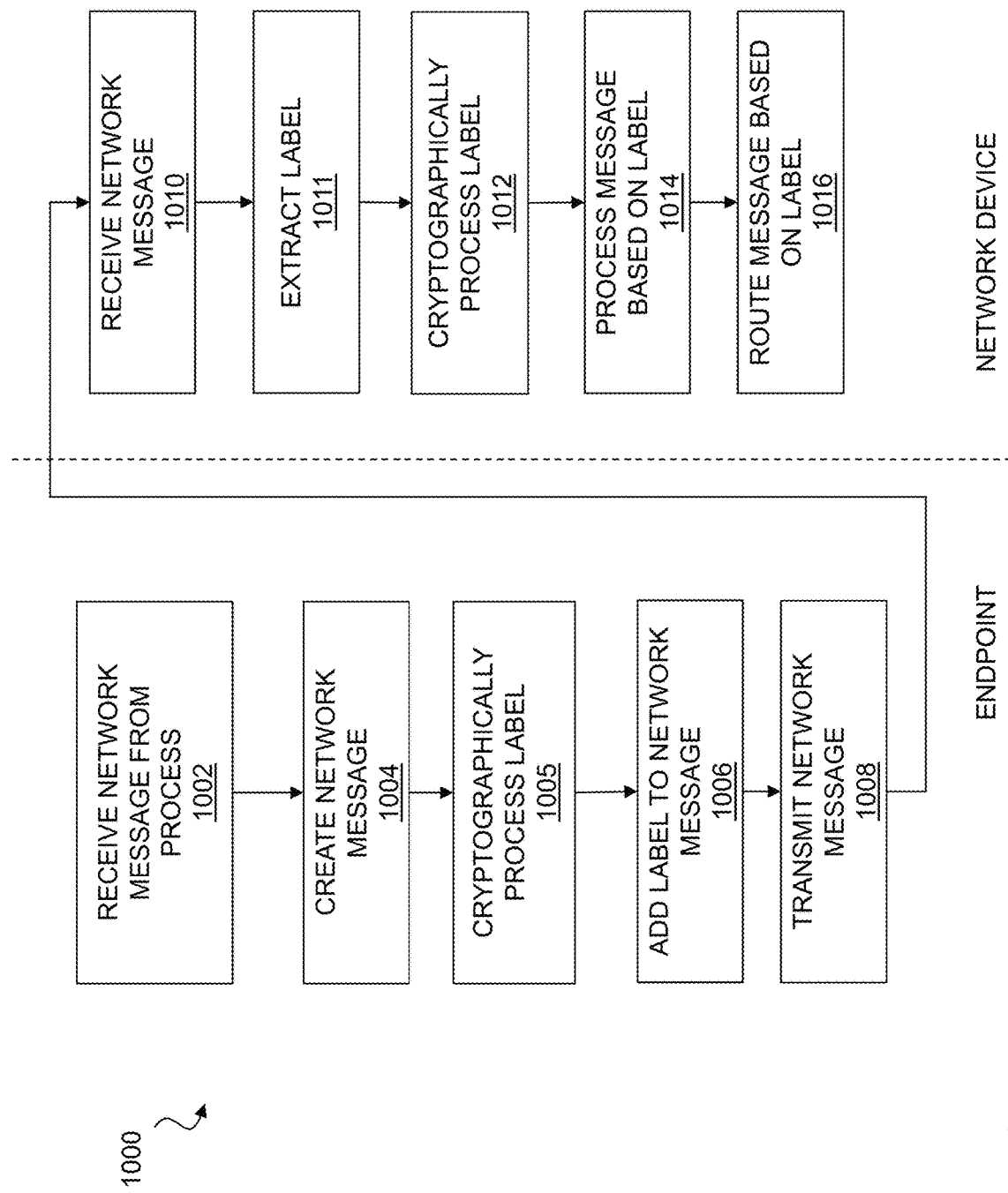
FIG. 10 shows a flowchart of a method for secure labeling of network flows.

FIG. 10 shows a method for secure labeling of network flows. A system for labeling network flows is generally described herein (e.g., above). A network enterprise security system may be improved by instrumenting endpoints to explicitly label network flows with cryptographically secure labels that identify an application or other source of each network flow. Cryptographic techniques may be used, for example, to protect the encoded information in the label from interception by third parties or to support cryptographic authentication of a source of each label. As discussed above, a label may provide health, status, or other heartbeat information for the endpoint, and may be used to identify compromised endpoints, to make routing decisions for network traffic (e.g., allowing, blocking, or re-rerouting), to more generally evaluate the health of an endpoint that is sourcing network traffic, or for any other useful purpose.

As shown in step 1002, the method 1000 may include receiving a network message from a process executing on the endpoint. In general, the process may be based on an application on the endpoint. As described herein, the network message may be a packet or the like that includes a payload and a header, and that is addressed to a remote location (e.g., using an Internet Protocol address, Uniform Resource Locator (URL), or other address) accessible from the endpoint through a data network.

As shown in step 1004, the method 1000 may include generating a label for the network message. As described herein, the label may include information about a source of the network message on the endpoint, e.g., an application, a process, a user or the like on the endpoint that originated the network message, or an identity of the endpoint itself, such as by reference to a globally unique name of the endpoint within an enterprise domain. Thus, for example, the label may include an identifier for the application that generated the network message, an identifier for the endpoint that generated the network message, the identifier of a user of the process on the endpoint that generated the network message, or any other useful source identifier. The label may also or instead encode useful information about the status of the endpoint. For example, the label may include a health status of the endpoint or any other useful information.

As shown in step 1005, the method 1000 may include cryptographically processing the label information. This may, for example, include cryptographically signing the label to provide a signed label information. This signed label may be used, for example, to verify an identity of the endpoint, an identity of an application on the endpoint, an identity of a process executing on the endpoint, or any combination of these that is useful for identifying a source of the network message. This signed label may be verified, for example, using a public key for the source that is signing the label, or through any other suitable relationship with a trusted third party capable of cryptographically authenticating the source. Cryptographically processing the network message may also or instead include encrypting the label with a cryptographic key to provide an encrypted label that is secured against interception by third parties.

As shown in step 1006, the method 1000 may include adding the cryptographically process label (e.g., the signed label and/or encrypted label) to the header of the network message.

As shown in step 1008, the method 1000 may include transmitting the network message from the endpoint to the remote location through the data network.

As shown in step 1010, the method may include receiving the network message from the endpoint at a network device such as a gateway, a firewall, a router, a switch, or a threat management facility, any of which may be a hardware device physically positioned between the endpoint and an external data network, or a cloud-based device accessible to the enterprise network for the endpoint through a remote service or resource. The network message may be any of the network messages described herein, and may include an encrypted label that identifies an application that generated the network message, and/or a signed label that can be used to verify a source or the security of the label.

As shown in step 1011, the method 1000 may include processing the network message on the network device to extract the label.

As shown in step 1012, the method may include cryptographically processing the label. This may, for example, include verifying a source of the label or decrypting the label with a cryptographic key to provide a decrypted label.

As shown in step 1014, the method 1000 may include processing the network message based on the label, for example, by caching label or payload contents on the network device, requesting a scan or remediation of the endpoint that provided the message, or any other responsive processing. This may, for example, include receiving an indication that the endpoint is compromised, e.g., either embedded within the label or through another communication channel. For example, the network device may receive a heartbeat from the endpoint, and the indication of compromise may be inferred from an absence of the heartbeat when expected, or the indication of compromise may be explicitly added by the endpoint (e.g., by a security agent executing on the agent) into the heartbeat. This indication of compromise may be used as a basis for preventing routing of additional network traffic from the compromised application through the network device. This routing or forwarding restriction may be maintained, for example, until the expected heartbeat resumes from the endpoint/application, or until an explicit remediation measure is completed.

By labeling network flows by application in this manner, the network device that is handling the network flow can advantageously make routing or blocking decisions on an application-by-application basis rather than for an entire endpoint, thus limiting network restrictions to particular applications that are compromised while permitting other applications on an endpoint to continue normal network communications, or optionally network communications with some heightened level of scrutiny or security.

As shown in step 1016, the method 1000 may include routing the network message based on the decrypted label, for example using any of the techniques described herein.

According to the foregoing, there is disclosed herein a system for secure labeling of network flows. The system may include an endpoint including a network interface configured to couple the endpoint in a communicating relationship with a data network, a memory on the endpoint, and a processor on the endpoint. The processor may be configured as described herein to execute instructions stored in the memory to perform the steps of receiving a network message from a process executing on the endpoint, where the process is based on an application and where the network message includes a payload and a header. The network message may be addressed to a remote location accessible from the endpoint through a data network. The processor may further be configured to execute instructions stored in the memory to perform the steps of generating a label for the network message, where the label includes information about a source of the network message on the endpoint, encrypting the label with a cryptographic key, thereby providing an encrypted label, adding the encrypted label to the header of the network message, and transmitting the network message from the endpoint to the remote location through the data network. Encrypting the label may include cryptographically signing the label or otherwise cryptographically processing the label as described herein.

Figure 11:
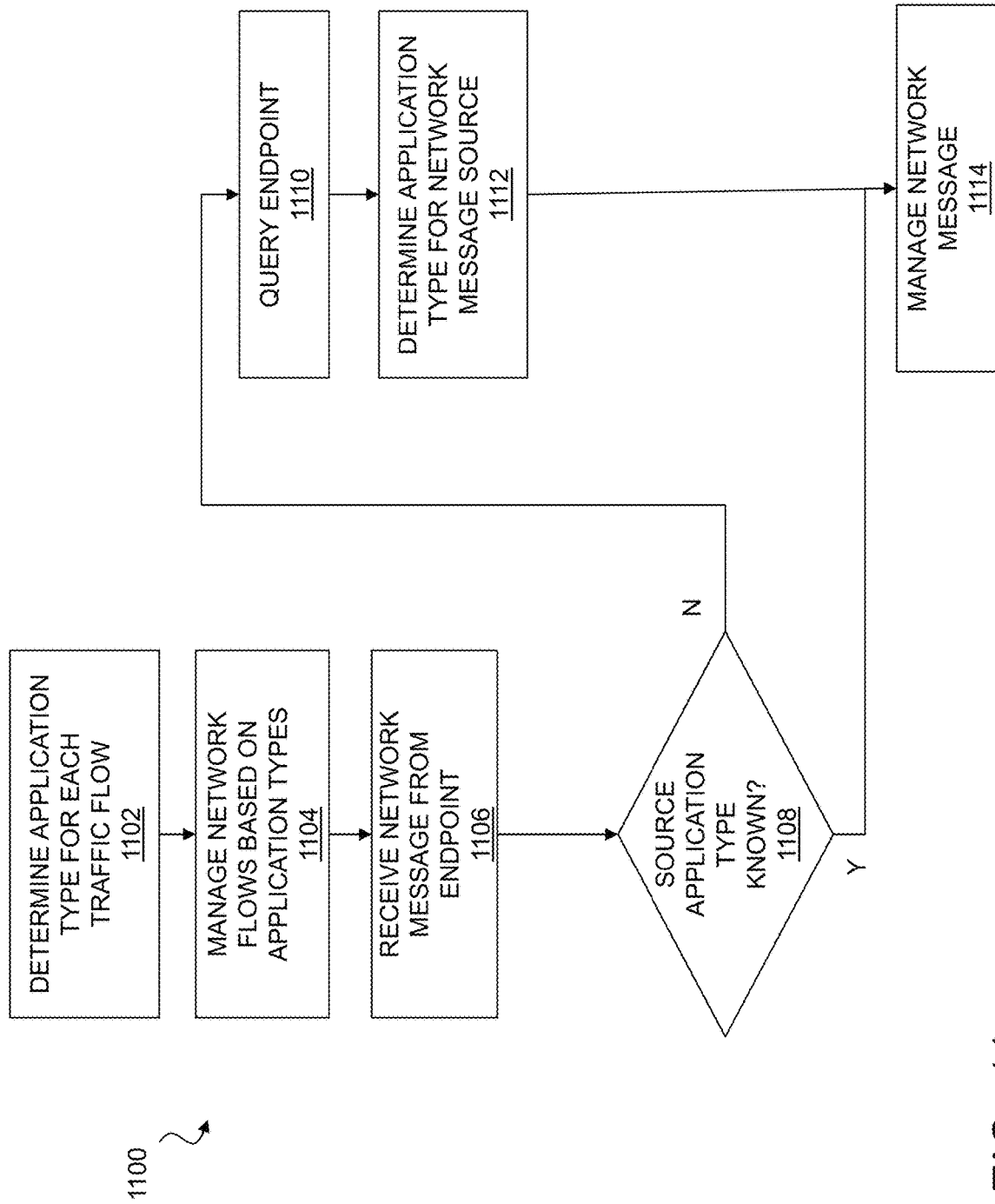
FIG. 11 shows a flowchart of a method for managing network flows.

FIG. 11 illustrates a method 1100 for managing network flows. An enterprise network security system for managing network flows is generally described herein (e.g., above). Such a network enterprise security system may be improved by managing network traffic based on the application types corresponding to the network traffic flows.

Traditional application control mechanisms, such as unified threat management (UTM), Next-Generation Firewall (NGFW), and secure web gateways, may be insufficient at identifying application traffic as it traverses a network device. Traditional methods are reactive, using network signatures, inferences based on network-level metadata, or the like to identify traffic. Additionally, traffic is increasingly traversing network gateways in an encrypted form such as HTTPS, which may require a gateway with corresponding cryptographic capabilities and keys in order to decrypt and interpret this traffic. Technologies such as certificate pinning can also interfere with decryption at intermediate network devices such as gateways. At the same time, bespoke corporate applications, database systems, and networking configurations create corporate-specific environments that defy global characterization. With network traffic becoming increasingly unrecognizable in transit, policies aimed at managing network traffic become increasingly ineffective.

Against this backdrop, an enterprise gateway or other network device may usefully employ a secure connection between the device and an endpoint to communicate information to assist in managing network traffic and connections. In particular, an endpoint can be configured to track applications associated with network traffic, and to report related information, e.g., through a secure out-of-band channel such as a heartbeat, to a gateway or other network device responsible for managing network traffic. Through a secure communication channel, the network device, such as a gateway, may, for example, directly query an endpoint security agent of the internal traffic source and collect the application name and additional application data required to make a positive application identification. In another aspect, the endpoint may periodically communicate this information to the network device in a heartbeat or other periodic communication. With this information, the network device may enforce security policies. If the application is unknown, a snapshot of the traffic may be collected and sent to a threat management facility where the application can be identified through signatures and application lists published to the network device. This application identification method may be particularly effective because the method is resilient to encrypted traffic, and it is uncommon and undesirable for an application provider to change application names, path names, file names, installation dates, uninstallers, application IDs and so forth.

In one aspect, upon receiving a network message with an unknown application type from an endpoint, a network device may make a request to the endpoint to send additional information about the application to allow the network device to identify the unknown application, e.g., to identify a type of the application that can be used for managing network traffic. The information about the application may be used by the network device to determine an application type upon an initial network message or connection from the application, or to change a categorization or characterization of the application on the network device. For example, if an application or a specific connection changes its packet communications and the network device is unable to determine the originating application or application type, the network device may respond in a separate channel and query the endpoint for identifying information, identify the application type, and classify or manage the network message appropriately.

The classification at the network device may be used to allow the traffic if it is a known application, for example with valid signature, or to block, quarantine, remove, delete, or otherwise prevent transmission of the message. The classification at the network device also may be used to tie that communication stream to that application, so that the application may be controlled or managed at the network device, such as limiting the application's bandwidth, assigning the application to a priority for VOIP, or to otherwise control the routing and transmission of the application's network messages.

It will be appreciated that the classification into a particular network type may occur automatically, e.g., based on information within the network traffic flow or information received from the endpoint in response to an explicit query. In another aspect, a notification of unknown type may be transmitted using any suitable communication medium (e.g., through a text message, electronic mail, or within the dashboard described herein) to an administrator so that a manual classification can be provided from currently known application types, or so that a new application type can be created as necessary or desired.

As shown in step 1102, the method 1100 may include determining an application type for each traffic flow at or received by a network device, such as each of a number of network traffic flows at the network device that receives the number of network traffic flows from endpoints within an enterprise network. This may include, for example, determining an application type using any of the techniques described herein, or otherwise extracting inferences based on communication protocols, traffic content, and so forth.

The network device may be any logical or physical device positioned between an endpoint (or group of endpoints such as within an enterprise network) and a network. For example, the network device may be a gateway such as an enterprise gateway positioned between a collection of endpoints in an enterprise and an external network such as the Internet or other wide area network(s). The network device may also or instead include any switch, router, bridge, gateway, firewall, or the like that manages network traffic between a source and destination within a network. Other devices such as physical interface hardware (e.g., network interface cards, wireless networking devices, and so forth) are also sometimes referred to as network devices, and are considered to be network devices wherever such devices provide a useful intermediate point for managing network traffic as contemplated herein. A network device may also or instead include a cloud-based gateway or other cloud-based device or platform that remotely manages traffic for an enterprise or other network or collection of endpoints. A network device may also or instead include a logical or physical device local to the endpoint, such as a software firewall on the endpoint that controls traffic to and from programs executing on the endpoint.

In general, determining an application type may include querying an endpoint to receive identifying information as described herein. However, other techniques may also or instead be employed. For example, an endpoint may usefully label network messages with explicit application identifiers that can be extracted and used at the network device, such as using IP v.6 flow labels or any other suitable in-band or out-of-band labeling techniques. In another aspect, an endpoint may explicitly report application usage or application type usage, e.g., on a socket-by-socket or other basis so that each network message (e.g., packet or other discrete data item) can be allocated to an application type based on information previously received from an endpoint. In another aspect, the network device may store historical information for network flows so that each IP address and socket has an application type allocated to it, at least until that allocation is explicitly changed or the connection is terminated. In another aspect, an application type may be inferred. For example, for unencrypted network messages, it may be possible to extract useful information from the payload or packet header that can be used to identify a type of an originating application. In another aspect, the type may be inferred from other information about the traffic flow, such as the identity of a source endpoint or a protocol for the payload. Other information from the endpoint and/or application, such as an install date, the presence or location of uninstall routines, certificates associated with the application, and so forth, may also or instead be usefully employed to aid in the identification of traffic types, as well as the detection of potentially suspicious network traffic. More generally, any technique for determining an application type for a network flow, based on either explicit labels or implicit message characteristics, may be usefully employed with the techniques described herein.

It will also be understood that the application types may be organized in any hierarchical or other fashion, and may include any number of different separate, overlapping, inclusive, or exclusive types. For example, application types may be allocated along functional or organizational boundaries. Thus, types such as engineering, financial, management, personnel, and the like may be used to organize applications that might engage in network communications. Other attributes, such as software vendors or providers may also or instead be used to categorize software. In another aspect, the application types may be allocated among broad, commonly used categories of software. Thus, for example, the types may include word processing, presentation, spreadsheet, computer automated design, accounting, calendar, electronic mail, messaging, web browsing, media rendering, and so forth. These types may be further organized into more general categories such as productivity tools (email, browser, word processing, etc.), design tools (CAD programs, simulation programs, etc.), database tools, financial tools, and so forth, or these application types may be divided into more granular categories such as specific application names or file formats. As noted herein, applications may also usefully be categorized according to communication protocols or any other metadata or the like. More generally, the application types may include any of the categories or labels described herein, or any other group of categories or the like useful for managing network traffic flows as contemplated herein.

In another aspect, an application may be unrecognized, and/or may have no known application type. In this case, an administrator may assign an existing category or create a new category, e.g., using a dashboard described herein.

As shown in step 1104, the method 1100 may include managing the network flows based on the corresponding application types. In one aspect, network traffic flows may be managed by applying a security policy to each of the network traffic flows according to the application type, which may provide for message handling such as blocking traffic, decrypting traffic, encrypting traffic, or creating alerts to an administrator when certain traffic is detected. More generally, a security policy may specify the manner in which the network device treats and processes messages having known, or unknown, application types. This may, for example, include enterprise or other policies regarding allowable network usage. This may also or instead include local rules for the network device that control whether to forward or drop packets according to rules for specific application types. This may also or instead include enterprise or other policies for allocating or regulating bandwidth, quality of service, prioritization, encryption, decryption, and so forth.

It will be appreciated that other management operations may be usefully performed in this context. For example, a response to an endpoint query may yield additional information that assists in a detection of malicious software. For example, the query may identify a suspicious path or filename, an unknown file source, or other suspicious context such as the absence of an uninstaller for a new application or other software object. This information may be used alone or in combination with other context or information to initiate further investigation or remediation at the endpoint that sourced the network message with an unknown application type.

In another aspect, managing the network traffic flows may include selectively decrypting content at the network device. Where the traffic type is unknown, or where information received from the endpoint query or other context or information, as well as combinations thereof, suggests suspicious activity, contents of a network message or network traffic flow may be decrypted as needed. In one aspect, the network device may use a man-in-the-middle technique to decrypt and re-encrypt contents of the network traffic flow in transit. In another aspect, the network device may retrieve the needed key material from the endpoint, e.g., using a secure communication channel and trusted resources on the endpoint, where these resources permit access to the required information on the endpoint, or access to the information on a remote resource such as a cloud-based key management system.

It will also be appreciated that any combination of the foregoing techniques may be used to manage network traffic as contemplated herein. This may include rule-based management of network traffic. This may also or instead include the use of thresholds for quantitative metrics, as well as multi-factor scoring of different criteria or characteristics of network traffic, so that policy outcomes for a particular network traffic flow are the result of many different factors combined in a weighted or filtered manner.

It will be understood that the phrase 'network traffic flow' is intended to refer to a particular flow of data (e.g., in packets or other network messages) from a particular application on a particular endpoint. Thus, an endpoint may be a source (and/or recipient) of multiple network traffic flows, and multiple endpoints may each have one or more network traffic flows passing through a network device. The term 'network traffic flow' is also used herein in the generic sense of all network traffic flowing in a network, or to and through a network device, and all such meanings are generally intended except where a more specific meaning is explicitly stated or otherwise clear from the context.

As shown in step 1106, the method 1100 may include receiving a network message from an endpoint. The network message may be received from the endpoint at a network device such as a gateway, a firewall, a router, a switch, an access point, or a threat management facility, any of which may be a hardware device physically positioned between the endpoint and an external data network, or a cloud-based device accessible to the enterprise network for the endpoint through a remote service or resource. In another aspect, the network device may be a tap from another network stream or connection. For example, a network flow through a router or other network device may be duplicated (in its entirety, or filtered according to user-defined criteria) in a parallel path that permits inspection, analysis, and so forth at a location that is not strictly between a source and a destination, but that is nonetheless exposed to the corresponding network traffic in a manner that permits the analyses and management contemplated herein. In one aspect, the network device may include a firewall such as a local firewall for the endpoint that is configured to locally enforce traffic or connectivity rules for the endpoint. The network message may be any of the network messages described herein, such as the network messages described above or any other packet or other data structure including a payload of data and header information such as a source address for the endpoint and a destination address for an intended recipient of the network message. It should also be understood that the network message may be received directly from the endpoint, e.g., through a single-hop physical or logical connection between the endpoint and the network device, or the network message may be received indirectly from the endpoint, e.g., through one or more routers, access points, switches, interface devices, short-range communication devices, or other network elements, or any combination of the foregoing.

As shown in step 1108, the method 1100 may include determining whether a source application type for the network message is known, e.g., by detecting a network message that is not explicitly labeled or that is transmitted over a physical and/or logical connection that has not previously been associated with an application type. The receipt of a network message with an unknown application type may, for example, be indicative of a new connection from a legitimate application, or it may be indicative of an unauthorized application or suspicious network activity.

In general, when an application type is known, the method may proceed to step 1114, where the network message can be managed according to this application type. For example, this may occur when the network message contains identifying information that includes an application type for an application associated with the network message, and this identifying information can be used to manage the network message. In this context, identifying information may, for example, include information contained in an explicit label for each network message, or received from the endpoint and stored at the network device as an implicit label for traffic associated with a network flow, which may be uniquely identified, e.g., by machine name, MAC address, IP address, socket or any other information, alone or in combination with other information.

When the application type is unknown, e.g., because a network message is unlabeled or because no application type has been determined for the associated connection, then the method may proceed to step 1110, where the endpoint can be queried to determine the application type. Thus, when the network message has an unknown application type, the method 1100 may include querying the endpoint to retrieve second identifying information for a process executing on the endpoint that was a source of the network message, and determining the application type for the source of the network message based on the second identifying information retrieved from the endpoint.

It will be understood that the identifying information may be provided in a variety of forms. For example, the identifying information may include an explicit label such as an application name for the source of the network message, or other application data such as a product number or other identifier for the application, a publisher, a serial number, a tag, or the like that provides a unique global identifier for the application, or that the endpoint and the network device have agreed to share as an identifier for an application, application type, network connection, or other item that can be used to unambiguously associate the network message with a particular application type. The identifying information may be included in the network message as a secure (e.g., signed or encrypted) label or as an unsecure label. In another aspect, the identifying information may be provided in an out-of-band communication such as a secure heartbeat or the like from an endpoint that identifies the network message or network traffic flow (e.g., by connection or other identifier(s)) and provides an associated application type. In another aspect, the identifying information may be stored at the network device, e.g., from a prior or initial network message, or from an endpoint heartbeat or the like, and associated with a network traffic flow that carries the network message. In one aspect, identifying information may be forwarded by the network device to a threat management facility or other enterprise and/or cloud-based resource, and the network device may responsively receive an identification of the application type from the threat management facility.

Thus, as shown in step 1110, upon receipt of a network message having an unknown application type, the method 1100 may include querying an endpoint for identifying information. This may occur, for example, when a network message is received that is unlabeled or otherwise has an unknown application type. In one aspect, querying the endpoint may include querying a security agent executing on the endpoint. Querying the endpoint may also or instead include querying the endpoint through a secure connection between the network device and the endpoint. Querying the endpoint may also or instead include querying the endpoint through a secure heartbeat protocol or other secure, out-of-band communication link between the endpoint and the network device. Querying the endpoint may also or instead include receiving a response at the network device in a secure heartbeat from the endpoint. It will be understood that in this context, querying the endpoint may include querying the endpoint directly, e.g., through a secure communication channel or the like between the endpoint and the network device, or querying the endpoint through a broker that intermediates specific communications between endpoints and network devices, or that generally gathers endpoint information on any suitable schedule or basis, and responds to queries about endpoints, e.g., using a secure communication channel to an authenticated device or user.

As generally discussed herein, identifying information for an application or application type may include any data contained in the message that includes, suggests, or otherwise indicates a source of the network message. In one aspect, the identifying information sought during the query of the endpoint may include an application name for the source of the network message. The identifying information may also or instead include application data for the source of the network message such as an application name, an application path, or an endpoint application type or other classification. The identifying information may also or instead include additional information such as a signature or other verifiable assertion about the source or accuracy of the identifying information. Any other identifying information may also or instead be used, including, for example, a file name, a process name, an installation date, an application source, an uninstaller location (or existence), and so forth.

In another aspect, a new application type may be created or provided, e.g., using the dashboard described herein, in order to support internally developed or proprietary applications or application types of a particular user or enterprise.

In one aspect, querying the endpoint may include querying an endpoint defense driver or other driver operating in a kernel space of one of the endpoints. As described below, this may permit the source information to be securely accessed by the kernel driver in a manner that prevents tampering (e.g., based on a tamper protection cache or the like used by the driver) and permits authentication or verification of the reply by the recipient by securing the reply communication in a secure heartbeat or other secure communication.

As shown in step 1112, the method 1100 may include determining an application type of the network message source. Where the application type is explicitly asserted, either in the network message or in metadata for a network traffic flow stored at the network device, this may be determined by directly reading the corresponding information. Where the application type is implied, e.g., by explicit information (such as an application name or the like) that is similarly available but does not directly assert an application type, the application type may then be explicitly determined by reading the corresponding information and determining the application type using locally available rules or external resources that can correlate the explicit information to an application type. In another aspect, where the identifying information is implicit information such as a communication protocol or connection port, the application type may be similarly determined using appropriate rules or processing. For example, the Internet Assigned Numbers Authority (IANA) maintains an assignment of ports to particular uses. For example, port number 143 is assigned to Internet Message Access Protocol communications and dedicated to management of electronic mail messages on a server. While these assignments are not strictly binding, a reasonable inference can be made that communications over port number 143 are associated with an electronic mail client. This type of information can be used in combination with other information to assists in the explicit identification and labeling of network traffic flows with application types as contemplated herein. In instances where an inference of application type is made, the inference may be communicated to an administrator or the like who may apply a conclusive classification for use in labeling and further processing.

In one aspect, the application type may be determined based on the identifying information obtained while querying the endpoint. The network device may include memory and be adapted or configured to store and process the identifying information from the endpoint against a data store of potential sources, applications, application types, and application data. In this regard, the network device may be able to associate the identifying information with an application type. Determining the application type of the network message source may also or instead include forwarding the identifying information to a threat management facility for analysis. The threat management facility may have greater (or more comprehensive or current) data stores to assist in identifying the application, should the network device be unable to make an identification based on the identifying information sent from the endpoint. The network device may receive an identification of the application type from the threat management facility. The threat management facility may also be used to confirm the network device's identification and store the identifying information (and its associated application's identity) in its data stores for future comparisons or identifications.

In one aspect, an application type lookup service may usefully be provided. This may include a remotely accessible resource, and may be provided, e.g., within a threat management facility or other enterprise network tool or resource. The application type lookup service may receive information about an application, and provide an explicit type in response, which can be used for labeling network traffic flows as contemplated herein. The lookup service may usefully provide additional services such as deep inspection, traffic redirection, detonation, and so forth. This may, for example, include higher latency or more processing-intensive operations, which can be selectively deployed based on context (or the absence of sufficient context) as needed. Thus, in one aspect there is disclosed herein a sandbox for network traffic that is selectively deployed from a network device based on application type information (including, e.g., the absence of application type information) associated with a network traffic flow.

As shown in step 1114, the method 1100 may include managing a network traffic flow including the network message at the network device according to the application type. Managing the network traffic flow may include associating the network traffic flow containing the network message with the identified application type, or more generally associating each network traffic flow through the network device with a particular application type. Managing the network traffic flow may also or instead include routing the network message based on the application, or application type that generated the network message. The routing may be a conditional routing based on the identifying information, or information determined from the identifying information. This may include routing rules or combinations of rules that may be based, for example, on user identity, process/application, reputation, and so forth as described herein. Managing the network traffic flow may also or instead include applying a security policy to each of the network traffic flows according to the application type. If the identified application type is indicative of suspicious or malicious activity, or if the application type cannot be identified, the network device may route, remove, quarantine, or take other remedial action on the network message as previously described herein.

Other techniques may also or instead be used, as generally described herein. For example, managing network traffic flows may include selectively deploying traffic decryption or encryption, or forwarding network traffic streams to an application type lookup server or other resource configured to identify an application type for the network traffic flow and/or provide deep inspection and extended processing, analysis, and so forth.

More generally, a platform such as the dashboard described herein may be used to manage network traffic flows in a variety of ways, and may provide tools for operations such as prioritizing review of network traffic, auditing network traffic, setting new policies based on observed network traffic, prioritizing traffic, rate-limiting traffic, creating alarms, and so forth.

According to the foregoing, there is disclosed herein a system that includes a network device that manages network flows. In one aspect, a system disclosed herein includes a network device including a network interface configured to couple the network device in a communicating relationship with a data network that includes an endpoint, a memory on the network device, and a processor on the network device. The processor may be configured to execute instructions stored in the memory to perform the step of determining an application type for each of a number of network traffic flows at a network device that receives the number of network traffic flows from endpoints within an enterprise network and managing the network traffic flows based on the corresponding application types. The processor may be further configured to execute instructions stored in the memory to perform the steps of receiving a network message in one of the network traffic flows at the network device from an endpoint within the enterprise network, the network message having an unknown application type, querying the endpoint to retrieve identifying information for the source on the endpoint of the network message, determining the application type for the source of the network message based on the identifying information, and managing the network message within the network traffic according to the application type.

The network device may also or instead communicate with other network devices or resources to coordinate management of network traffic flows. For example, the network device may provide suitable notifications to an administrator, and may proactively suggest possible actions associated with a network traffic flow. The network device may also or instead provide notifications to a threat management facility, an endpoint security agent, or a malware remediation system or the like to take appropriate action. The network device may also or instead initiate procedures such as quarantining, endpoint isolation or termination, sandboxing, and so forth, or may instruct other network devices or resources to do any of the foregoing.

In another aspect, any of the foregoing network-level operations may be realized in network processors or other communications hardware, or in a central processing unit or other processor that administers traffic on a network device.

Figure 12:
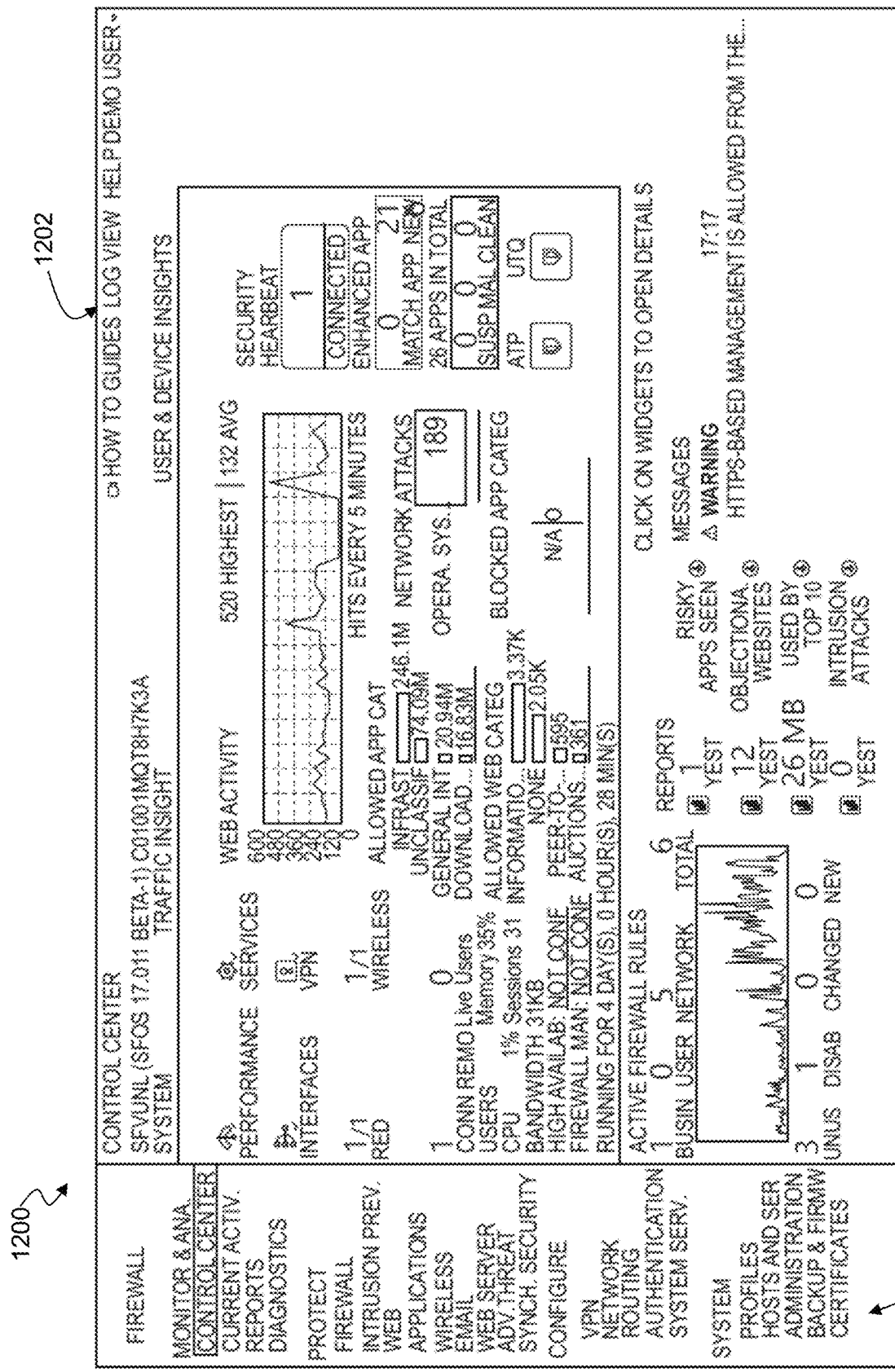
FIG. 12 shows a dashboard for visualizing network usage by application types.

FIG. 12 shows a dashboard for visualizing network usage by application types. In general, the dashboard 1200 may be any web-based dashboard suitable for displaying network usage information as contemplated herein, e.g., the number of applications (or number of each application type) using network traffic flows in a network such as an enterprise network. For example, while an application may be installed on a number of endpoints, only a smaller number of endpoints may be using the application to generate network traffic. The dashboard may therefore provide information about actual usage of network resources by one or more applications that each may be provisioned on a number of endpoints in a network. In general, the underlying usage data may be obtained using the techniques described herein, and aggregated from one or more network devices and presented by a server such as a web server in an interactive dashboard or similar interface that permits users to view, filter, organize, investigate, or otherwise interact with usage data. For example, the dashboard 1200 may display an indicator of prevalence such as a relative or absolute occurrence of an application type, or the relative or absolute number of instances of an application type that are using network resources. This permits easy user identification of commonly-used application types across an enterprise network or the like within the dashboard 1200 along with other related information about network usage.

In general, the dashboard 1200 may provide any number of controls 1202 such as menus, hyperlinks, buttons, checkboxes, text entry fields, drop-down menus, and so forth for interacting with data displayed in the dashboard 1200, and managing network traffic as contemplated herein using the dashboard 1200. In one aspect, a firewall or other network device or resource that is monitoring network traffic may facilitate capture of individual packets or network streams from an application endpoint, and the forwarding of raw data or metadata to a remote analysis facility for processing. The dashboard 1200 may access this information from a central resource such as a threat management facility or other enterprise or administrative resource and display the information in any suitable manner. The dashboard 1200 or a back end for the dashboard 1200 may also usefully request specific or general information from various other resources within the network. A server or other resource that provides the dashboard 1200 may, in certain circumstances, have an aggregated view of network traffic that is not available elsewhere within the network. In this case, the server may usefully facilitate capture of application data (or the full application or related processes, etc.) from an endpoint, where this information is unknown, or the server may identify a network traffic flow as an appropriate candidate for forwarding to a remote analysis facility for inspection, analysis, sandboxing, characterization, and so forth. Similarly, analysis may also or instead be performed by other network resources such as any of the resources described above, any of which may usefully draw inferences based on application types associated with network traffic flows, and allocate traffic flows to further network resources for various types of further processing or analysis.

In another aspect, the dashboard 1200 may usefully provide time-based information about application-specific or application-type-specific network traffic. For example, the dashboard may be used to monitor changes in application traffic, and to identify specific instances where network traffic of a particular type or associated with a particular application is increasing or decreasing in an unexpected manner. Thus, for example, where a particular application or application type exhibits an increase of several orders of magnitude within a day or a week, this may suggest malicious activity. Of course, this may also be a result of legitimate, purposeful behavior such as a roll-out of a new application within an enterprise, but in either instance the dashboard can facilitate detection of, and responses to, such a change. A baseline of network usage of an application may be determined, and significant deviations from the baseline may indicate potentially malicious activity. Where actual or potential malicious activity is identified in this manner, visual alerts or other notifications may be provided, e.g., to an administrator within the dashboard 1200 or through any other suitable communication medium, and may be accompanied by controls for initiating suitable responses, e.g., to uninstall an application, block network traffic from an application, ignore an alert, forward an application or network stream to a remote resource for further analysis, and so forth.

The controls 1202 in the dashboard 1200 may usefully provide access to any number of administrative or network management tools. This may, for example, include controls 1202 to investigate data interactively, generate reports, and so forth. This may also or instead include controls 1202 permitting an administrator or other user to label unknown traffic types, (e.g., by selecting from drop-down lists of known traffic types), re-classify network streams that already have application types assigned, or to create and manage new application types. The controls 1202 may also facilitate viewing, filtering, organizing, and investigating data for network traffic, e.g., based on application type or any other useful criteria. The controls 1202 may also facilitate integration with third-party resources or software, e.g., through suitably configured application programming interfaces, database interfaces, and so forth. In another aspect, the controls 1202 can facilitate management of network traffic, e.g., by supporting blocking particular network traffic flows, decrypting or encrypting network traffic flows, diverting network traffic flows to deep analysis resources, or any of the other actions contemplated herein.

In one aspect, the system may support collaborative or social networking techniques for threat management. For example, if a user permits sharing of information with third parties, classifications applied or created by the user may be shared with those third parties to assist in further classifications. Furthermore, data from multiple enterprises may, again where sharing is permitted, be aggregated to assists in the creation of identification rules, tools for automated classification, and so forth. These crowd-sourced or social-networking based rules may be presented in the dashboard 1200 for use by participating users or enterprises, and may be intermingled with other classification categories or rules, or uniquely identified and separately presented from an otherwise globally managed category set.

In one aspect, there is disclosed herein a system including a plurality of security agents executing on a plurality of endpoints in an enterprise network such as any of the endpoints and enterprise networks described herein. The system may include one or more network devices in the enterprise network, each one of the network devices configured to label network traffic flows from the plurality of endpoints according to an application type selected from a predetermined group of application types. The system may further include a server configured to aggregate usage data from each one of the network devices to determine a number of instances of each one of the predetermined group of application types associated with a network traffic flow within the enterprise network, and to present the usage data in a web-based interface.

FIG. 13 shows a user interface for managing network usage according to application type. In particular, the user interface 1302, which may, e.g., be accessed through a control in the dashboard described above in FIG. 12, may show a list of applications currently using a network as detected, e.g., at a gateway, firewall, or other network device, or a combination of network devices, e.g., within an enterprise network. The list may also or instead include applications executing on endpoints within an enterprise regardless of network traffic flow, such as applications identified by the endpoint defense driver described herein and reported to a network device in a secure heartbeat or other suitable communication. For each application, the user interface 1302 may provide a row of related data. This may, for example, include an application name, which may optionally specify a full path and filename for the related executable, or some other name recognized by the endpoint or the network device and useful for uniquely identifying the application. Each row of information may also include additional information such as the number of endpoints that contain the application, or the number of endpoints with network traffic flows belonging to the application. Another column of information may be provided such as an application filter to uniquely identify a filter for monitoring the network traffic flow from that application. Another column may be provided for traffic shaping control, which may optionally include an icon or other indicator to show whether the application or filter is new (e.g., not yet recognized or categorized), along with a control 1304 for qualifying an application according to type or any other suitable criteria, e.g., as illustrated below in FIG. 14.

Figure 14:
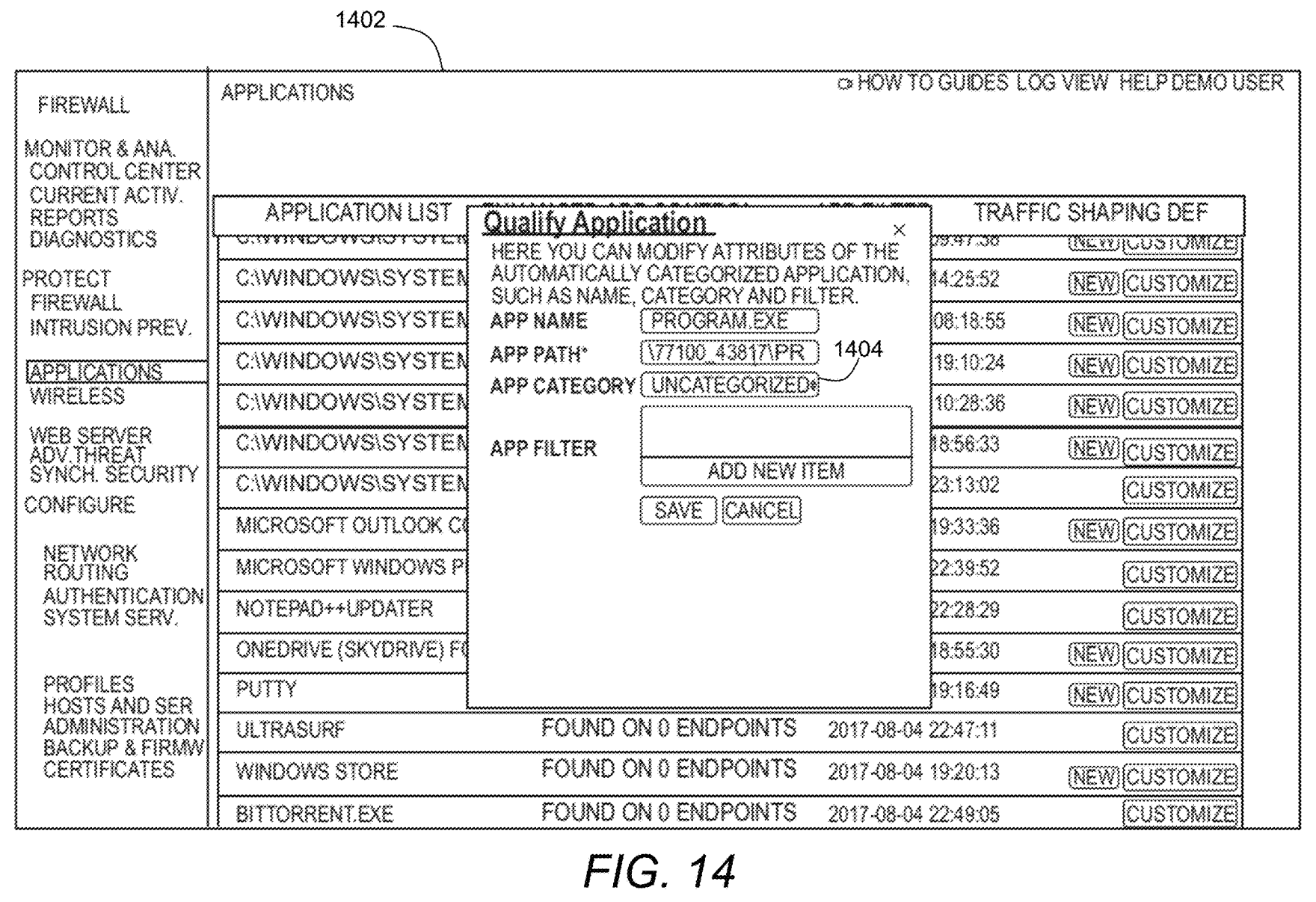

FIG. 14 shows a user interface for managing network usage according to application type. In particular, FIG. 14 shows a user interface 1402 for qualifying an application, accessible through the dashboard and user interface described above, such as an application with a related network traffic flow or an application reported to a network device in a secure heartbeat or other communication. The user interface 1402 may show an application name, which may initially be, for example, a filename for an executable of the application, or a user-provided or system-provided name for the application. In the interface, the user may provide any name useful for identifying the application within network flows as contemplated herein. The user interface 1402 may also display a path showing where on an endpoint the application is located. The user interface 1402 may also display an interactive application category selection control 1404, which may be used to identify an application category as illustrated below. The user interface 1402 may also or instead include an application filter control for adding a filter that can be used to restrict, label, prioritize, or otherwise shape network traffic flows to and from the application.

Figure 15:
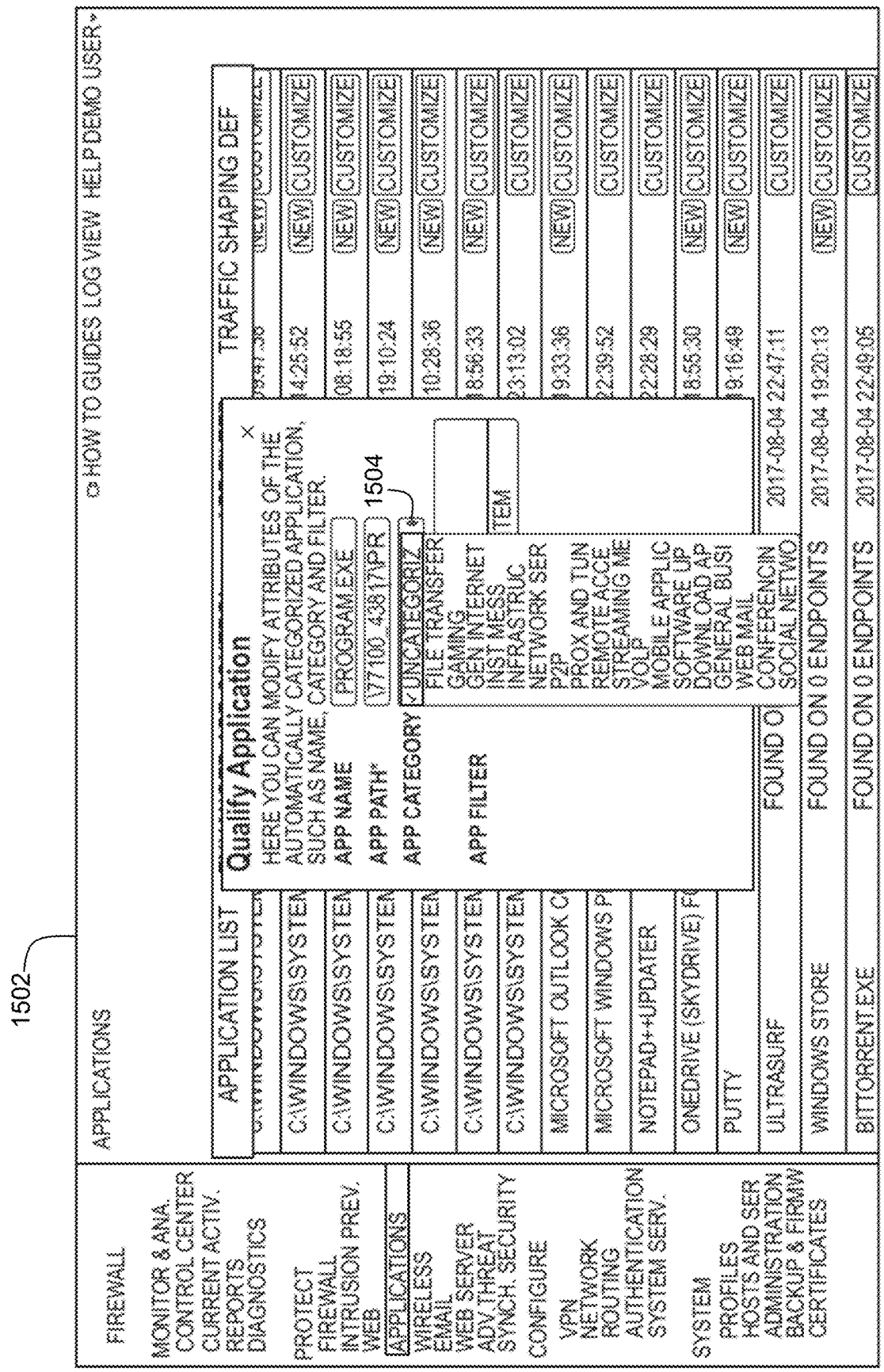
FIG. 15 shows a user interface for managing network usage according to application type.

FIG. 15 shows a user interface for managing network usage according to application type. In particular, FIG. 15 shows a user interface 1502 with a control 1504 such as a drop-down list for providing an application category or application type for the application associated with a network traffic flow. As described above, this may include any hierarchical or other categorization scheme useful for organizing and managing network traffic flows. By way of non-limiting examples, this may include categories such as file transfer, gaming, general Internet, instant messaging, infrastructure, network services peer-to-peer, proxy and tunnel, remote access, streaming media, VoIP, mobile applications, software update, download applications, general business, web mail, conferencing, social networking, storage and backup, desktop mail, industrial control system, and electronic commerce.

Using the foregoing user interfaces, a user may usefully identify and manage applications within an enterprise network according to type, and may similarly manage new applications when they appear within the dashboard, or in response to alerts or other notifications to an administrator or the like of a new application with a network traffic flow detected on a network device within (or associated with) the enterprise network.

Figure 16:
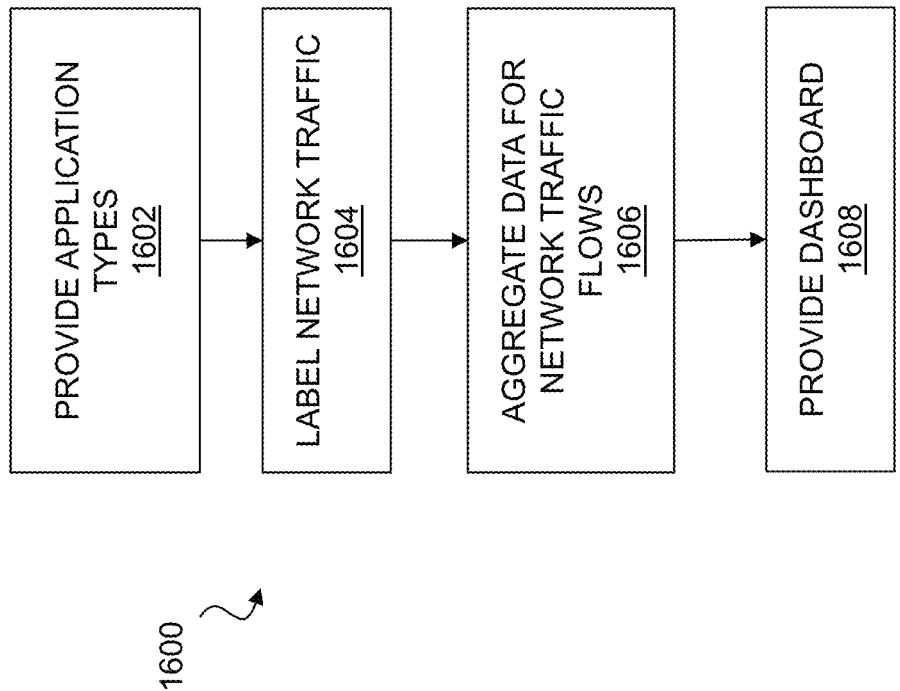
FIG. 16 shows a flowchart of a method for visualizing network usage by application types.

FIG. 16 shows a flowchart of a method for visualizing network usage by application types. In general, the method 1600 may be executed on a network device, a threat management facility, or any other server or combination of devices or platforms used within an enterprise network or other network in which application or application-type monitoring might be usefully employed.

As shown in step 1602, the method 1600 may begin with providing a number of application types such as a number of application types characterizing one or more applications sourcing network traffic within an enterprise network. This may include application types at any suitable level of granularity from very narrow (e.g., specific versions of specific applications) to very broad (e.g., with a small group of types or functions). For example, the application types may be organized according to an application name or an application suite name, or the application types may be organized at a functional level, and may include categories such as electronic mail, word processing, spreadsheet, web browser, and so forth. Application types may also or instead include broader functional classifications such as productivity software (including any of the foregoing), design or engineering software (e.g., computer automated design platforms, simulation or mathematical modeling tools and so forth), accounting applications, management tools, information management tools and so forth. Application types may also or instead be organized according to authorized users, permitted network communications, or any other objective criteria useful for organizing and differentiating among applications. Numerous possible application types are discussed herein, and these or any other types that usefully categorize applications that might be used on endpoints in an enterprise network may be adapted for use as the application types contemplated herein.

As shown in step 1604, the method 1600 may include labeling each of a number of network traffic flows in the enterprise network. This may include applying labels using any of the techniques described herein, such as labeling each of the network traffic flows with one of the application types by querying endpoints for application type information when each new one of the number of network traffic flows is initiated. Labeling may include labeling at one or more network devices within the enterprise network. Labeling may also or instead include querying each endpoint that initiates one of the network traffic flows to identify an associated application or an associated application type. Labeling may also or instead include extracting an explicit application type label from a network message within one of the network traffic flows. An explicit application type label may be cryptographically signed or otherwise encoded to ensure accuracy and authenticity. This may be particularly useful where, for example, a network management system such as that described below applies labels to outbound network traffic based on verified identity of applications executing on an endpoint. In another aspect, labeling may include extracting an explicit application type label from information transmitted in a heartbeat from an endpoint that originated a network message within one of the network traffic flows. The heartbeat may, for example, include a secure heartbeat that is encrypted to prevent tampering or inspection, or that is digitally signed to provide a verifiable indicator of authenticity or source.

In one aspect, labeling at least one of the network traffic flows may include querying an endpoint defense driver or other driver operating in a kernel space of one of the endpoints. As described below, this may permit the source information to be securely accessed by the kernel driver in a manner that prevents tampering (e.g., based on a tamper protection cache or the like used by the driver) and permits authentication or verification of the reply by the recipient by securing the reply communication in a secure heartbeat or other secure communication.

As shown in step 1606, the method 1600 may include aggregating data for network traffic flows based on the application types. This may, for example, include aggregating data to indicate a number of endpoints, network traffic flows, users, endpoints or the like that are using each one of the application types on the enterprise network. The data may be aggregated to any suitable central data location such as a cloud-based enterprise management facility. The data may be usefully filtered or organized in a number of ways. For example, aggregating a number of endpoints using each one of the application types may include removing application types with zero instances and aggregating only the application types currently in use by one or more of the endpoints.

A number of techniques for providing information about network flows from a kernel driver on an endpoint, such as an application name, an application classification or type, an application path (e.g., including a directory location within the file system of the endpoint) and so forth, are described herein. This may include, for example, information available for a process (or a related file or application) within a process cache maintained in the kernel, or information maintained in a separate tamper protection cache that identifies protected files, directories, registry keys, applications, and so forth in a manner that prevents changes without authorization from an appropriate trust authority. Any of this information may be usefully retrieved for a process and forwarded to a suitable location for aggregation and presentation within a dashboard or the like as contemplated herein.

As shown in step 1608, the method 1600 may include configuring the cloud-based enterprise management facility (or other server or the like) to present the number of endpoints using each one of the application types to a user in a web-based dashboard. The web-based dashboard may provide any tools or controls known in the art to facilitate investigation of the aggregated and source data by a user. For example, the web-based dashboard may provide interactive access to underlying data for network usage by each application type, number of endpoints using each application type, duration of usage, bandwidth usage, and so forth.

Figure 17:
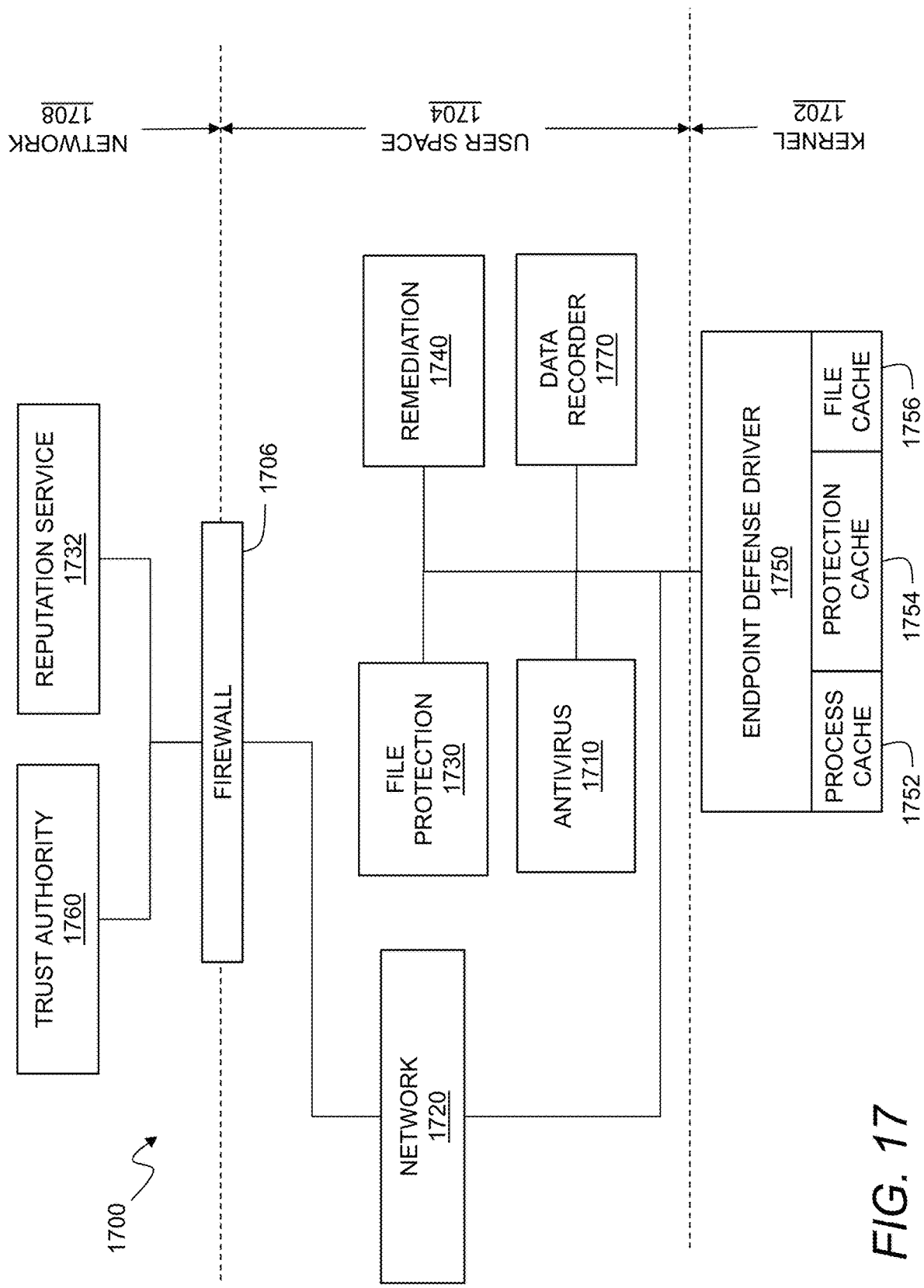
FIG. 17 shows a block diagram of an architecture for secure management of endpoint resources.

FIG. 17 shows a block diagram of an architecture for secure management of endpoint resources. In general, the system 1700 may include an endpoint having a kernel space 1702 and a user space 1704, which connects with a network space 1708 outside the endpoint through, e.g., a firewall 1706 and any other network hardware, software, protocols and so forth. Software that protects the endpoint against malicious activity may execute in the user space 1702, such as an antivirus system 1710, a network management system 1720, a file protection system 1730, and a remediation system 1740. An endpoint defense driver 1750 that secures these anti-malware systems against intrusion, intervention, other tampering, or the like may execute partially or wholly in the kernel space 1702. The firewall 1706 may be a hardware firewall, a software firewall, or some combination of these, and the firewall 1706 may be on the endpoint, on a gateway between the endpoint and an external network, or at any other physical or logical location where the firewall 1706 can monitor and control network traffic to and from the endpoint.

In general, a memory for a physical or virtual endpoint may be divided into at least two distinct areas: the kernel space 1702 and the user space 1704. The user space 1704 is where normal user processes run, such as user applications, database management systems, communications software, and so forth. Processes executing in the user space 1704 will typically have access to limited areas of memory that specifically exclude the kernel space 1702. The kernel, by contrast, executes in the kernel space 1702 and has access to all of the memory for a device, as well as access to machine hardware, hardware interfaces, and the like. In general, the kernel manages applications running in the user space 1704, and ensures that they do not interfere with, or conflict with, one another. In this architecture, the processes executing in the user space 1704 have very limited access to the kernel space 1702, e.g., through system calls that send an interrupt from the user space 1704 to the kernel space 1702 for handling. By installing the endpoint defense driver 1750 in the kernel space 1702, e.g., before the user space 1704 is populated with executable applications and the like, improved control of endpoint security can be obtained, for example, by managing interprocess communications and modifications to files or applications from a secure component within the kernel space 1702 that is protected against manipulation by malicious processes executing in the user space 1704.

The antivirus system 1710 may operate to detect malware executing on the endpoint 1702. This may, for example, include any suitable combination of static detection (e.g., based on signatures or other characteristics), behavioral analysis, host intrusion protection, and so forth. More generally, the antivirus system 1710, which may include any number and combination of malware detection components, each of which may communicate with the endpoint defense driver 1750, e.g., to verify the identity or status of processes and files as described in greater detail below.

The network management system 1720 may mediate network communications between processes executing in the user space 1704 and external resources available through the network 1708. This may, for example, include monitoring network traffic to and from the endpoint, labeling network traffic flows, and so forth. This may also or instead include controlling the firewall 1706, e.g., by configuring the firewall 1706 according to actual or potential threats, detection of endpoint compromise, or the like, or receiving a request from the firewall 1706 when a network traffic flow is unlabeled. In another aspect, the network management system 1720 may create a periodic heartbeat that securely communicates health or security state information to a remote monitoring facility such as a threat management facility, e.g., through the firewall 1706. The heartbeat, which may be encrypted or signed, may also or instead be communicated in response to a query from the remote monitoring facility such as a general query about endpoint status or a specific query for health information, scanning status, application information, certificate information, and so forth. Components of the network management system 1720 such as the heartbeat service may communicate with the endpoint defense driver 1750 as necessary or helpful to verify health status, access signatures or certificates, provide authenticated machine or application identifiers for network traffic flows, and so forth.

The file protection system 1730 may generally operate to monitor files and file usage on the endpoint, and to ensure that files are safe (e.g., free of malware) and secure on the endpoint, as well as to control decryption of and access to files through a file system extension or the like. A variety of techniques may be used by the file protection system 1730. In one aspect, this may include a scanner for local file reputation based on, e.g., local signature or hash caches, file metadata, file header information, and so forth. This may also or instead include a machine learning antivirus system using a model trained to identify malicious components within executables and other files. The file protection system 1730 may also or instead include a global reputation service that obtains information from files and accesses a remote resource such as the reputation service 1732 to determine a corresponding reputation. A variety of other protection systems may also or instead be employed. For example, the file protection system 1730 may include a data collector that gathers streams of event data, which may be communicated to a remote service periodically or in response to a malware detection or other indication of compromise for the endpoint. The file protection system 1730 may also include a root cause analysis system that analyzes event streams from the data collector to either detect malware by matching a sequence of events to a previously identified threat, or to prospectively develop detection tools for newly emerging threats. In general, components of the file protection system 1730 may communicate with the endpoint defense driver 1750 as necessary or helpful to monitor or control file content, file modifications, and so forth.

The remediation system 1740 may provide any suitable remediation tools for addressing malware or potential malware upon detection. This may, for example, include tools for quarantine, sandboxing, cleaning, vaccination, repair, uninstall, endpoint isolation, and so forth. The remediation tools in the remediation system 1740 may usefully communicate with the endpoint defense driver 1750, e.g., to authenticate and authorize remediation tools, prevent file tampering, and so forth.

The endpoint defense driver 1750 may in general be a low-level driver installed in the kernel space 1702 early in an operating system installation or boot process, e.g., prior to population of the user space 1704 with user applications and the like. In this manner, the endpoint defense driver 1750 may be configured to instrument operation of the endpoint so that file operations and interprocess communications are passed through the kernel where the endpoint defense driver 1750 can enforce restrictions on file modifications, code injections and so forth. Certain related techniques are described, for example, in U.S. Pat. No. 8,950,007 issued on Feb. 3, 2015, the entire contents of which are hereby incorporated by reference. The platform described herein extends upon these techniques with additional security measures and instrumentation techniques that can be usefully deployed from the kernel space 1702 to enhance endpoint protection. For example, while file operations such as read, write, create, delete, rename, and so forth can be readily monitored within the kernel space 1702 using file system filters, certain operating systems are configured to support interprocess communications that bypass the file system, such as data copies, pipes, remote procedure calls, and so forth. In order to secure these communications and ensure that protected computing objects are not modified, each process can be configured to communicate with other processes using a system call that passes through the kernel space 1702, and in particular the endpoint defense driver 1750, in order to ensure that the endpoint defense driver 1750 has an opportunity to regulate process activity in a manner consistent with a list of protected objects maintained in the protection cache 1754 as described herein.

The endpoint defense driver 1750 may maintain a number of caches to assist in monitoring the endpoint, such as a process cache 1752, a protection cache 1754 (also referred to as a protected object cache or tamper protection cache), and a file cache 1756.

In general, the process cache 1752 may store information related to a process such as the application name, application family (e.g., a vendor or commonly used name for a suite of software including installers, libraries, supporting applications or processes, and so forth), an application path, and an application category (such as any of the categories or types described herein). By loading the endpoint defense driver 1750 early in a boot sequence or operating system installation, each new process can be detected and corresponding information can be loaded into the process cache 1752. This can provide a shadow table of processes that mirrors information maintained in an operating system process cache, while advantageously facilitating security-related enhancements to the process cache. For example, additional process metadata can be included and tracked beyond what might otherwise be provided by the operating system process table. Each new process can be instrumented with a callback through the kernel space 1702 (and the endpoint defense driver 1750, specifically) so that rules on modifications, network usage, security, and so forth can be enforced in the secure kernel space 1702 based on, e.g., process information maintained in the process cache 1752 and the protection cache 1754 described herein. As another advantage, the shadow table can persist process information even after a process is terminated (at which point the operating system process cache may remove the process identifier and related information). This persisted information can be useful, e.g., for the detection or identification of malware, particularly where the malware employs a long and relatively complex chain of events and processes to obfuscate malicious activity.

While the description herein may emphasize tracking of process-level metadata, it will be appreciated that process data may usefully be gathered, stored, transmitted, and otherwise used at a variety of different levels of granularity. Thus, for example, process data may include information about a machine, machine name, machine address, network interface MAC address, partition, network, subnet or other logical or physical location where a process is executing, or any other context for a particular process. The process data may also or instead include data at a more granular level than the particular process. For example, the process cache may usefully store information about one or more threads in a process, or images or other data loaded into each process. This information may, for example, be usefully provided to a data recorder or firewall where more fine-grained information about processes is necessary or helpful. By way of non-limiting example, some operating systems will concurrently execute a number of different processes having the same name (e.g., "svchost"). In order to monitor, detect, and remediate in this context, additional process information may be helpful.

The protection cache 1754 may support tamper protection tools. In particular, the endpoint defense driver 1750 may initially load a list of protected objects such as registry keys, services, applications, directories, and so forth. The endpoint defense driver 1750 may proactively prevent any changes to these protected objects (which include the protection cache 1754 itself), or may prevent any changes except by other protected objects identified in the protection cache 1754. The protection cache 1754 may also include a digital signature for an initial file or cache of protected objects, and the public key for verifying the signature can be encoded into the binary for the endpoint defense driver 1750 or other kernel driver for verification of the initial protected object list. This provides a chain of trust that can be authenticated back to the source of the initial protected object list and the binary for the kernel driver. The owner of the private key, e.g., an administrator or the like at a threat management facility or other remote management resource, can propagate and persist changes to the protected object list, but local changes are not readily affected from the endpoint (unless the private key is somehow available to the endpoint).

The file cache 1756 may contain information about files on the endpoint, and may store any useful information including information about protection status, modifications, local or global reputation, and so forth.

The endpoint defense driver 1750 can use these caches in a variety of ways to support secure operation of an endpoint protection system. For example, as noted above, by directing interprocess communications and file system operations through the endpoint defense driver 1750, security and tamper prevention can be ensured on an object-by-object basis, e.g., for registry keys, files, processes, directories, and so forth. The endpoint defense driver 1750 can also set and retrieve information about new processes as they are launched in the user space 1704.

Each time a new object is loaded into memory in the user space 1704, the endpoint defense driver 1750 can intercept that action and check the source or target object against items in the process cache 1752, protection cache 1754, and/or file cache 1756. If the object is not recognized, then the file or executable may be scanned, e.g., using any of the local or global reputation tools, antivirus scanners, and so forth described herein. Thus, in one aspect, the endpoint defense driver 1750 may communicate with other security components by requesting (and storing) security and reputation information, or any other useful information, in one of the caches. This information may also be used to control handling of the object(s) by the security components on the endpoint. Thus, for example, if a file is not recognized, but it was signed by a reputable vendor and has not been modified, then it can be assumed to be safe, and the endpoint defense driver 1750 can permit execution or process-to-process interactions accordingly. Similarly, if an executable is unrecognized and no signature or reputation information is available, the endpoint defense driver 1750 may request that the executable be launched in a sandbox, or may send information about the absence of reputation to the security components, which may, e.g., apply an enterprise policy or other rules or policies managed in the user space 1704 to select a suitable action.

More generally, any security-related application or process executing in the user space 1704 may usefully benefit from information available from the kernel through the endpoint defense driver 1750. And similarly, the endpoint defense driver 1750 may usefully receive information from, and provide information to, any of the security components described above. In order to facilitate comprehensive, tamper-proof integrity to objects on the endpoint, the endpoint may be implemented so that some or all of the operating system functions such as file system operations or interprocess communications are instrumented to pass through the kernel space 1702, and more specifically through the endpoint defense driver 1750, so that the endpoint defense driver 1750 can adequately protect the integrity and operation of the security components executing in the user space 1704 on the endpoint.

As a further advantage, a kernel-level driver can provide an additional layer of information or insight useful in threat identification. A combination of information available from the kernel, available from the endpoint, and available from an external threat management facility may be used together to identify a threat, or to provide a stronger inference of the presence of a threat. Thus, for example, where a new application that is not protected (based on the protection cache in the kernel) installs without an uninstall routine (from registry information or other endpoint information), and the new application is not globally known (e.g., by a remote threat management facility) and communicates with a suspicious geography or domain (e.g., based on a firewall or gateway that couples the endpoint to an external network), this information from various resources may be used collectively to determine a high likelihood that the new application is malicious, and remedial action may be initiated even in the absence of a specific threat identification.

In one aspect, a trust authority 1760 may be provided, e.g., to serve a root for keys used to secure the protection cache 1754. Thus, for example, the trust authority 1760 may maintain a suitable public/private key pair, and may use the private key to digitally sign the protection cache 1754, or individual computer objects or groups of computer objects listed in the protection cache 1754. In this manner, the protection cache 1754 may be secured against tampering so that, when the endpoint defense driver 1750 seeks to verify a protected status of a computer object such as a process, application, file, directory, registry key, or the like that is identified in the protection cache 1754, the endpoint defense driver 1750 can use a corresponding public key, which may be published in an accessible location by the trust authority 1760, coded into the binary for the endpoint defense driver 1750, or otherwise made available for use in verifying a digital signature or otherwise verifying the authenticity of the protection cache 1754 and/or the information therein. The trust authority 1760 may be maintained in any suitable location that permits verification with reference to an authority external to the operating system of the endpoint, or external to the endpoint. Thus, for example, the trust authority 1760 may be maintained on a gateway for an enterprise network, a threat management facility for an enterprise network, or at a remote, third-party trust authority, root key authority, or the like that is accessible to the endpoint through a data network.

The endpoint may also usefully include a data recorder 1770. In general, the data recorder 1770 may monitor causal relationships among computing objects on the endpoint and record sequences of events that causally relate such objects. These events and relationships may be stored, abstracted, filtered, or otherwise processed as appropriate for an intended use. In one aspect, the data recorder 1770 may usefully obtain information from the process cache 1752, protection cache 1754, and file cache 1756, or more generally from the endpoint defense driver 1750, that describes activities, events, relationships, and the like among computing objects on the endpoint. Useful data recorders are described, by way of non-limiting examples, in U.S. patent application Ser. No. 15/130,244, incorporated by reference herein in its entirety. It will be appreciated that, while illustrated as operating within the user space 1704, the data recorder 1770 may also or instead reside on an external service such as a threat management facility, which may independently receive a data stream from the endpoint defense driver 1750, a data recorder agent executing on the endpoint, or any other endpoint component or combination of components.

Figure 18:
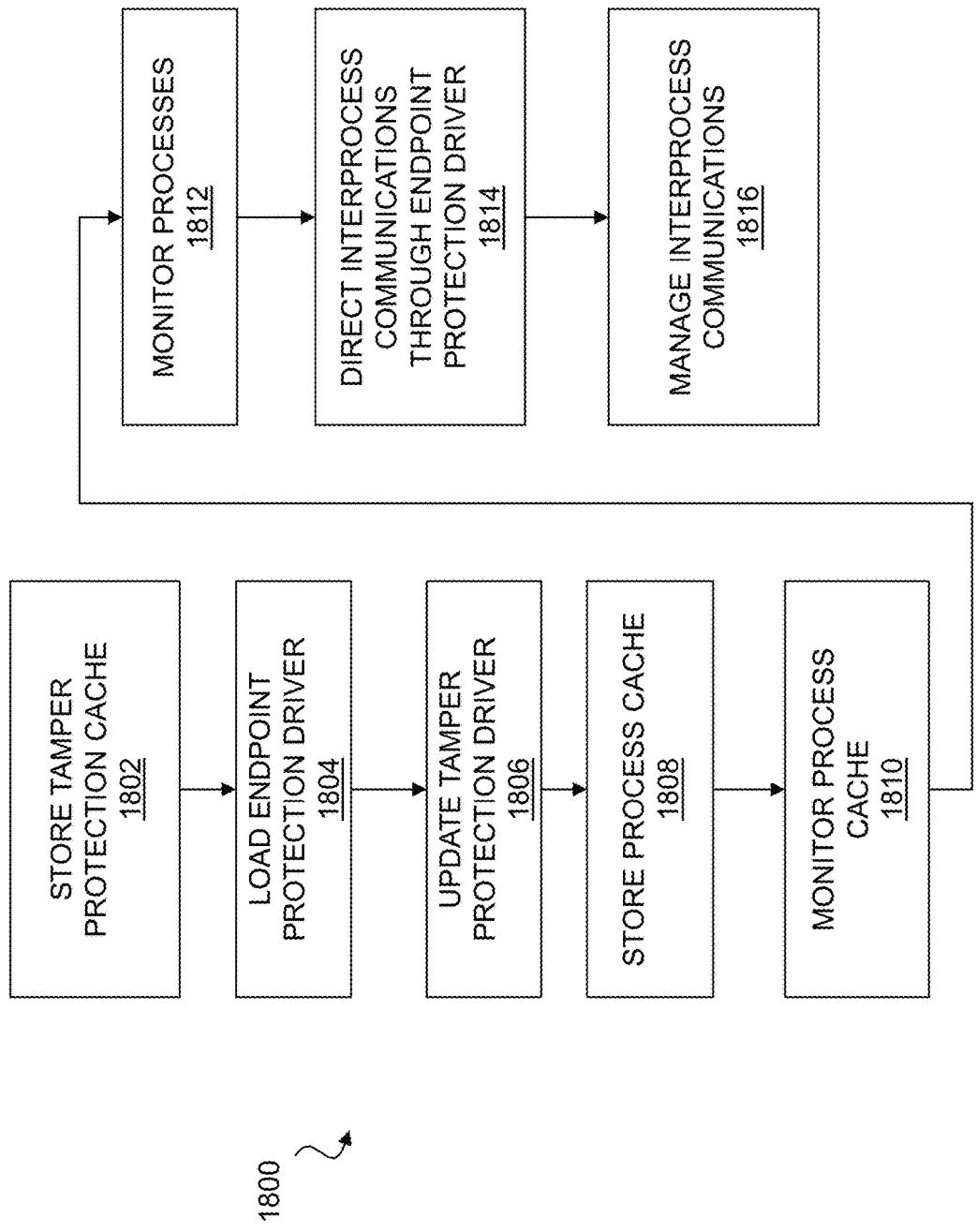
FIG. 18 shows a method for securing interprocess communications using a kernel-based endpoint protection driver.

FIG. 18 shows a method for securing interprocess communications using a kernel-based endpoint protection driver. In general, interprocess communications may be secured using the architecture described herein by passing interprocess communications through a secure, kernel-based endpoint protection driver to ensure, e.g., that an unprotected or unknown process does not pass data to a protected process. While the foregoing description emphasizes interprocess communications between two processes executing in the user space on the endpoint, it will be understood that the principles of the disclosed technique are not so confined, and the following techniques may also be used in a variety of additional contexts, such as to protect communications among kernel space processes and user space processes, as well as processes executing externally from the endpoint, e.g., on other endpoints connected in a communicating relationship through a data network.

As shown in step 1802, the method 1800 may include storing a tamper protection cache such as the protection cache described above in a memory of an endpoint. The tamper protection cache may, for example, be stored in the kernel space so that the tamper protection cache is not generally exposed to the user space where user processes are executing. In general, the tamper protection cache may identify protected computer objects such as processes, directories, registry keys, services, applications, network resources, and so forth, and may either implicitly (e.g., by listing in the cache) or explicitly (e.g., with metadata or the like) specify a protected status or other information relevant to use or the corresponding object(s). As noted above, the tamper protection cache may specifically identify protected processes or the like for protection when executing in the user space The tamper protection cache may be secured using a number of techniques. For example, the tamper protection cache may be encrypted, or may be digitally signed, e.g., by encrypting a hash of the cache contents using a private key of a key pair and storing the resulting signature directly in the tamper protection cache. The corresponding public key of the key pair may be encoded into the binary of the endpoint protection driver, or may be published in a remote, publicly accessible location, and may be used to verify the authenticity of the tamper protection cache. In this manner, the tamper protection cache may provide a root of trust external to the tamper protection cache, the kernel, the operating system of the kernel, and/or the endpoint.

As shown in step 1804, the method 1800 may include loading an endpoint protection driver such as any of the protection drivers described herein. This preferably occurs early in the boot process for an endpoint so that the endpoint protection driver can observe processes as they are loaded into the user space, which usefully permits the construction of a reliable process cache and enforcement of tamper protection rules from the tamper protection cache before user processes begin executing on the endpoint. Thus, in one aspect, the method may include loading the endpoint protection driver before launching processes in the user space of the endpoint. In general, this may occur before or after storing the tamper protection cache, provided that both the tamper protection cache and the endpoint protection driver are available in the kernel during execution of processes in the user space.

As shown in step 1806, the method 1800 may include updating the tamper protection cache. The tamper protection cache may be periodically updated or modified using a variety of techniques. For example, a replacement cache may be downloaded and stored in place of the current tamper protection cache. In another aspect, the tamper protection cache may be modified, e.g., with the addition or removal of protected objects, and a new signature may be created for the modified cached. In another aspect, two or more separate tamper protection caches may be provided in order to incrementally control additions to or removals from the list of protected computing objects. The list(s) of protected objects may also be hierarchically arranged in any number of ways, such as by providing separate caches for each type of object (e.g., one cache for registry keys, one cache for directories, etc.) or separate caches for different users (one for a guest, one for an endpoint administrator, one for an enterprise administrator, etc.) or different types of users. Whether stored as an integral cache or as a number of incrementally accumulated or hierarchically partitioned caches (or some combination of these), the cache(s) may be secured with reference to an external trust authority such as by digitally signing the cache(s) (or more specifically, hashes thereof) with an appropriate private key.

As shown in step 1808, the process may include storing a process cache such as any of the process caches described herein in the kernel space on the endpoint. The cache may generally include process properties for one or more processes executing on the endpoint including, where appropriate, a protected status of the process(es) based upon corresponding entries in the tamper protection cache, along with any other potentially useful information such as a process identifier that uniquely identifies the process on the endpoint, directory or other path or source information, usage statistics, user information (e.g., system, machine, human, etc.), size, status, launch time, and so forth. The process cache may also or instead include other source information for a process such as an application, an application family, an application path, an application class, and so forth. In general, the endpoint protection driver may add, update, or remove processes or process information from the process cache as the status or usage of processes changes over time on the endpoint.

As shown in step 1810, the method 1800 may include monitoring the process cache, for example with the endpoint protection driver in the kernel. In one aspect, processes executing on the endpoint and/or stored in the process cache may include one of the protected processes identified in the tamper protection cache. In this case, monitoring may include monitoring for potentially malicious activity. For example, monitoring may further include detecting a change to one of the process properties, e.g., one of the protected processes, with the endpoint protection driver and evaluating the change for possible malicious activity. The endpoint protection driver may, where appropriate, automatically change the property to a previous value where it appears that the change (such as a change from a protected to an unprotected status) was not initiated by an authorized or trusted user, or by a protected process identified in the tamper protection cache.

In one aspect, the process cache provides a persistent record of processes that are executing or that have executed on the endpoint. This can usefully extend an operating system process cache by permitting historical inquiries into the process cache of the endpoint protection driver, e.g. for security or other forensic purposes, even after a process has been deleted from the operating system process cache and/or terminated in the user space. Thus, for example, upon detection of malware, a history of processes may usefully be investigated based on a query from any suitably authorized source through the endpoint protection driver to the process cache. To facilitate this type of extended investigation, the method 1800 may usefully include retaining process data for a process in the process cache in the kernel space after the process is terminated in the user space. The method 1800 may also or instead include providing the process data for a process from the process cache to an external security resource in response to a query from the external security resource. This latter step may be predicated on the receipt or confirmation of suitable credentials or signatures from the external security resource, e.g., in order to ensure a chain of trust to the external trust authority as appropriate.

As shown in step 1812, the method 1800 may include monitoring processes executing on the endpoint, such as processes in the user space of the endpoint, with an endpoint protection driver executing in the kernel space.

As shown in step 1814, the method 1800 may include directing interprocess communications through the endpoint protection driver in the kernel. This may, for example, include directing an interprocess communication from a first process in the user space to a second process in the user space through the endpoint protection driver. As noted above, this may also or instead include interprocess communications among user space processes and kernel space processes, such as an interprocess communication from a kernel space process to a user space process, from a user space process to a kernel space process, from a kernel space process to a kernel space process, or any combination of these. Thus, for example, at least one of the processes may be executing in the user space of the memory on the endpoint. One of the processes may also or instead be executing in the kernel space of the memory on the endpoint.

As shown in step 1816, the method 1800 may include managing the interprocess communications that are directed through the endpoint protection driver. This may include conditionally managing an interprocess communication according to a protected status of each of the first process (providing the communication) and the second process (receiving the communication) in the tamper protection cache. For example, when the second process is identified as protected in the tamper protection cache, conditionally managing communications may include conditionally permitting the first process to provide data to the second process only when the first process is also one of the protected processes identified in the tamper protection cache. More generally, any type of conditional management in which an interprocess communication is conditionally allowed or prohibited may usefully be employed.

As described above, the tamper protection cache may identify one or more protected computing objects selected from a group consisting of a directory, a registry key, and a file. The tamper protection cache may usefully be managed in a number of ways to support secure interprocess communications as contemplated herein.

For example, the tamper protection cache may be digitally signed using a private key of a key pair, and a public key of the key pair may be encoded into a binary representation of the endpoint protection driver stored in the kernel space so that the endpoint protection driver can verify the cache origin or contents as needed. The public key may also or instead be made available in another memory location on the endpoint or a remote location supported by a suitable trust authority. The tamper protection cache may also or instead be digitally signed with a signature containing a signed hash of the tamper protection cache. In one aspect, the trust authority providing the key pair may include a remote threat management facility that manages keys for use by the endpoint protection driver and/or tamper protection cache.

In another aspect, the tamper protection cache may include two or more independent data stores identifying different protected objects, each of the two or more independent data stores separately controllable by a trust authority external to the operating system. In this manner, independent objects, related objects, or specific types or groups of objects may be managed together within a single sub-cache. The cache may be hierarchically managed, e.g., as a number of different caches or with a number of different keys, to support independent management of different object types, functions, and so forth.

According to the foregoing, there is also contemplated herein a system including an endpoint with an endpoint protection driver and a tamper protection cache in the kernel space for use in securing, e.g., interprocess communications and other functions of the endpoint. The system may generally include an endpoint containing a memory, and operating system executing on the endpoint, a tamper protection cache stored in the kernel space of the memory, and an endpoint protection driver executing in the kernel space of the memory.

The operating system may divide the memory into a kernel space for operating system functions and a user space for execution of user programs. The tamper protection cache may be digitally signed by a trust authority external to the operating system, and may identify one or more protected processes (or more generally, computing objects) for protection when executing in the user space. The endpoint protection driver may be configured to monitor execution of processes in the user space and to detect an interprocess communication from a first process in the user space to a second process in the user space, the endpoint protection driver further configured to control the interprocess communication by, when the second process is a first one of the protected processes identified in the tamper protection cache, conditionally permitting the first process to provide data to the second process only when the first process is a second one of the protected processes identified in the tamper protection cache.

Figure 19:
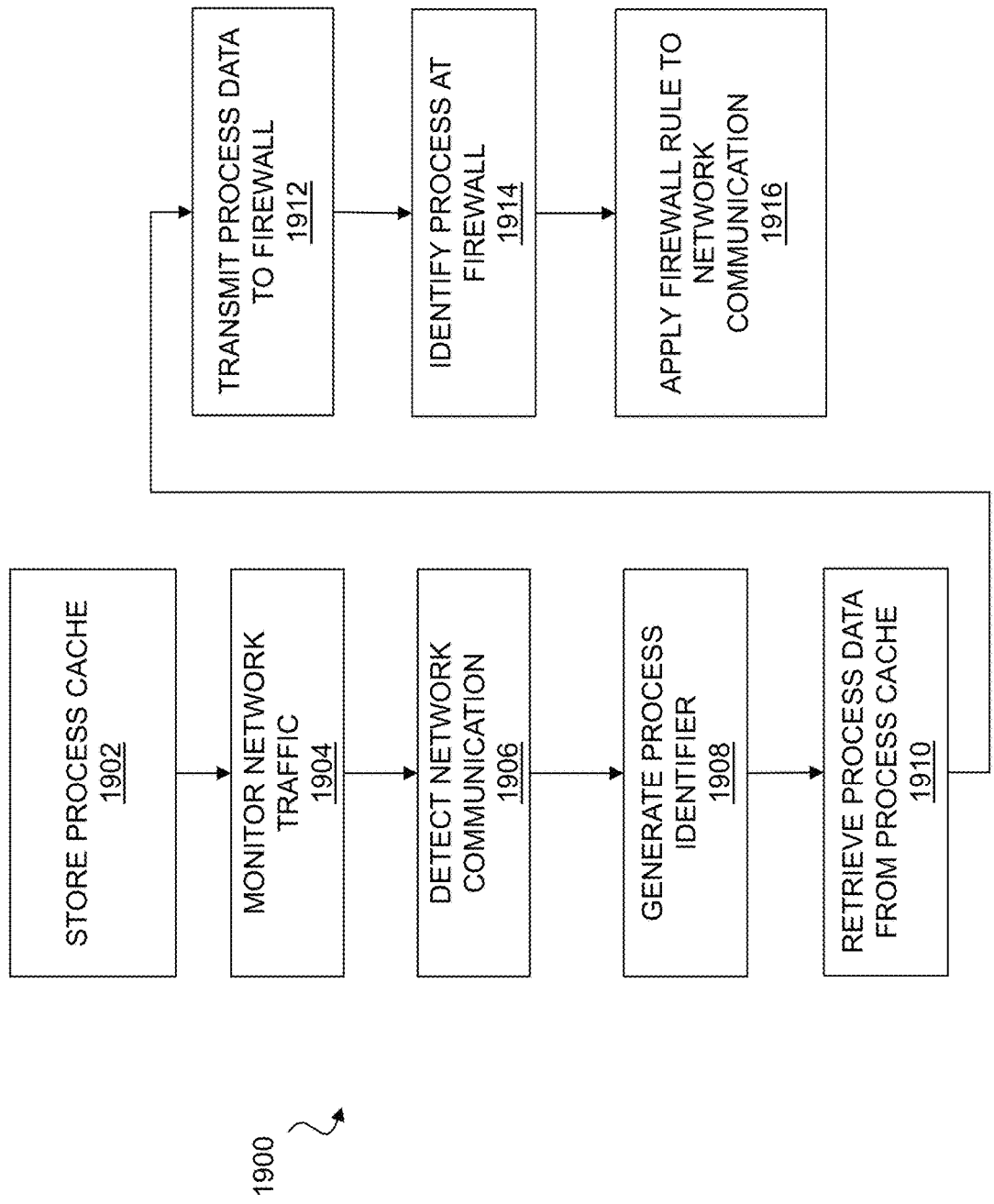
FIG. 19 shows a method for controlling a firewall.

FIG. 19 shows a method for controlling a firewall. This may include using any of the systems or methods described herein, such as those using the kernel driver and caches described above, e.g., on an endpoint with an operating system that supports a kernel space and a user space. A firewall may generally be used to control network communication to and from an endpoint. For example, local network access may be permitted or restricted, Internet access may be permitted or restricted, or communication with certain resources, applications, addresses, ports, and so forth may be permitted or restricted. In some cases, communication may be permitted with added or reduced security measures taken, such as increased scrutiny of network streams or decryption of encrypted communications or files. Bandwidth may be increased or decreased generally or for certain devices, resources, applications, addresses, or ports. These and any other suitable firewall control techniques may be used to manage network traffic for an endpoint. The following method 1900 provides further advantages by exposing process and application information from the kernel to a firewall along with network traffic in order to facilitate finer-grained and more accurate implementation of rules and application of enterprise network policies.

As shown in step 1902, the method 1900 may include storing a process cache such as any of the process caches described herein. The process cache may, for example, store process data for a process executing in the user space of an operating system, including process data such as a name, a path, and a type for each process. While the following description focuses on a single process, it will be understood that the process cache may usefully store information for each of a number of processes, any or all of which may be monitored and used to manage a firewall as contemplated herein.

As shown in step 1904, the method 1900 may include monitoring network traffic, such as by monitoring network traffic to and from the endpoint from a kernel driver executing in the kernel space of the operating system. This may include any suitable techniques for intercepting or otherwise registering hooks or the like for network traffic. For example, this may include using the Windows Filtering Platform, or any other suitable network instrumentation to tie into packet processing and a filtering pipeline for the network stack. In this manner, a filter engine may be deployed to implement actions for network traffic on a per-application, per-service, per process or other basis.

As shown in step 1906, the method 1900 may include detecting a network communication between a process (or one of a number of processes) and a remote resource with the kernel driver, such as by receiving a notification from any of the monitoring systems described above.

As shown in step 1908, the method 1900 may include generating a process identifier for the process such as a unique identifier that uniquely identifies the process to the firewall. In general, a unique identifier may be created for a process and stored, e.g., in the process cache or other location accessible to the kernel driver. This may include a process identifier provided by the operating system, or any other identifier that can be used, e.g., within the kernel or at the firewall to distinguish the process from other processes executing on the endpoint. The first time that process data is transmitted to the firewall (or any other local or remote location or resource), the process identifier may accompany the communication and be used to uniquely identify the process. In one aspect, this may include machine information that, together with the process identifier, provides a globally unique identifier for the process. Thus, for example, by combining a numeric process identifier with a MAC address, IP address, or other identifier for a machine and/or machine hardware, two different processes may be distinguished from one another even where, for example, they receive the same process identifier from the operating systems on two different endpoints. For subsequent network communications detected as described above, the kernel driver may send the process identifier instead of the corresponding process data, and a recipient such as a firewall may use the process identifier as an index to store and retrieve related process data.

As shown in step 1910, the method 1900 may include retrieving process data for the process from the process cache. In general, this may include any information available in the process cache and useful for managing a firewall as contemplated herein. Thus, for example, the process data may include a path for the process that identifies a location in a file system of the endpoint for executable code of the process or otherwise provides location information for the process or source code for the process. The process data may also or instead include a type for the process such as any of the types described herein. The type may be explicitly provided by the process or a local or remote tool, or the type may be implicitly determined based on, e.g., process behavior, process location, communication protocols used by the process, and so forth. The process data may also or instead include an application class or other metadata that describes or categorizes the process. Any of the foregoing process data may be accessed with the kernel driver or any other suitable kernel process and used in the method 1900 described herein.

In one aspect, the process data may also or instead include the process identifier which may, for example, be used by a recipient to index other process data. Thus, for example, an initial communication to a firewall may include the process identifier and related process data, while subsequent communications to the firewall may simply include the process identifier, which can be used by the firewall to locally retrieve any related process data as necessary or helpful in applying firewall rules or otherwise managing network communications.

As shown in step 1912, the method may include transmitting the process data to a firewall for the endpoint. This may, for example, include transmitting the name, the path, and the type for the process (or one of a number of processes) to a firewall for the endpoint. In this context, the process data may also or instead include the process identifier, which may be used by the firewall (or other network resource) to identify network traffic from the process. Thus, after the full process data and process identifier have been transmitted, the method may include transmitting the unique identifier to the firewall instead of the process data with one or more subsequent network communications from the process.

As shown in step 1914, the method 1900 may include identifying the process associated with the network communication at the firewall. Where the process data includes a name or other identifier, this information may be used to identify the process. Where the network communication is a subsequent network communication (e.g., after an initial communication that contains a process identifier), the process data may include or consist of a process identifier that can be used at the firewall to retrieve any related, previously-transmitted process data for use in applying firewall rules. In either case, suitable process information may be determined at the firewall based on the identity of the process and related process data for the firewall to apply an appropriate firewall rule.

As shown in step 1916, the method 1900 may include applying a firewall rule to the network communication based on the process data. Where a process identifier has been previously transmitted along with other process data for indexing at the firewall, the method 1900 may generally include identifying the process at the firewall based upon the unique identifier and applying a corresponding firewall rule for the process. In general, the firewall may include any suitable local or remote firewall, and/or any suitable hardware or software firewall, as well as combinations of the foregoing. For example, the firewall may include a remote firewall coupled to the endpoint through a data network. The firewall may also or instead include a local firewall executing on the endpoint. In another aspect, the firewall may include a remote firewall at a gateway, and transmitting the name, the path, and the type may include transmitting a secure heartbeat to the remote firewall to encode the process data in a verifiable and/or secure manner.

According to the foregoing, there is also disclosed herein a system including an endpoint having a memory and an operating system that organizes the memory into a user space and a kernel space. The system may include a firewall disposed between the endpoint and a data network, such as a firewall configured to control traffic between the endpoint and the data network. The system may include a process cache in the kernel space of the operating system. The process cache may generally store process data for a process executing in the user space. The system may also include a kernel driver in the kernel space of the operating system. The kernel driver may be configured to monitor network traffic to and from the endpoint, to detect a network communication between the process and a remote resource, to retrieve the process data for the process, and to transmit the process data to the firewall.

The process cache may store process data for each of a plurality of processes executing in the user space. The process day may include a path for the process that identifies a location in a file system of the endpoint for executable code of the process. The process data may also or instead include a name for the process. The process data may also or instead include an application class for the process.

Figure 20:
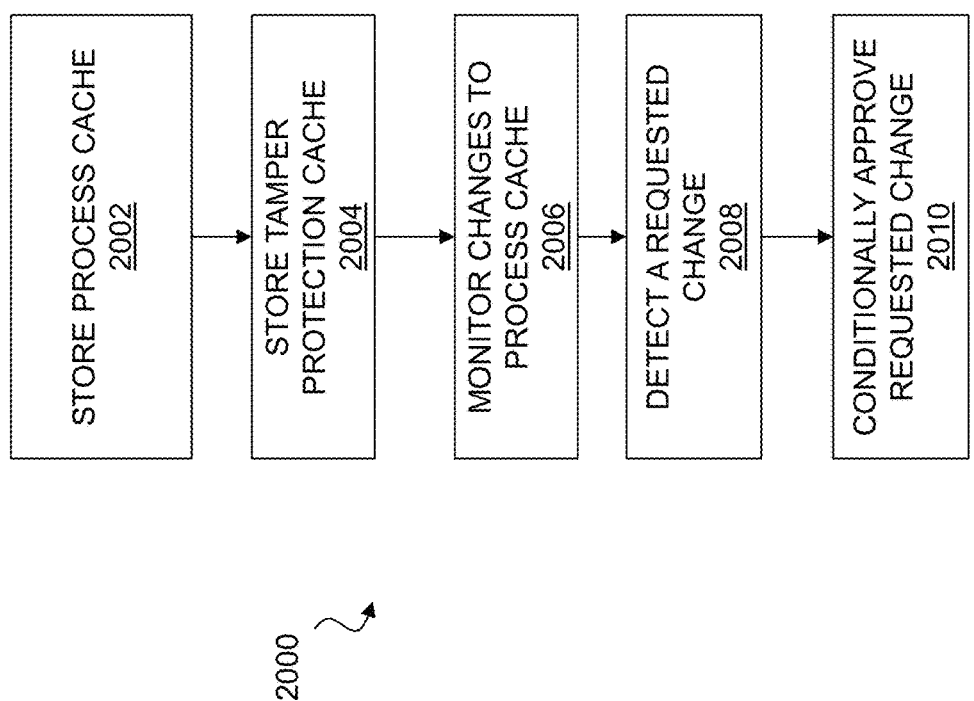
FIG. 20 shows a method for secure management of processes executing on an endpoint.

FIG. 20 shows a method for secure management of processes executing on an endpoint. This may include using any of the systems or methods described herein, such as those using the kernel driver and caches described above. In general, by securing a tamper protection cache as described herein, a variety of rules may be used to conditionally authorize subsequent changes to secured (and unsecured) processes or other computing objects.

As shown in step 2002, a method 2000 for managing properties of process on an endpoint may include storing a process cache in a kernel space of an operating system on the endpoint, such as an of the process caches described herein. In general, the endpoint may have a memory that includes the kernel space and a user space, and the process cache may store at least one property for a first process that is executing in the user space.

As shown in step 2004, the method 2000 may include storing a tamper protection cache in the kernel space, such as any of the tamper protection caches (or simply a "protection cache") described herein. In general, the tamper protection cache may identify one or more protected computing objects on the endpoint. As described above, the tamper protection cache may be secured by a trust authority external to the operating system. The tamper protection cache may also or instead be secured with a digital signature from a remote trust authority.

As shown in step 2006, the method 2000 may include monitoring changes to the process cache with a kernel driver. This may include instrumenting the process cache in any suitable manner to detect changes thereto, e.g., by processes executing on the endpoint.

As shown in step 2008, the method 2000 may include detecting, with the kernel driver (or any other suitable computing resource), a requested change from a second process executing on the endpoint to the at least one property of the first process. The requested change may be any change to process properties, attributes, or the like. For example, the requested change may be a change to process information stored in registry keys or the like. The requested change may be change to process privileges, a process user, a process directory, or any other attributes, properties, and so forth. In one aspect, the first process receiving the requested change may be a software firewall executing on the endpoint. This technique may advantageously be employed to control modifications to a firewall for an endpoint, and may proactively prevent changes or updates, except by protected processes with a verified origin or suitable permissions from the external trust authority. Thus, even a system or administrative user on the endpoint may usefully be prevented from changing certain processes or objects. At the same time, a remote administrative location with suitable credentials may control changes to (and more generally, access to) protected objects through the kernel driver and tamper protection cache.

As shown in step 2010, the method 2000 may include conditionally approving the requested change from the kernel driver based on a security rule and the tamper protection cache. This contemplates a wide variety of possible authorization rules. In one aspect, protected processes may be permitted to make changes to any other processes, protected or otherwise. Thus, for example, conditionally approving the requested change may include approving the requested change when the second process is identified as one of the protected objects in the tamper protection cache. In another aspect, the requesting process may be checked whenever a change to a protected process is requested. In this scenario, conditionally approving the requested change may include, when the first process is identified as one of the protected computing objects in the tamper protection cache, approving the requested change only when the second process is also identified as one of the protected objects in the tamper protection cache. In another aspect, unprotected processes may change properties of other unprotected processes in the ordinary manner. Thus, conditionally approving the requested change may include approving or allowing the requested change when neither the first process nor the second process is identified as one of the protected objects in the tamper protection cache.

Changes or change requests may also be implemented and approved in a variety of ways. For example, conditionally approving the requested change may include detecting an actual change to one or more properties, and then reversing the requested change after the requested change is entered into the process cache or other suitable location. Where object properties are stored in registry keys, the requested changes may be directed to the registry. Thus, for example, the requested change may include a change to a registry key associated with the first process. As noted above, the registry key may be identified as one of the protected objects in the tamper protection cache, and may be subject to any of the change approval rules described above, or any other suitable conditional rules for implementing a requested change to object properties.

Similarly, directory locations may be protected computing objects. When a process executes from a directory location identified as one of the protected objects in the tamper protection cache, the process may be subject to suitable conditional authorization rules. For example, when the process is requesting a change, the process may be treated as a protected process and granted corresponding change capabilities. Conversely, when the process is receiving a request for a change, the process may be treated as a protected process and change requests may be approved or rejected based on whether the requesting process has an equivalent protected status.

According to the foregoing, a system described herein includes an endpoint having a memory and an operating system that organizes the memory into a user space and a kernel space. The system may include a process cache such as any of the process caches described herein stored in the kernel space of the operating system, the process cache storing at least one property for a first process executing in the user space. The system may include a tamper protection cache such as any of the protection caches described herein stored in the kernel space of the operating system, the tamper protection cache identifying one or more protected computing objects on the endpoint. The system may also include a kernel driver in the kernel space of the operating system, such as any of the kernel drivers described herein.

The kernel driver may be configured to monitor changes to the process cache, to detect a requested change by a second process executing on the endpoint to the at least one property of the first process, and to conditionally approve the requested change from the kernel driver based on a security rule and the tamper protection cache, such as by using any of the conditional rules described above. For example, the kernel driver may be configured to undo an unapproved change by reversing the requested change after the requested change is entered into the process cache. The kernel driver may be configured to conditionally approve the requested change by approving the requested change only when the second process is identified as one of the protected objects in the tamper protection cache. The kernel driver may be configured to conditionally approve the requested change by approving the requested change when neither the first process nor the second process is identified as one of the protected objects in the tamper protection cache. The kernel driver may be configured to conditionally approve the requested change when the first process is identified as one of the protected computing objects in the tamper protection cache by approving the requested change only when the second process is also identified as one of the protected objects in the tamper protection cache.

Figure 21:
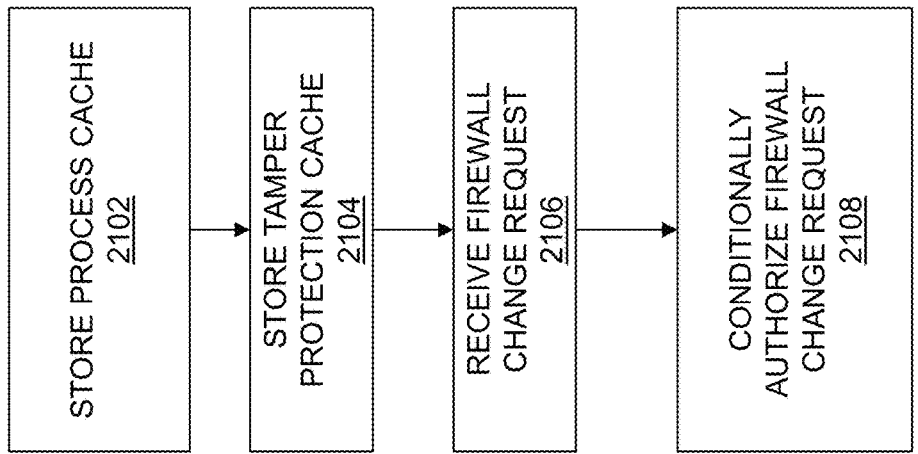
FIG. 21 shows a method for securing a firewall configuration on an endpoint.

FIG. 21 shows a method for securing a firewall configuration on an endpoint. In general, the configuration of the firewall on an endpoint, or for an endpoint, may be controlled and protected against malicious reconfiguration by treating the firewall as a protected process (or other object) and applying suitable change rules such as those described above to prevent modifications by unprotected processes. This may include using any of the systems or methods described herein, such as those using the kernel driver and tamper protection cache described above, in combination with any suitable rules for conditionally authorizing or permitting changes to properties or other configuration information for a firewall.

As shown in step 2102, the method 2100 may include storing a process cache. For example, as described above this may include storing a process cache in a kernel space of an operating system on an endpoint that has a memory including the kernel space and a user space. The process cache may store configuration information for a firewall such as at least one property for a software firewall process executing in the user space on the endpoint. Any number of properties for the firewall may usefully be controlled in this manner including lists of permitted network address, prohibited network addresses, permitted applications (and/or associated ports), prohibited applications (and/or associated ports), bandwidth restrictions, data usage quotas, and so forth. More generally, any property for a firewall may usefully be controlled using the techniques described herein.

As shown in step 2104, the method 2100 may include storing a tamper protection cache in the kernel space, such as any of the tamper protection caches (or simply a "protection cache") described herein. In general, the tamper protection cache may identify one or more protected computing objects on the endpoint. In the context of a firewall, the one of the protected computing objects may include a software firewall executing on the endpoint. In general, this configuration can prevent unauthorized changes to the software firewall properties stored in, or tracked in, the process cache. In another aspect, the software firewall properties may be stored directly in the tamper protection cache so that each property is individually protected against tampering by unprotected processes.

As described above, the tamper protection cache may be secured by a trust authority in various ways. For example, the tamper protection cache may be secured by a trust authority external to the operating system or a trust authority external to the endpoint. The trust authority may include a remote trust authority maintained by a threat management facility for an enterprise network that includes the endpoint or a remote third-party trust authority. The tamper protection cache may also or instead be secured with a digital signature from a remote trust authority.

As shown in step 2106, the method 2100 may include receiving a request for a change to a configuration of the software firewall process from a second process. This may be detected, e.g., with a kernel driver such as the endpoint protection driver described above, or any other suitable instrumentation on the endpoint. In general, the form of the request may depend on the type of firewall information and the manner in which the relevant firewall properties are stored. For example, the configuration may be stored in the process cache or in the tamper protection cache, or in some combination of these or in some other location. For example, the configuration of the software firewall process may be stored in one or more registry keys for the endpoint, which may be contained, for example, in the one or more protected computing objects stored in the tamper protection cache.

The configuration may specify one or more firewall rules. For example, the configuration may identify permitted or prohibited network addresses, or the configuration may identify permitted or prohibited applications executing on the endpoint that are correspondingly permitted to communicate through the firewall or prohibited from communicating through the firewall. In one aspect, the change to the configuration may include a request to allow traffic from an application executing on the endpoint, such as when a trusted network application is installed or executed on the endpoint, or when a new network policy is deployed within an enterprise network by a policy management module of a threat management facility. The change to the configuration may also or instead include a request to prevent traffic from an application executing on the endpoint, or to prevent all traffic from the endpoint, e.g., when a compromise is detected on the endpoint by a local security agent or a remote threat management facility.

Similarly, the second process that requests the configuration change in the firewall may originate from various locations. For example, the second process may be a system process on an endpoint controlled by an operating system, or a process used by a local security agent or the like. In another aspect, the second process may be a user process, e.g., for manual control of a firewall configuration, and corresponding changes may be conditionally permitted or prohibited according to whether manual control of the corresponding feature is permitted, which may be managed by an endpoint protection driver in the kernel based on, e.g., the protected status of the user process and the firewall property or any other relevant information. The second process may also or instead include a remote management tool, e.g., for threat management in an enterprise network. Thus, for example, the second process may be a remote process executing on a threat management facility for an enterprise network that includes the endpoint. In another aspect, the second process may evaluate an application requesting network access through the software firewall process and responsively request the change to permit the application to communicate through the firewall. The second process may also or instead coordinate firewall activity among a number of network devices within an enterprise network. For example, the second process may implement a policy change for an enterprise network to permit network use by an application by configuring the software firewall process and a remote firewall on a gateway for the enterprise network to allow traffic by the application.

As shown in step 2108, the method 2100 may include conditionally authorizing the firewall change request, e.g., to prevent alterations to the firewall by unprotected or otherwise unauthorized processes. For example, conditionally authorizing the change request may include conditionally authorizing the change from the kernel driver only when the one or more protected computing objects stored in the tamper protection cache also includes the second process that is requesting the change.

The request for the change may be authorized for any suitably credentialed or protected process. Thus, for example, the request for the change to the configuration of the software firewall process may originate from a source external to the endpoint such as a remote threat management facility or the like that is, e.g., configuring the firewall on the endpoint consistent with a network policy for an enterprise, or consistent with a detected threat, policy violation, software installation, or other change in a security context for the endpoint and/or the firewall. This general architecture can facilitate secure, remote management of an endpoint firewall from a threat management facility or other enterprise network security management infrastructure. Thus, for example, a firewall may be dynamically opened on the endpoint by the remote resource when, e.g., a communications program such as a voice-over-IP or messaging program is launched. This may be based on a notification from the endpoint that the application has launched, or the detection of corresponding network traffic at another network device such as a gateway within the enterprise network. The firewall may be left open while the application is engaging in network communications. However, if other suspicious activity is detected, such as within the application behavior, within the network traffic, or more generally on the endpoint, then the firewall may be closed again for that application until more detailed analysis and/or remediation can take place. Thus, by securing the firewall properties using a tamper protection cache as described herein, the firewall can be safely and securely managed on an ongoing basis from either a local process or an external threat management tool or resource.

In another aspect, a system for firewall management disclosed herein includes an endpoint having a memory and an operating system that organizes the memory into a user space for executing processes and a kernel space for the operating system. The system may include a software firewall process executing in the user space. The system may also include a process cache stored in the kernel space, the process cache storing at least one property for the software firewall process executing in the user space. The system may also include a tamper protection cache stored in the kernel space, the tamper protection cache secured with reference to a trust authority external to the operating system and identifying one or more protected computing objects on the endpoint, where the one or more protected computing objects includes the software firewall process. The system may also include a kernel driver executing in the kernel space and configured to detect a request for a change to the at least one property of the software firewall process from a second process and to conditionally authorize the change only when the one or more protected computing objects also includes the second process.

Figure 22:
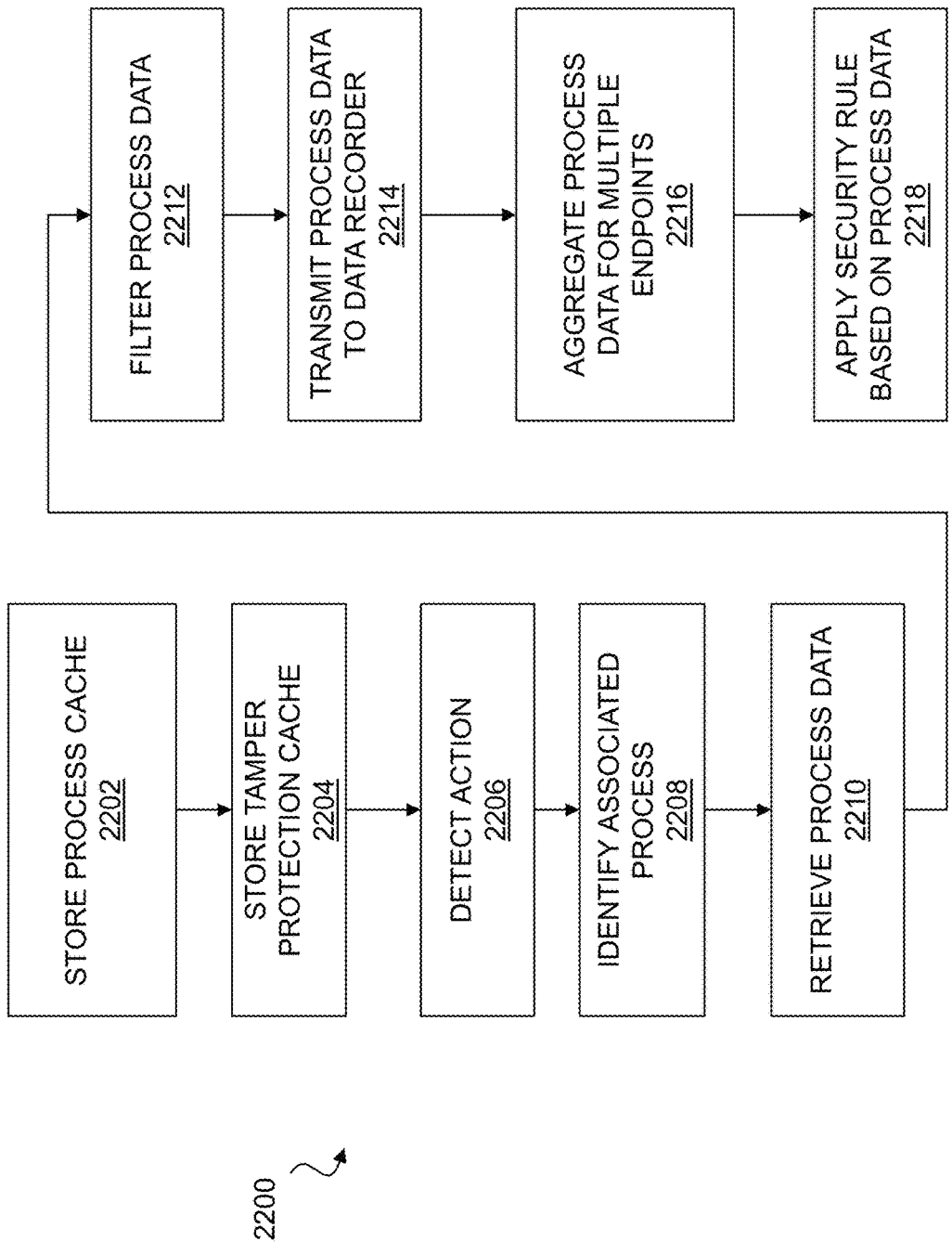
FIG. 22 shows a method for data recording.

FIG. 22 shows a method for data recording. This may include using any of the systems or methods described herein, such as those using the kernel driver and caches described above. The method 2200 may, for example, use a data recorder such as any of the data recorders described herein, any of which may usefully receive an information stream for a kernel driver or other similar data source(s) on an endpoint.

As shown in step 2202, the method 2200 may include storing a process cache, e.g., as described above. As shown in step 2204, the method may include storing a tamper protection cache, e.g., as described above.

As shown in step 2206, the method 2200 may include detecting an action on an endpoint with a kernel driver. As generally discussed herein, this may include detecting actions using any suitable instrumentation such as hooks, filters, system calls, and the like, or any other technique or combination of techniques described herein.

In one aspect, the action may be a change to one of the computing objects identified in the tamper protection cache, e.g., with a kernel driver such as the endpoint protection driver. This permits a data recorder to specifically monitor and record changes (or attempted changes, where a requested change is denied or reversed as described above) to protected objects in the tamper protection cache, which may be of particular interest for threat detection, policy compliance, and so forth.

As shown in step 2208, the method 2200 may include identifying a process associated with the action, such as by identifying a first process of a number of processes in the process cache that is associated with the action. In this manner, the process name, process identifier, or other information used to identify the process may be used to index and locate other process data for the process in the process cache.

As shown in step 2210, the method 2200 may include retrieving the process data for the first process from the process cache with the kernel driver. This may include any of the process data described herein. By way of non-limiting examples, process data may include a path for a process, such as a path that identifies a location in a file system of the endpoint for executable code of the process, a path to a default directory for the process, or any other path relevant to execution of the process. In another aspect, the process data may include a name for the process. The process data may also or instead include an application class for the process, which may identify a category, and application name, and application type, an application vendor, or any other useful information for uniquely or categorically identifying an application. In another aspect, the process data may include a reputation for the process. This may, for example, include a reputation retrieved from a remote resource such as by using a signature to retrieve reputation data from a threat management facility. This may also or instead include locally derived reputation information such as a reputation based on a local process lookup, process behavior, and so forth.

As shown in step 2212, the method 2200 may include filtering the process data. Filtering may occur at a variety of different levels. For example, filtering may be performed by the endpoint protection driver or other kernel driver that sources a stream of process data, e.g., according to any local rules. Filtering may also or instead occur at the network level, e.g., as process data is transmitted from an endpoint to a remote data recorder. Filtering may also or instead occur at the application level, e.g., at the point where a local or remote data recorder receives process data for a series of actions.

Different types of filters may be used according to the intended use for a data stream. For example, where the process data is to be used for threat detection, filtering may include filtering the process data based on a relevance of the action and the first process to threat detection. Thus, for example, changes to registry keys, requests to modify protected computer objects, or other potentially harmful actions may be transmitted while other actions may be filtered and removed from the data stream. Similarly, where the process data is to be used for firewall configuration or the like, filtering may include filtering the process data based on a relevance of the action to firewall management.

As shown in step 2214, the method 2200 may include transmitting the process data to a data recorder. The data recorder may, for example, be a data recorder on a firewall, and the method may further include applying a network security rule at the firewall based on the process data, e.g., to control network communications associated with the first process or one or more other processes executing on the endpoint. In this manner, an endpoint firewall may usefully be controlled based on a set of firewall rules or properties stored in, or secured by, a tamper protection cache and an endpoint protection driver as described herein. More generally, any process data stored in a process cache and/or tamper protection cache may be usefully streamed to a data recorder for use in subsequent analysis, threat detection, endpoint management, and so forth.

While the data recorder may operate on a firewall, the data recorder may also or instead include a local data recorder on the endpoint, or a remote data recorder at a remote location such as a threat management facility and coupled to the endpoint through a data network.

Where the detected action is a change to a protected object, as described above, transmitting may also or instead include transmitting the change and an object identifier for one or more computing objects to the data recorder. In this case, the transmitted information may also or instead include a process identifier and/or process data, e.g., for a process that requested the change or for a process that had a property or other attributed affected by the change. Thus, for example, the method 2200 may include identifying a process executing on the endpoint and associated with the change, and transmitting information for the process to the data recorder.

As shown in step 2216, the method 2200 may include aggregating process data for multiple endpoints. For example, this may include aggregating a plurality of actions and associated process data from a plurality of endpoints at a threat management facility for an enterprise network that includes the plurality of endpoints. This aggregated data may be used in a variety of ways, such as for threat detection, forensic analysis, enterprise network management, endpoint management, firewall or gateway management, policy enforcement, and so forth. Where the action(s) include changes to computing objects identified as protected in a tamper protection cache or the like, this may also or instead include aggregating a plurality of changes and object identifiers from a plurality of endpoints at a threat management facility for an enterprise network that includes the plurality of endpoints so that the aggregated change data can be used in, e.g., threat detection, forensic analysis, and so forth.

As shown in step 2218, the method 2200 may include applying a network security rule at the firewall based on the process data to control network communications associated with the process. While data accumulated by a data recorder, either from an individual endpoint or from a collection of endpoints, may be simply logged for subsequent analysis, the data may also or instead be used to apply a security rule based on the process data. This general technique may advantageously benefit from the secure nature of, e.g., the tamper protection cache and the use of a kernel driver to provide a low-level source of information on the endpoint.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on an endpoint, performs the steps of:
    storing a process cache in a kernel space of an operating system on the endpoint, the endpoint having a memory that includes the kernel space and a user space and the process cache storing at least one property for a first process executing in the user space;
    storing a tamper protection cache in the kernel space, the tamper protection cache identifying one or more protected computing objects on the endpoint including the first process, wherein a record of the first process in the tamper protection cache is cryptographically secured with reference to a trust authority external to the operating system;
    monitoring changes to the process cache with a kernel driver;
    detecting a requested change from a second process executing on the endpoint to the at least one property of the first process with the kernel driver; and
    conditionally approving the requested change from the kernel driver only when the second process is included in the one or more protected computing objects identified in the tamper protection cache.

2. A method for managing properties of processes on an endpoint, the method comprising:
    storing a process cache in a kernel space of an operating system on the endpoint, the endpoint having a memory that includes the kernel space and a user space and the process cache storing at least one property for a first process executing in the user space;
    storing a tamper protection cache in the kernel space, the tamper protection cache identifying one or more protected computing objects on the endpoint, wherein a record of the first process in the tamper protection cache is cryptographically secured with reference to a trust authority external to the operating system;
    monitoring changes to the process cache with a kernel driver;
    detecting a requested change from a second process executing on the endpoint to the at least one property of the first process with the kernel driver; and
    conditionally approving the requested change from the kernel driver based on a security rule and the tamper protection cache.

3. The method of claim 2 wherein the first process is a software firewall executing on the endpoint.

4. The method of claim 2 wherein conditionally approving the requested change includes reversing the requested change after the requested change is entered into the process cache.

5. The method of claim 2 wherein conditionally approving the requested change includes approving the requested change when the second process is identified as one of the one or more protected computing objects in the tamper protection cache.

6. The method of claim 2 wherein conditionally approving the requested change includes approving the requested change when neither the first process nor the second process is identified as one of the one or more protected computing objects in the tamper protection cache.

7. The method of claim 2 wherein conditionally approving the requested change includes, when the first process is identified as one of the protected computing objects in the tamper protection cache, approving the requested change only when the second process is also identified as one of the one or more protected computing objects in the tamper protection cache.

8. The method of claim 2 wherein the requested change includes a change to a registry key associated with the first process.

9. The method of claim 8 wherein the registry key is identified as one of the one or more protected computing objects in the tamper protection cache.

10. The method of claim 2 wherein the first process executes from a directory location identified as one of the one or more protected computing objects in the tamper protection cache.

11. The method of claim 2 wherein the tamper protection cache is secured by a trust authority external to the operating system.

12. The method of claim 2 wherein the tamper protection cache is secured with a digital signature from a remote trust authority.

13. The method of claim 2 wherein the requested change includes a change in at least one of process privileges or a user for the first process.

14. A system comprising:
an endpoint having a memory and an operating system that organizes the memory into a user space and a kernel space;
a process cache stored in the kernel space of the operating system, the process cache storing at least one property for a first process executing in the user space;
a tamper protection cache stored in the kernel space of the operating system, the tamper protection cache identifying one or more protected computing objects on the endpoint, wherein a record of the first process in the tamper protection cache is cryptographically secured with reference to a trust authority external to the operating system; and
a kernel driver in the kernel space of the operating system, the kernel driver configured to monitor changes to the process cache, to detect a requested change by a second process executing on the endpoint to the at least one property of the first process, and to conditionally approve the requested change from the kernel driver based on a security rule and the tamper protection cache.

15. The system of claim 14 wherein the first process is a software firewall executing on the endpoint.

16. The system of claim 14 wherein the kernel driver is configured to undo an unapproved change by reversing the requested change after the requested change is entered into the process cache.

17. The system of claim 14 wherein the kernel driver is configured to conditionally approve the requested change by approving the requested change only when the second process is identified as one of the one or more protected computing objects in the tamper protection cache.

18. The system of claim 14 wherein the kernel driver is configured to conditionally approve the requested change by approving the requested change when neither the first process nor the second process is identified as one of the one or more protected computing objects in the tamper protection cache.

19. The system of claim 14 wherein the kernel driver is configured to conditionally approve the requested change when the first process is identified as one of the one or more protected computing objects in the tamper protection cache by approving the requested change only when the second process is also identified as one of the one or more protected computing objects in the tamper protection cache.

20. The system of claim 14 wherein the tamper protection cache is secured by a trust authority external to the operating system.

* * * * *